US012307962B2

(12) United States Patent
Kim et al.

(10) Patent No.: US 12,307,962 B2
(45) Date of Patent: May 20, 2025

(54) DISPLAY DEVICE

(71) Applicant: Samsung Display Co., LTD., Yongin-si (KR)

(72) Inventors: Hyun Joon Kim, Hwaseong-si (KR); Jun Ki Jeong, Yongin-si (KR); Jung Hwan Hwang, Seongnam-si (KR); Kye Uk Lee, Seoul (KR); Sang Jin Jeon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 513 days.

(21) Appl. No.: 17/748,881

(22) Filed: May 19, 2022

(65) Prior Publication Data

US 2023/0078842 A1 Mar. 16, 2023

(30) Foreign Application Priority Data

Sep. 10, 2021 (KR) ........................ 10-2021-0121071

(51) Int. Cl.

*H01L 27/32* (2006.01)
*G09G 3/20* (2006.01)
(Continued)

(52) U.S. Cl.

CPC ......... *G09G 3/3233* (2013.01); *G09G 3/2081* (2013.01); *G09G 3/32* (2013.01); *G09G 2300/0426* (2013.01); *G09G 2300/0852* (2013.01); *G09G 2300/0861* (2013.01); *G09G 2310/0259* (2013.01); *G09G 2310/066* (2013.01)

(58) Field of Classification Search

CPC ...... G09G 3/3233; G09G 3/2081; G09G 3/32; G09G 2300/0426; G09G 2300/0852; G09G 2300/0861; G09G 2310/0259; G09G 2310/066

See application file for complete search history.

(56) References Cited

U.S. PATENT DOCUMENTS 11,217,177 B2 1/2022 Kim et al.
2017/0243544 A1* 8/2017 Kimura .............. H10K 59/1216
(Continued)

FOREIGN PATENT DOCUMENTS

EP 3 839 934 A1 6/2021
KR 10-2018-0115615 A 10/2018
(Continued)

*Primary Examiner* — Andrew Sasinowski

(74) *Attorney, Agent, or Firm* — Womble Bond Dickinson (US) LLP

(57) ABSTRACT

A display device includes a first scan line to receive a first scan signal, a second scan line to receive a second scan signal, a sweep signal line to receive a sweep signal, a first data line to receive a first data voltage, a second data line to receive a second data voltage, and a sub-pixel connected to the first scan line, the second scan line, the sweep signal line, the first data line, and the second data line. The sub-pixel includes a light emitting element, a first pixel driver configured to generate a control current according to the first data voltage of the first data line, and a second pixel driver configured to generate a driving current applied to the light emitting element according to the second data voltage of the second data line.

25 Claims, 31 Drawing Sheets

(51) Int. Cl.
*G09G 3/32* (2016.01)
*G09G 3/3233* (2016.01)

(56) References Cited

U.S. PATENT DOCUMENTS

| | | | | |
|---|---|---|---|---|
| 2017/0373094 | A1* | 12/2017 | Park | H10K 59/1216 |
| 2021/0201813 | A1* | 7/2021 | Oh | G09G 3/035 |
| 2021/0210002 | A1 | 7/2021 | Kim et al. | |
| 2021/0210003 | A1 | 7/2021 | Kim et al. | |
| 2022/0109040 | A1* | 4/2022 | Jung | G09G 3/3225 |
| 2022/0285474 | A1* | 9/2022 | Kim | H10K 59/1315 |

FOREIGN PATENT DOCUMENTS

| | | | |
|---|---|---|---|
| KR | 10-2020-0038735 | A | 4/2020 |
| KR | 10-2020-0101605 | A | 8/2020 |
| KR | 10-2020-0114868 | A | 10/2020 |
| KR | 10-2020-0114980 | A | 10/2020 |
| KR | 10-2021-0055028 | A | 5/2021 |
| KR | 10-2021-0077087 | A | 6/2021 |
| KR | 10-2021-0087867 | A | 7/2021 |

* cited by examiner

T3: T31, T32
T4: T41, T42
T10: T101, T102
T11: T111, T112

DISPLAY DEVICE

CROSS-REFERENCE TO RELATED APPLICATION

This application claims priority to, and the benefit of, Korean Patent Application No. 10-2021-0121071 filed on Sep. 10, 2021 in the Korean Intellectual Property Office (KIPO), the entire content of which is incorporated by reference herein.

BACKGROUND

1. Field

The present disclosure relates to a display device.

2. Description of the Related Art

With the advance of information-oriented society, more and more demands are placed on display devices for displaying images in various ways. The display device may be a flat panel display device such as a liquid crystal display, a field emission display and a light emitting display.

A light emitting display device may include an organic light emitting display device including an organic light emitting diode (OLED) as a light emitting element or a light emitting diode display device including an inorganic light emitting diode such as a light emitting diode (LED) as a light emitting element. In the case of the organic light emitting display device, the luminance or grayscale of light of the organic light emitting diode is adjusted by adjusting the magnitude of the driving current applied to the organic light emitting diode. However, as the wavelength of light emitted from the inorganic light emitting diode varies depending on the driving current, an image quality may deteriorate when the inorganic light emitting diode is driven in the same manner as the organic light emitting diode.

SUMMARY

Aspects and features of embodiments of the present disclosure provide a display device capable of reducing or preventing deterioration of an image quality due to the change in the wavelength of the emitted light depending on the driving current applied to an inorganic light emitting diode.

However, embodiments of the present disclosure are not limited to those set forth herein. The above and other embodiments of the present disclosure will become more apparent to one of ordinary skill in the art to which the present disclosure pertains by referencing the detailed description of the present disclosure given below.

According to one or more embodiments of the present disclosure, there is provided a display device including a first scan line to receive a first scan signal, a second scan line to receive a second scan signal, a sweep signal line to receive a sweep signal, a first data line to receive a first data voltage, a second data line to receive a second data voltage, and a sub-pixel connected to the first scan line, the second scan line, the sweep signal line, the first data line, and the second data line. The sub-pixel includes a light emitting element, a first pixel driver configured to generate a control current according to the first data voltage of the first data line, a second pixel driver configured to generate a driving current applied to the light emitting element according to the second data voltage of the second data line, and a third pixel driver configured to control a period in which the driving current is applied to the light emitting element according to the control current of the first pixel driver. The first pixel driver includes a first transistor configured to generate the control current according to the first data voltage, a second transistor configured to apply the first data voltage of the first data line to a first electrode of the first transistor according to the first scan signal, a third transistor configured to apply an initialization voltage of an initialization voltage line to a gate electrode of the first transistor according to the second scan signal, and a first capacitor located between the sweep signal line and the gate electrode of the first transistor.

The third transistor may include a plurality of transistors connected in series.

The third transistor may include a first sub-transistor including a gate electrode connected to the second scan line and a first electrode connected to the initialization voltage line, and a second sub-transistor including a gate electrode connected to the second scan line, a first electrode connected to a second electrode of the first sub-transistor, and a second electrode connected to the gate electrode of the first transistor.

The first pixel driver may further include a fourth transistor configured to connect a gate electrode and a second electrode of the first transistor according to the first scan signal.

The display device may further include a first power voltage line to receive a first power voltage, a first emission line to receive a first emission signal, and a third scan line to receive a third scan signal. The first pixel driver may further include a fifth transistor configured to connect the first power voltage line to the first electrode of the first transistor according to the first emission signal, a sixth transistor configured to connect a second electrode of the first transistor to a first node according to the first emission signal, and a seventh transistor configured to connect the sweep signal line to a gate-off voltage line to receive a gate-off voltage according to the third scan signal.

The second pixel driver may include an eighth transistor configured to generate the driving current according to the second data voltage, a ninth transistor configured to apply the second data voltage of the second data line to a first electrode of the eighth transistor according to the first scan signal, and a tenth transistor configured to apply the initialization voltage of the initialization voltage line to a gate electrode of the eighth transistor according to the second scan signal.

The tenth transistor may include a plurality of transistors connected in series.

The tenth transistor may include a third sub-transistor including a gate electrode connected to the second scan line and a first electrode connected to the initialization voltage line, and a fourth sub-transistor including a gate electrode connected to the second scan line, a first electrode connected to a second electrode of the third sub-transistor, and a second electrode connected to the gate electrode of the eighth transistor.

The second pixel driver further includes an eleventh transistor configured to connect the gate electrode and a second electrode of the eighth transistor according to the first scan signal.

The display device may further include a first power voltage line to receive a first power voltage, a second power voltage line to receive a second power voltage, a first emission line to receive a first emission signal, and a third scan line to receive a third scan signal. The second pixel driver may further include a twelfth transistor configured to connect the first power voltage line to a second node according to the third scan signal, a thirteenth transistor configured to connect the second power voltage line to a first electrode of the ninth transistor according to the first emission signal, a fourteenth transistor configured to connect the second power voltage line to the second node according to the first emission signal, and a second capacitor located between a gate electrode of the ninth transistor and the second node.

The display device may further include a second emission line to receive a second emission signal, and a third scan line to receive a third scan signal. The third pixel driver may include a fifteenth transistor including a gate electrode connected to a first node, a sixteenth transistor configured to connect the first node to the initialization voltage line according to the third scan signal, a seventeenth transistor configured to connect a second electrode of the fifteenth transistor to a first electrode of the light emitting element according to the second emission signal, and a third capacitor located between the first node and the initialization voltage line.

The third pixel driver may further include an eighteenth transistor configured to connect the first electrode of the light emitting element to the initialization voltage line according to the third scan signal.

The display device may further include a test signal line to receive a test signal, and a third power voltage line to receive a third power voltage. The third pixel driver may further include a nineteenth transistor configured to connect the first electrode of the light emitting element to the third power voltage line according to the test signal.

The sweep signal may have a pulse that linearly decreases from a gate-on voltage to a gate-off voltage.

According to one or more embodiments of the present disclosure, there is provided a display device including a first control line to receive a first scan signal, a first emission line to receive a first emission signal, a first data line to receive a first data voltage, a second data line to receive a second data voltage, a first power voltage line to receive a first power voltage, a second power voltage line to receive a second power voltage, and a sub-pixel connected to the first control line, the first emission line, the first data line, and the second data line. The sub-pixel includes a light emitting element, a first pixel driver configured to generate a driving current applied to the light emitting element according to the first data voltage of the first data line, a second pixel driver configured to generate a control current according to the second data voltage of the second data line, and a third pixel driver configured to control a period in which the driving current is applied to the light emitting element according to the control current of the second pixel driver. The first pixel driver includes a first transistor configured to generate the driving current according to a data voltage applied to a gate electrode, a first capacitor located between the gate electrode of the first transistor and a first node, a second transistor configured to connect the first node to the first power voltage line according to the first scan signal, a third transistor configured to connect a first electrode of the first transistor to the second power voltage line according to the first emission signal, and a fourth transistor configured to connect the first node to the second power voltage line according to the first emission signal.

The display device may further include a second scan line to receive a second scan signal, and a third scan line to receive a third scan signal. The first pixel driver may further include a fifth transistor configured to apply the first data voltage of the first data line to the first electrode of the first transistor according to the second scan signal, a sixth transistor configured to apply an initialization voltage of an initialization voltage line to the gate electrode of the first transistor according to the third scan signal, and a seventh transistor configured to connect the gate electrode and a second electrode of the first transistor according to the second scan signal.

Each of the sixth transistor and the seventh transistor may include a plurality of transistors connected in series.

According to one or more embodiments of the present disclosure, there is provided a display device including a substrate, an active layer including a first channel, a first source electrode, and a first drain electrode on the substrate, a first insulating layer on the active layer, a first gate electrode and a first capacitor electrode on the first insulating layer and overlapping the first channel, a second insulating layer on the first gate electrode, a second capacitor electrode on the second insulating layer and overlapping the first capacitor electrode, a third insulating layer on the second capacitor electrode, and a sweep signal line on the third insulating layer and to receive a sweep signal. The sweep signal line is connected to the second capacitor electrode through a first contact hole penetrating the third insulating layer.

The sweep signal may have a pulse that linearly decreases from a gate-on voltage to a gate-off voltage.

The display device may further include a first sub power voltage line on the third insulating layer and to receive a first power voltage, and a first emission line on the third insulating layer and to receive a first emission signal. The second capacitor electrode may cross the first sub power voltage line and the first emission line.

The active layer may include a second channel, a second source electrode, and a second drain electrode. The display device may further include a second gate electrode on the first insulating layer, connected to the first emission line, and overlapping the active layer. The first sub power voltage line may be connected to the second source electrode through a second contact hole penetrating the first insulating layer, the second insulating layer, and the third insulating layer.

The display device may further include a fourth insulating layer on the sweep signal line, the first sub power voltage line, and the first emission line, and a second sub power voltage line on the fourth insulating layer. The second sub power voltage line may be connected to the first sub power voltage line through a third contact hole penetrating the fourth insulating layer.

An area of the third contact hole may be larger than an area of the second contact hole.

The second contact hole may overlap the third contact hole.

According to one or more embodiments of the present disclosure, there is provided a display device including a first scan line to receive a first scan signal, a second scan line to receive a second scan signal, a sweep signal line to receive a sweep signal, a first data line to receive a first data voltage, a second data line to receive a second data voltage, and a sub-pixel connected to the first scan line, the second scan line, the sweep signal line, the first data line, and the second data line. The sub-pixel include a first pixel driver configured to generate a control current according to the first data voltage of the first data line, a second pixel driver configured to generate a driving current according to the second data voltage of the second data line, and a third pixel driver configured to control a period in which the driving current is applied according to the control current of the first pixel driver. The first pixel driver include a first transistor configured to generate the control current according to the first data voltage, a second transistor configured to apply the first data voltage of the first data line to a first electrode of the first transistor according to the first scan signal, a third transistor configured to apply an initialization voltage of an initialization voltage line to a gate electrode of the first transistor according to the second scan signal, and a first capacitor located between the sweep signal line and the gate electrode of the first transistor.

According to the aforementioned and other embodiments of the present disclosure, the luminance of the light emitted from the inorganic light emitting diode is controlled by adjusting the period in which the driving current is applied while maintaining the driving current applied to the inorganic light emitting diode at a constant level. Therefore, it is possible to reduce or prevent deterioration of an image quality due to the change in the wavelength of the emitted light depending on the driving current applied to the inorganic light emitting diode.

BRIEF DESCRIPTION OF THE DRAWINGS

The above and other embodiments and features of the present disclosure will become more apparent by describing embodiments thereof with reference to the attached drawings, in which.

DETAILED DESCRIPTION

Figure 1:
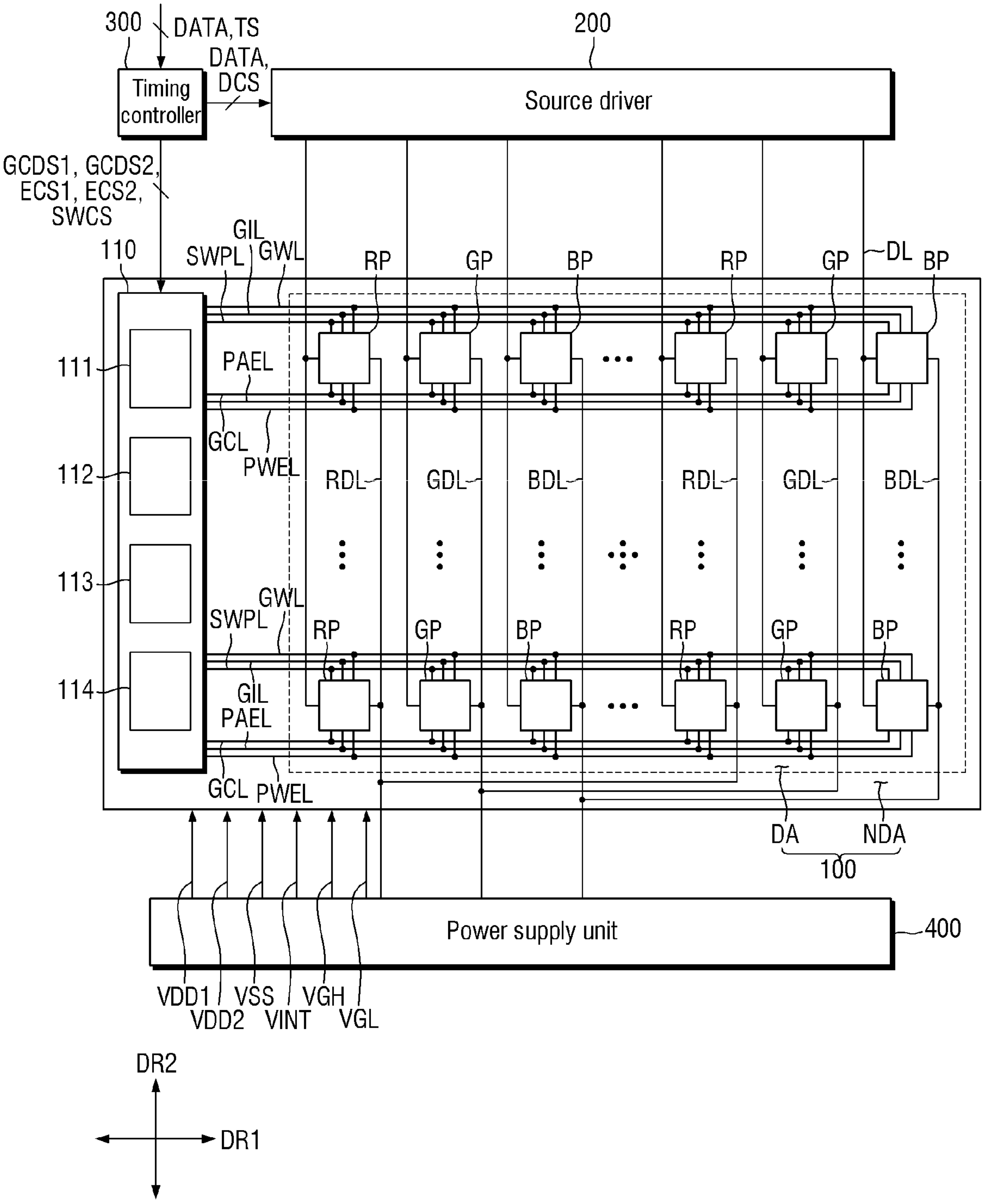
FIG. 1 is a block diagram illustrating a display device according to one or more embodiments.

Aspects and features of embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure might not be described.

Unless otherwise noted, like reference numerals, characters, or combinations thereof denote like elements throughout the attached drawings and the written description, and thus, descriptions thereof will not be repeated. Further, parts not related to the description of one or more embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to one or more embodiments.

Referring to FIG. 1, a display device 10 includes a display panel 100, a scan driver 110, a source driver 200, a timing controller 300, and a power supply unit 400.

A display area DA of the display panel 100 may include sub-pixels RP, GP, and BP for displaying an image, scan write lines GWL connected to the sub-pixels RP, GP, and BP, scan initialization lines GIL, scan control lines GCL, sweep signal lines SWPL, PWM emission lines PWEL, PAM emission lines PAEL, data lines DL, first PAM data lines RDL, second PAM data lines GDL, and third PAM data lines BDL.

One of the scan write line GWL, the scan initialization line GIL, and the scan control line GCL may be a first scan line, one another of the scan write line GWL, the scan initialization line GIL, and the scan control line GCL may be a second scan line, and the rest one of the scan write line GWL, the scan initialization line GIL, and the scan control line GCL may be a third scan line.

The scan write lines GWL, the scan initialization lines GIL, the scan control lines GCL, the sweep signal lines SWPL, the PWM emission lines PWEL, and the PAM emission lines PAEL may extend in a first direction DR1 (e.g., X-axis direction), and may be arranged along a second direction DR2 (e.g., Y-axis direction) intersecting the first direction DR1 (e.g., X-axis direction). The data lines DL, the first PAM data lines RDL, the second PAM data lines GDL, and the third PAM data lines BDL may extend in the second direction DR2 (e.g., Y-axis direction), and may be arranged along the first direction DR1 (e.g., X-axis direction). The first PAM data lines RDL may be electrically connected to each other, the second PAM data lines GDL may be electrically connected to each other, and the third PAM data lines BDL may be electrically connected to each other.

The sub-pixels RP, GP, and BP may include first sub-pixels RP emitting first light, second sub-pixels GP emitting second light, and third sub-pixels BP emitting third light. The first light indicates light of a red wavelength band, the second light indicates light of a green wavelength band, and the third light indicates light of a blue wavelength band. For example, the main peak wavelength of the first light may be within a range of about 600 nm to about 750 nm, the main peak wavelength of the second light may be within a range of about 480 nm to about 560 nm, and the main peak wavelength of the third light may be within a range of about 370 nm to about 460 nm.

Each of the sub-pixels RP, GP, and BP may be connected to any one of the scan write lines GWL, any one of the scan initialization lines GIL, any one of the scan control lines GCL, any one of the sweep signal lines SWPL, any one of the PWM emission lines PWEL, and any one of the PAM emission lines PAEL. Further, each of the first sub-pixels RP may be connected to any one of the data lines DL and any one of the first PAM data lines RDL. Further, each of the second sub-pixels GP may be connected to any one of the data lines DL and any one of the second PAM data lines GDL. Further, each of the third sub-pixels BP may be connected to any one of the data lines DL and any one of the third PAM data lines BDL.

In a non-display area NDA of the display panel 100, a scan driver 110 for applying signals to the scan write lines GWL, the scan initialization lines GIL, the scan control lines GCL, the sweep signal lines SWPL, the PWM emission lines PWEL, and the PAM emission lines PAEL may be disposed. Although FIG. 1 illustrates that the scan driver 110 is disposed at one edge of the display panel 100, the present disclosure is not limited thereto. The scan driver 110 may be disposed at both edges of the display panel 100.

The scan driver 110 may include a first scan signal output unit 111, a second scan signal output unit 112, an emission and sweep signal output unit 113, and an emission signal output unit 114.

The first scan signal output unit 111 may receive a first scan driving control signal GCDS1 from the timing controller 300. The first scan signal output unit 111 may output scan initialization signals to the scan initialization lines GIL in response to the first scan driving control signal GCDS1, and may output scan write signals to the scan write lines GWL. In other words, the first scan signal output unit 111 may output two types of scan signals, i.e., the scan initialization signals and the scan write signals.

The second scan signal output unit 112 may receive a second scan driving control signal GCDS2 from the timing controller 300. The second scan signal output unit 112 may output scan control signals to the scan control lines GCL in response to the second scan driving control signal GCDS2.

The emission and sweep signal output unit 113 may receive a first emission control signal ECS1 and a sweep control signal SWCS from the timing controller 300. The emission and sweep signal output unit 113 may output PWM emission signals to the PWM emission lines PWEL in response to the first emission control signal ECS1, and may output sweep signals to the sweep signal lines SWPL. That is, the light emission and sweep signal output unit 113 may output the PWM emission signals and the sweep signals.

The second emission signal output unit 114 may receive a second emission control signal ECS2 from the timing controller 300. The second emission signal output unit 114 may output PAM emission signals to the PAM emission lines PAEL in response to the second emission control signal ECS2.

The timing controller 300 receives digital video data DATA and timing signals TS. The timing controller 300 may generate the first scan driving control signal GCDS1, the second scan driving control signal GDSC2, the first emission control signal ECS1, the second emission control signal ECS2, and a sweep control signal SWCS for controlling the operation timing of the scan driver 110 in response to the timing signals TS. Further, the timing controller 300 may generate a data control signal DCS for controlling the operation timing of the source driver 200.

The timing controller 300 outputs the first scan driving control signal GCDS1, the second scan driving control signal GDSC2, the first emission control signal ECS1, the second emission control signal ECS2, and the sweep control signal SWCS to the scan driver 110. The timing controller 300 outputs the digital video data DATA and the data control signal DCS to the source driver 200.

The source driver 200 converts the digital video data DATA to analog data voltages and outputs them to the data lines DL. Accordingly, the sub-pixels SP may be selected by the scan write signals of the scan driver 110, and data voltages may be supplied to the selected sub-pixels RP, GP, and BP.

The power supply unit 400 may commonly output a first PAM data voltage to the first PAM data lines RDL, commonly output a second PAM data voltage to the second PAM data lines GDL, and commonly output a third PAM data voltage to the third PAM data lines BDL. Further, the power supply unit 400 may generate a plurality of power voltages and output them to the display panel 100.

The power supply unit 400 may output a first power voltage VDD1, a second power voltage VDD2, a third power voltage VSS, an initialization voltage VINT, a gate-on voltage VGL, and a gate-off voltage VGH to the display panel 100. The first power voltage VDD1 and the second power voltage VDD2 may be a high potential driving voltage for driving the light emitting element of each of the sub-pixels RP, GP, and BP. The initialization voltage VINT may be a low potential driving voltage for driving the light emitting element of each of the sub-pixels RP, GP, and BP. The initialization voltage VINT and the gate-off voltage VGH may be applied to each of the sub-pixels RP, GP, and BP, and the gate-on voltage VGL and the gate-off voltage VGH may be applied to the scan driver 110.

Figure 2:
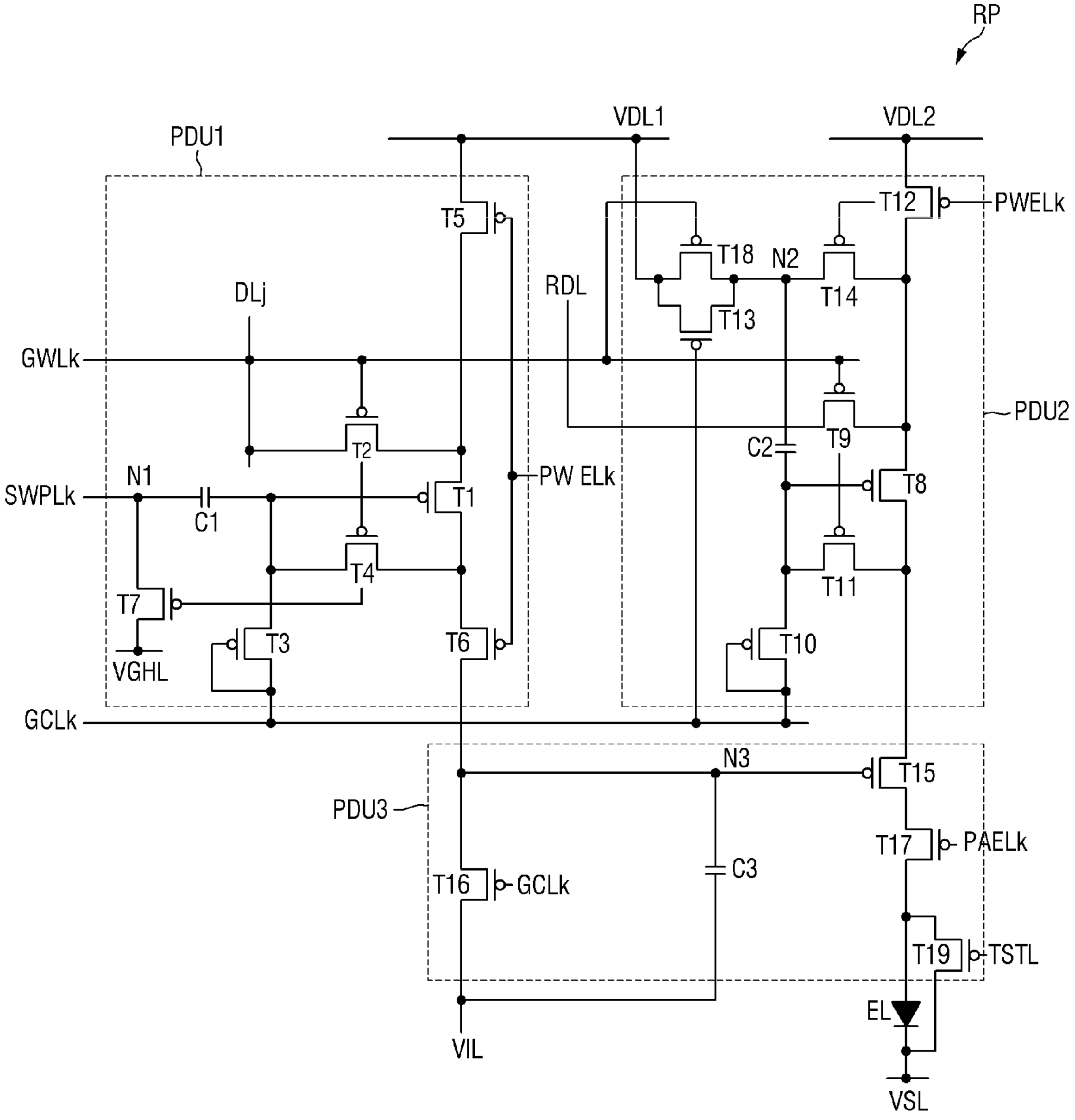
FIG. 2 is a circuit diagram illustrating a first sub-pixel according to one or more embodiments.

FIG. 2 is a circuit diagram illustrating a first sub-pixel according to one or more embodiments.

Referring to FIG. 2, the first sub-pixel RP includes a first pixel driver PDU1, a second pixel driver PDU2, and a third pixel driver PDU3. The first pixel driver PDU1 may include first to seventh transistors T1 to T7 and a first capacitor C1.

The first transistor T1 controls the control current flowing to a third node N3 of the third pixel driver PDU3 in response to the voltage applied to a gate electrode of the first transistor T1. The second transistor T2 is turned-on by a $k^{th}$ scan write signal of a $k^{th}$ scan write line GWLk to supply the data voltage of a PI data line DLj to the first electrode of the first transistor T1. The third transistor T3 is turned-on by a $k^{th}$ scan control signal of a $k^{th}$ scan control line GCLk to supply the $k^{th}$ scan control signal to the gate electrode of the first transistor T1. The third transistor T3 may have a diode structure in which the gate electrode and a second electrode are connected (e.g., the third transistor T3 may be diode-connected). The fourth transistor T4 is turned-on by the $k^{th}$ scan write signal of the $k^{th}$ scan write line GWLk to connect the gate electrode and the second electrode of the first transistor T1. During the turn-on period of the fourth transistor T4, the first transistor T1 may operate as a diode. The fifth transistor T5 is turned-on by a $k^{th}$ PWM emission signal of a $k^{th}$ PWM emission line PWELk to connect the first electrode of the first transistor T1 to a first power line VDL1. The sixth transistor T6 is turned-on by the $k^{th}$ PWM emission signal of the $k^{th}$ PWM emission line PWELk to connect the second electrode of the first transistor T1 to the third node N3 of the third pixel driver PDU3. The seventh transistor T7 is turned-on by the $k^{th}$ scan write signal of the $k^{th}$ scan write line GWLk to supply the gate-off voltage VGH of a gate-off voltage line VGHL to a first node N1 connected to a $k^{th}$ sweep signal line SWPLk. The first capacitor C1 may be disposed between the gate electrode of the first transistor T1 and the first node N1.

The second pixel driver PDU2 may include eighth to fourteenth transistors T8 to T14, an eighteenth transistor T18, and a second capacitor C2.

The eighth transistor T8 controls the driving current flowing to a light emitting element EL in response to the voltage applied to the gate electrode of the eighth transistor T8. The ninth transistor T9 is turned-on by the $k^{th}$ scan write signal of the $k^{th}$ scan write line GWLk to supply the first PAM data voltage of the first PAM data line RDL to the first electrode of the eighth transistor T8. The tenth transistor T10 is turned-on by the $k^{th}$ scan control signal of the $k^{th}$ scan control line GCLk to supply the $k^{th}$ scan control signal to the gate electrode of the eighth transistor T8. The tenth transistor T10 may have the diode structure in which the gate electrode and the second electrode are connected (e.g., the tenth transistor T10 may be diode-connected). The eleventh transistor T11 is turned-on by the $k^{th}$ scan write signal of the $k^{th}$ scan write line GWLk to connect the gate electrode and the second electrode of the eighth transistor T8. During the turn-on period of the eleventh transistor T11, the eighth transistor T8 may operate as a diode. The twelfth transistor T12 is turned-on by the $k^{th}$ PWM emission signal of the $k^{th}$ PWM emission line PWELk to connect the first electrode of the eighth transistor T8 to a second power line VDL2. The thirteenth transistor T13 is turned-on by the $k^{th}$ scan control signal of the $k^{th}$ scan control line GCLk to connect the first power line VDL1 to a second node N2. The fourteenth transistor T14 is turned-on by the $k^{th}$ PWM emission signal of the $k^{th}$ PWM emission line PWELk to connect the first electrode of the eighth transistor T8 to the second node N2. The eighteenth transistor T18 is turned-on by the $k^{th}$ scan write signal of the $k^{th}$ scan write line GWLk to connect the first power line VDL1 to the second node N2. The second capacitor C2 may be disposed between the gate electrode of the eighth transistor T8 and the second node N2.

The third pixel driver PDU3 may include fifteenth to seventeenth transistors T15 to T17, a nineteenth transistor T19, and a third capacitor C3.

The fifteenth transistor T15 is turned-on or turned-off depending on the voltage of the third node N3. The sixteenth transistor T16 is turned-on by the $k^{th}$ scan control signal of the $k^{th}$ scan control line GCLk to apply the initialization voltage of an initialization voltage line VIL to the third node N3. The seventeenth transistor T17 is turned-on by a $k^{th}$ PAM emission signal of a $k^{th}$ PAM emission line PAELk to connect the second electrode of the fifteenth transistor T15 to the first electrode of the light emitting element EL. The nineteenth transistor T19 is turned-on by the test signal of a test signal line TSTL to connect the first electrode of the light emitting element EL to a third power line VSL. The third capacitor C3 may be disposed between the third node N3 and the initialization voltage line VIL.

The light emitting element EL may be disposed between the second electrode of the seventeenth transistor T17 and the third power line VSL.

In FIG. 2, any one of the first electrode and the second electrode of each of the first to nineteenth transistors T1 to T19 may be a source electrode, and the other may be a drain electrode. Further, although FIG. 2 illustrates that each of the first to nineteenth transistors T1 to T19 is formed as a P-type metal oxide semiconductor field effect transistor (MOSFET), the embodiment of the present specification is not limited thereto. For example, each of the first to nineteenth transistors T1 to T19 may be formed as an N-type MOSFET.

The second sub-pixel GP and the third sub-pixel BP may have substantially the same circuit structure as that of the first sub-pixel RP illustrated in FIG. 2. Therefore, the description of the second sub-pixel GP and the third sub-pixel BP will be omitted.

Figure 3:
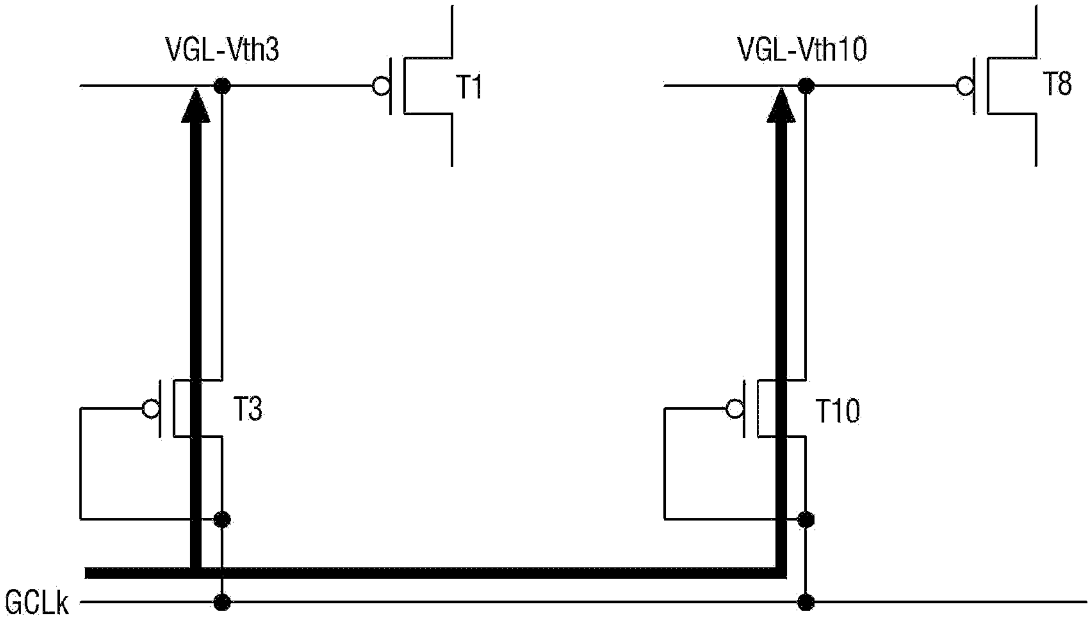
FIG. 3 is a circuit diagram illustrating a first transistor, a third transistor, an eighth transistor, and a tenth transistor of FIG. 2.

FIG. 3 is a circuit diagram illustrating a first transistor, a third transistor, an eighth transistor, and a tenth transistor of FIG. 2.

Referring to FIG. 3, the third transistor T3 is turned-on by the $k^{th}$ scan control signal of the gate-on voltage VGL applied to the $k^{th}$ scan control line GCLk. At this time, because the third transistor T3 has the diode structure in which the gate electrode and the second electrode are connected, the gate electrode of the first transistor T1 may be initialized to the voltage obtained by subtracting a threshold voltage Vth3 of the third transistor T3 from the gate-on voltage VGL.

Further, the tenth transistor T10 is turned-on by the $k^{th}$ scan control signal of the gate-on voltage VGL applied to the $k^{th}$ scan control line GCLk. At this time, because the tenth transistor T10 has the diode structure in which the gate electrode and the second electrode are connected, the gate electrode of the eighth transistor T8 may be initialized to the voltage obtained by subtracting a threshold voltage Vth10 of the tenth transistor T10 from the gate-on voltage VGL.

That is, the initialization voltage applied to the gate electrode of the first transistor T1 may depend on the threshold voltage Vth3 of the third transistor T3. In other words, the initialization voltage applied to the gate electrode of the first transistor T1 may vary depending on the threshold voltage Vth3 of the third transistor T3.

Further, the initialization voltage applied to the gate electrode of the eighth transistor T8 may depend on the threshold voltage Vth10 of the tenth transistor T10. That is, the initialization voltage applied to the gate electrode of the eighth transistor T8 may vary depending on the threshold voltage Vth10 of the tenth transistor T10.

In this case, because the initialization voltage applied to the gate electrode of the first transistor T1 and the initialization voltage applied to the gate electrode of the eighth transistor T8 may be different for each of the first sub-pixels RP, even if the same data voltage and the same first PAM data voltage are applied, the luminance may be different for each of the first sub-pixels RP, which may be recognized as a stain. Therefore, hereinafter, the structure in which the gate electrode of the first transistor T1 is initialized without depending on the threshold voltage Vth3 of the third transistor T3 and the gate electrode of the eighth transistor T8 is initialized without depending on the threshold voltage Vth10 of the tenth transistor T10 will be described in conjunction with FIG. 4.

Figure 4:
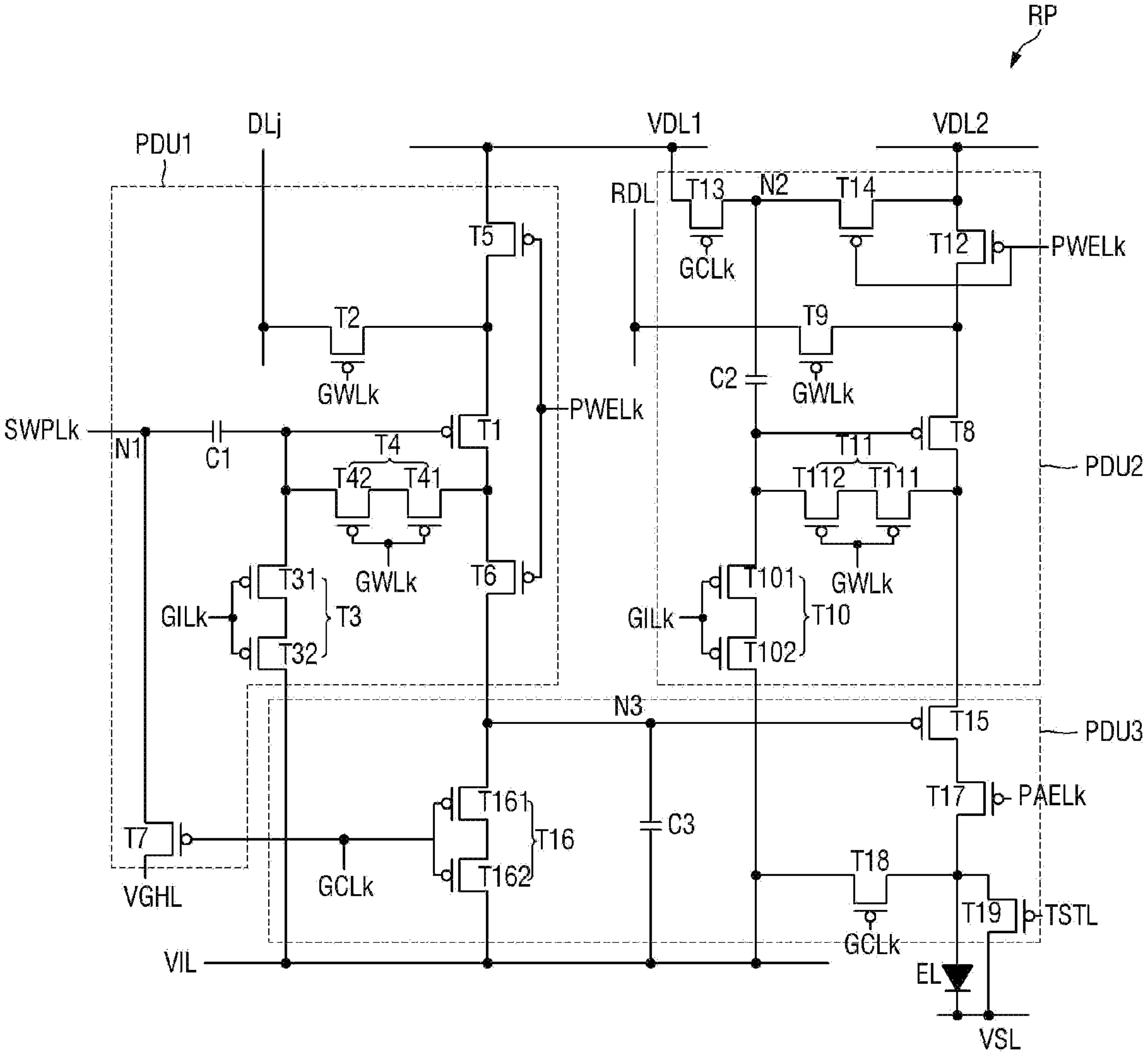
FIG. 4 is a circuit diagram illustrating a first sub-pixel according to one or more embodiments.

FIG. 4 is a circuit diagram illustrating a first sub-pixel according to one or more embodiments.

Referring to FIG. 4, the first sub-pixel RP according to one or more embodiments may be connected to the $k^{th}$ scan write line GWLk, the $k^{th}$ scan initialization line GILk, the $k^{th}$ scan control line GCLk, the $k^{th}$ sweep signal line SWPLk, the $k^{th}$ PWM emission line PWELk, and the $k^{th}$ PAM emission line PAELk. Further, the first sub-pixel RP may be connected to the $j^{th}$ data line DLj and the first PAM data line RDL. Further, the first sub-pixel RP may be connected to the first power line VDL1 to which the first power voltage VDD1 is applied, the second power line VDL2 to which the second power voltage VDD2 is applied, the third power line VSL to which the third power voltage VSS is applied, the initialization voltage line VIL to which the initialization voltage VINT is applied, and the gate-off voltage line VGHL to which the gate-off voltage VGH is applied. For simplicity of description, the $j^{th}$ data line DLj may be referred to as a first data line, and the first PAM data line RDL may be referred to as a second data line.

The first sub-pixel RP may include the light emitting element EL, the first pixel driver PDU1, the second pixel driver PDU2, and the third pixel driver PDU3.

The light emitting element EL emits light in response to a driving current Ids generated by the second pixel driver PDU2. The light emitting element EL may be disposed between the seventeenth transistor T17 and the third power line VSL. The first electrode of the light emitting element EL may be connected to the second electrode of the seventeenth transistor T17, and the second electrode thereof may be connected to the third power line VSL. The first electrode of the light emitting element EL may be an anode electrode and the second electrode thereof may be a cathode electrode. The light emitting element EL may be an inorganic light emitting element including a first electrode, a second electrode, and an inorganic semiconductor disposed between the first electrode and the second electrode. For example, the light emitting element EL may be a micro light emitting diode formed of an inorganic semiconductor, but is not limited thereto.

The first pixel driver PDU1 generates a control current Ic in response to a $j^{th}$ data voltage of the $j^{th}$ data line DLj to control the voltage of the third node N3 of the third pixel driver PDU3. Because the pulse width of the voltage applied to the first electrode of the light emitting element EL may be adjusted by the control current Ic of the first pixel driver PDU1, the first pixel driver PDU1 may be a pulse width modulation (PWM) unit for performing pulse width modulation of the voltage applied to the first electrode of the light emitting element EL.

The first pixel driver PDU1 may include the first to seventh transistors T1 to T7 and the first capacitor C1.

The first transistor T1 controls the control current Ic flowing between the second electrode and the first electrode in response to the data voltage applied to the gate electrode.

The second transistor T2 is turned-on by the $k^{th}$ scan write signal of the $k^{th}$ scan write line GWLk to supply the data voltage of the $j^{th}$ data line DLj to the first electrode of the first transistor T1. The gate electrode of the second transistor T2 may be connected to the $k^{th}$ scan write line GWLk, the first electrode thereof may be connected to the $j^{th}$ data line DLj, and the second electrode thereof may be connected to the first electrode of the first transistor T1.

The third transistor T3 is turned-on by a $k^{th}$ scan initialization signal of the $k^{th}$ scan initialization line GILk to connect the initialization voltage line VIL to the gate electrode of the first transistor T1. Accordingly, during the turn-on period of the third transistor T3, the gate electrode of the first transistor T1 may be discharged to the initialization voltage VINT of the initialization voltage line VIL. In this case, the gate-on voltage VGL of the $k^{th}$ scan initialization signal may be different from the initialization voltage VINT of the initialization voltage line VIL. For example, because the difference voltage between the gate-on voltage VGL and the initialization voltage VINT is greater than the threshold voltage of the third transistor T3, the third transistor T3 may be stably turned-on even after the initialization voltage VINT is applied to the gate electrode of the first transistor T1. Therefore, when the third transistor T3 is turned-on, the initialization voltage VINT may be stably applied to the gate electrode of the first transistor T1 regardless of the threshold voltage of the third transistor T3.

The third transistor T3 may include a plurality of transistors connected in series. For example, the third transistor T3 may include a first sub-transistor T31 and a second sub-transistor T32. Accordingly, it is possible to prevent the voltage of the gate electrode of the first transistor T1 from leaking through the third transistor T3. The gate electrode of the first sub-transistor T31 may be connected to the $k^{th}$ scan initialization line GILk, the first electrode thereof may be connected to the gate electrode of the first transistor T1, and the second electrode thereof may be connected to the first electrode of the second sub-transistor T32. The gate electrode of the second sub-transistor T32 may be connected to the $k^{th}$ scan initialization line GILk, the first electrode thereof may be connected to the second electrode of the first sub-transistor T31, and the second electrode thereof may be connected to the initialization voltage line VIL.

The fourth transistor T4 is turned-on by the $k^{th}$ scan write signal of the $k^{th}$ scan write line GWLk to connect the gate electrode and the second electrode of the first transistor T1. Accordingly, during the turn-on period of the fourth transistor T4, the first transistor T1 may operate as a diode (e.g., the first transistor T1 may be diode-connected).

The fourth transistor T4 may include a plurality of transistors connected in series. For example, the fourth transistor T4 may include a third sub-transistor T41 and a fourth sub-transistor T42. Accordingly, it is possible to prevent the voltage of the gate electrode of the first transistor T1 from leaking through the fourth transistor T4. The gate electrode of the third sub-transistor T41 may be connected to the $k^{th}$ scan write line GWLk, the first electrode thereof may be connected to the second electrode of the first transistor T1, and the second electrode thereof may be connected to the first electrode of the fourth sub-transistor T42. The gate electrode of the fourth sub-transistor T42 may be connected to the $k^{th}$ scan write line GWLk, the first electrode thereof may be connected to the second electrode of the third sub-transistor T41, and the second electrode thereof may be connected to the gate electrode of the first transistor T1.

The fifth transistor T5 is turned-on by the $k^{th}$ PWM emission signal of the $k^{th}$ PWM emission line PWELk to connect the first electrode of the first transistor T1 to the first power line VDL1. The gate electrode of the fifth transistor T5 may be connected to the $k^{th}$ PWM emission line PWELk, the first electrode thereof may be connected to the first power line VDL1, and the second electrode thereof may be connected to the first electrode of the first transistor T1.

The sixth transistor T6 is turned-on by the $k^{th}$ PWM emission signal of the $k^{th}$ PWM emission line PWELk to connect the second electrode of the first transistor T1 to the third node N3 of the third pixel driver PDU3. The gate electrode of the sixth transistor T6 may be connected to the $k^{th}$ PWM emission line PWELk, the first electrode thereof may be connected to the second electrode of the first transistor T1, and the second electrode thereof may be connected to the third node N3 of the third pixel driver PDU3.

The seventh transistor T7 is turned-on by the $k^{th}$ scan control signal of the $k^{th}$ scan control line GCLk to supply the gate-off voltage VGH of the gate-off voltage line VGHL to the first node N1 connected to the $k^{th}$ sweep signal line SWPLk. Accordingly, it is possible to prevent the change in the voltage of the gate electrode of the first transistor T1 from being reflected in the $k^{th}$ sweep signal of the $k^{th}$ sweep signal line SWPLk by the first capacitor C1 during the period in which the initialization voltage VINT is applied to the gate electrode of the first transistor T1 and the period in which the data voltage of the PI data line DLj and a threshold voltage Vth1 of the first transistor T1 are programmed. The gate electrode of the seventh transistor T7 may be connected to the $k^{th}$ scan control line GCLk, the first electrode thereof may be connected to the gate-off voltage line VGHL, and the second electrode thereof may be connected to the first node N1.

The first capacitor C1 may be disposed between the gate electrode of the first transistor T1 and the first node N1. One electrode of the first capacitor C1 may be connected to the gate electrode of the first transistor T1, and the other electrode thereof may be connected to the first node N1.

The first node N1 may be the contact point of the $k^{th}$ sweep signal line SWPLk, the second electrode of the seventh transistor T7, and the other electrode of the first capacitor C1.

The second pixel driver PDU2 generates the driving current Ids supplied to the light emitting element EL in response to the first PAM data voltage of the first PAM data line RDL. The second pixel driver PDU2 may be a pulse amplitude modulation (PAM) unit for performing pulse amplitude modulation. In this case, each of the first sub-pixels RP may be a constant current generator that receives the same first PAM data voltage and generates the same driving current Ids regardless of the luminance of the first sub-pixel RP.

The second pixel driver PDU2 may include eighth to fourteenth transistors T8 to T14 and a second capacitor C2.

The eighth transistor T8 controls the driving current Ids flowing to the light emitting element EL in response to the voltage applied to the gate electrode.

The ninth transistor T9 is turned-on by the $k^{th}$ scan write signal of the $k^{th}$ scan write line GWLk to supply the first PAM data voltage of the first PAM data line RDL to the first electrode of the eighth transistor T8. The gate electrode of the ninth transistor T9 may be connected to the $k^{th}$ scan write line GWLk, the first electrode thereof may be connected to the first PAM data line RDL, and the second electrode thereof may be connected to the first electrode of the eighth transistor T8.

The tenth transistor T10 is turned-on by the $k^{th}$ scan initialization signal of the $k^{th}$ scan initialization line GILk to connect the initialization voltage line VIL to the gate electrode of the eighth transistor T8. Accordingly, during the turn-on period of the tenth transistor T10, the gate electrode of the eighth transistor T8 may be discharged to the initialization voltage VINT of the initialization voltage line VIL. In this case, the gate-on voltage VGL of the $k^{th}$ scan initialization signal may be different from the initialization voltage VINT of the initialization voltage line VIL. For example, because the difference voltage between the gate-on voltage VGL and the initialization voltage VINT is greater than the threshold voltage of the tenth transistor T10, the tenth transistor T10 may be stably turned-on even after the initialization voltage VINT is applied to the gate electrode of the eighth transistor T8. Therefore, when the tenth transistor T10 is turned-on, the initialization voltage VINT may be stably applied to the gate electrode of the eighth transistor T8 regardless of the threshold voltage of the tenth transistor T10.

The tenth transistor T10 may include a plurality of transistors connected in series. For example, the tenth transistor T10 may include a fifth sub-transistor T101 and a sixth sub-transistor T102. Accordingly, the voltage of the gate electrode of the eighth transistor T8 may be prevented from leaking through the tenth transistor T10. The gate electrode of the fifth sub-transistor T101 may be connected to the $k^{th}$ scan initialization line GILk, the first electrode thereof may be connected to the gate electrode of the eighth transistor T8, and the second electrode thereof may be connected to the first electrode of the sixth sub-transistor T102. The gate electrode of the sixth sub-transistor T102 may be connected to the $k^{th}$ scan initialization line GILk, the first electrode thereof may be connected to the second electrode of the fifth sub-transistor T101, and the second electrode thereof may be connected to the initialization voltage line VIL.

The eleventh transistor T11 is turned-on by the $k^{th}$ scan write signal of the $k^{th}$ scan write line GWLk to connect the gate electrode and the second electrode of the eighth transistor T8. Accordingly, during the turn-on period of the eleventh transistor T11, the eighth transistor T8 may operate as a diode (e.g., the eighth transistor T8 may be diode-connected).

The eleventh transistor T11 may include a plurality of transistors connected in series. For example, the eleventh transistor T11 may include a seventh sub-transistor T111 and an eighth sub-transistor T112. Accordingly, it is possible to prevent the voltage of the gate electrode of the eighth transistor T8 from leaking through the eleventh transistor T11. The gate electrode of the seventh sub-transistor T111 may be connected to the $k^{th}$ scan write line GWLk, the first electrode thereof may be connected to the second electrode of the eighth transistor T8, and the second electrode thereof may be connected to the first electrode of the eighth sub-transistor T112. The gate electrode of the eighth sub-transistor T112 may be connected to the $k^{th}$ scan write line GWLk, the first electrode thereof may be connected to the second electrode of the seventh sub-transistor T111, and the second electrode thereof may be connected to the gate electrode of the eighth transistor T8.

The twelfth transistor T12 is turned-on by the $k^{th}$ PWM emission signal of the $k^{th}$ PWM emission line PWELk to connect the first electrode of the eighth transistor T8 to the second power line VDL2. The gate electrode of the twelfth transistor T12 may be connected to the $k^{th}$ PWM emission line PWELk, the first electrode thereof may be connected to the first power line VDL1, and the second electrode thereof may be connected to the first electrode of the eighth transistor T8.

The thirteenth transistor T13 is turned-on by the $k^{th}$ scan control signal of the $k^{th}$ scan control line GCLk to connect the first power line VDL1 to the second node N2. The gate electrode of the thirteenth transistor T13 may be connected to the $k^{th}$ scan control line GCLk, the first electrode thereof may be connected to the first power line VDL1, and the second electrode thereof may be connected to the second node N2.

The fourteenth transistor T14 is turned-on by the $k^{th}$ PWM emission signal of the $k^{th}$ PWM emission line PWELk to connect the second power line VDL2 to the second node N2. Accordingly, when the fourteenth transistor T14 is turned-on, the second power voltage VDD2 of the second power line VDL2 may be supplied to the second node N2. The gate electrode of the fourteenth transistor T14 may be connected to the $k^{th}$ PWM emission line PWELk, the first electrode thereof may be connected to the second power line VDL2, and the second electrode thereof may be connected to the second node N2.

The second capacitor C2 may be disposed between the gate electrode of the eighth transistor T8 and the second node N2. One electrode of the second capacitor C2 may be connected to the gate electrode of the eighth transistor T8, and the other electrode thereof may be connected to the second node N2.

The second node N2 may be the contact point of the second electrode of the thirteenth transistor T13, the second electrode of the fourteenth transistor T14, and the other electrode of the second capacitor C2.

The third pixel driver PDU3 adjusts the period in which the driving current Ids is supplied to the light emitting element EL depending on the voltage of the third node N3.

The third pixel driver PDU3 may include fifteenth to nineteenth transistors T15 to T19 and a third capacitor C3.

The fifteenth transistor T15 is turned-on or turned-off depending on the voltage of the third node N3. When the fifteenth transistor T15 is turned-on, the driving current Ids of the eighth transistor T8 may be supplied to the light emitting element EL, and when the fifteenth transistor T15 is turned-off, the driving current Ids of the eighth transistor T8 may not be supplied to the light emitting element EL. Therefore, the turn-on period of the fifteenth transistor T15 may be substantially the same as the emission period of the light emitting element EL. The gate electrode of the fifteenth transistor T15 may be connected to the third node N3, the first electrode thereof may be connected to the second electrode of the eighth transistor T8, and the second electrode thereof may be connected to the first electrode of the seventeenth transistor T17.

The sixteenth transistor T16 is turned-on by the $k^{th}$ scan control signal of the $k^{th}$ scan control line GCLk to connect the initialization voltage line VIL to the third node N3. Accordingly, during the turn-on period of the sixteenth transistor T16, the third node N3 may be discharged to the initialization voltage of the initialization voltage line VIL.

The sixteenth transistor T16 may include a plurality of transistors connected in series. For example, the sixteenth transistor T16 may include a ninth sub-transistor T161 and a tenth sub-transistor T162. Accordingly, it is possible to prevent the voltage of the third node N3 from leaking through the sixteenth transistor T16. The gate electrode of the ninth sub-transistor T161 may be connected to the $k^{th}$ scan control line GCLk, the first electrode thereof may be connected to the third node N3, and the second electrode thereof may be connected to the first electrode of the tenth sub-transistor T162. The gate electrode of the tenth sub-transistor T162 may be connected to the $k^{th}$ scan control line GCLk, the first electrode thereof may be connected to the second electrode of the ninth sub-transistor T161, and the second electrode thereof may be connected to the initialization voltage line VIL.

The seventeenth transistor T17 is turned-on by the $k^{th}$ PAM emission signal of the $k^{th}$ PAM emission line PAELk to connect the second electrode of the fifteenth transistor T15 to the first electrode of the light emitting element EL. The gate electrode of the seventeenth transistor T17 may be connected to the $k^{th}$ PAM emission line PAELk, the first electrode thereof may be connected to the second electrode of the fifteenth transistor T15, and the second electrode thereof may be connected to the first electrode of the light emitting element EL.

The eighteenth transistor T18 is turned-on by the $k^{th}$ scan control signal of the $k^{th}$ scan control line GCLk to connect the initialization voltage line VIL to the first electrode of the light emitting element EL. Accordingly, during the turn-on period of the eighteenth transistor T18, the first electrode of the light emitting element EL may be discharged to the initialization voltage of the initialization voltage line VIL. The gate electrode of the eighteenth transistor T18 may be connected to the $k^{th}$ scan control line GCLk, the first electrode thereof may be connected to the first electrode of the light emitting element EL, and the second electrode thereof may be connected to the initialization voltage line VIL.

The nineteenth transistor T19 is turned-on by the test signal of the test signal line TSTL to connect the first electrode of the light emitting element EL to the third power line VSL. The gate electrode of the nineteenth transistor T19 may be connected to the test signal line TSTL, the first electrode thereof may be connected to the first electrode of the light emitting element EL, and the second electrode thereof may be connected to the third power line VSL.

The third capacitor C3 may be disposed between the third node N3 and the initialization voltage line VIL. One electrode of the third capacitor C3 may be connected to the third node N3, and the other electrode thereof may be connected to the initialization voltage line VIL.

The third node N3 may be the contact point of the second electrode of the sixth transistor T6, the gate electrode of the fifteenth transistor T15, the first electrode of the ninth sub-transistor T161, and one electrode of the third capacitor C3.

Any one of the first electrode and the second electrode of each of the first to nineteenth transistors T1 to T19 may be a source electrode, and the other may be a drain electrode. The active layer of each of the first to nineteenth transistors T1 to T19 may be formed of any one of polysilicon, amorphous silicon, and an oxide semiconductor. When the active layer of each of the first to nineteenth transistors T1 to T19 is polysilicon, it may be formed by a low temperature poly silicon (LTPS) process.

Further, although FIG. 4 mainly describes the case in which each of the first to nineteenth transistors T1 to T19 is formed as the P-type MOSFET, the embodiment of the present specification is not limited thereto. For example, each of the first to nineteenth transistors T1 to T19 may be formed as the N-type MOSFET.

Figure 31:
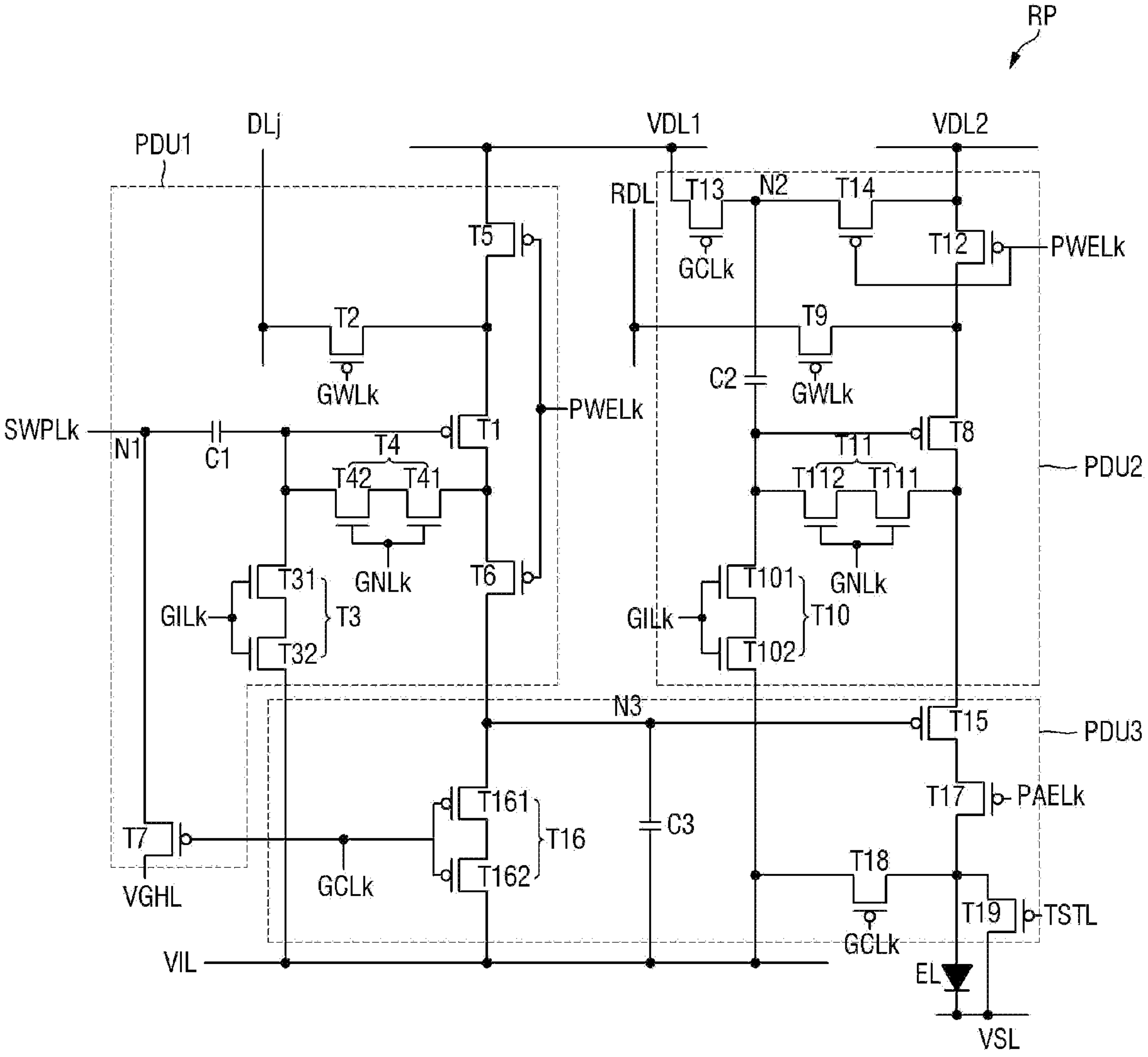
FIG. 31 is a circuit diagram illustrating a first sub-pixel according to one or more embodiments.

Alternatively, as shown in FIG. 31, in order to improve the black display capability of the light emitting element EL by blocking a leakage current, in the first sub-pixel RP, the first sub-transistor T31 and the second sub-transistor T32 of the third transistor T3, the third sub-transistor T41 and the fourth sub-transistor T42 of the fourth transistor T4, the fifth sub-transistor T101 and the sixth sub-transistor T102 of the tenth transistor T10, and the seventh sub-transistor T111 and the eighth sub-transistor T112 of the eleventh transistor T11 may be formed as the N-type MOSFET. In this case, the gate electrode of the third sub-transistor T41 and the gate electrode of the fourth sub-transistor T42 of the fourth transistor T4, and the gate electrode of the seventh sub-transistor T111 and the gate electrode of the eighth sub-transistor T112 of the eleventh transistor T11 may be connected to the $k^{th}$ control signal GNLk. The $k^{th}$ scan initialization signal GIk and the $k^{th}$ control signal GNLk may have a pulse generated by the gate-off voltage VGH. Further, the active layers of the first sub-transistor T31 and the second sub-transistor T32 of the third transistor T3, the third sub-transistor T41 and the fourth sub-transistor T42 of the fourth transistor T4, the fifth sub-transistor T101 and the sixth sub-transistor T102 of the tenth transistor T10, and the seventh sub-transistor T111 and the eighth sub-transistor T112 of the eleventh transistor T11 may be formed of an oxide semiconductor, and the active layers of the other transistors may be formed of polysilicon.

Alternatively, any one of the first sub-transistor T31 and the second sub-transistor T32 of the third transistor T3 may be formed as the N-type MOSFET and the other may be formed as the P-type MOSFET. In this case, between the first sub-transistor T31 and the second sub-transistor T32 of the third transistor T3, the transistor formed as the N-type MOSFET may be formed of an oxide semiconductor, and the transistor formed as the P-type MOSFET may be formed of polysilicon.

Alternatively, any one of the third sub-transistor T41 and the fourth sub-transistor T42 of the fourth transistor T4 may be formed as the N-type MOSFET, and the other may be formed as the P-type MOSFET. In this case, between the third sub-transistor T41 and the fourth sub-transistor T42 of the fourth transistor T4, the transistor formed as the N-type MOSFET may be formed of an oxide semiconductor, and the transistor formed as the P-type MOSFET may be formed of polysilicon.

Alternatively, any one of the fifth sub-transistor T101 and the sixth sub-transistor T102 of the tenth transistor T10 may be formed as the N-type MOSFET, and the other may be formed as the P-type MOSFET. In this case, between the fifth sub-transistor T101 and the sixth sub-transistor T102 of the tenth transistor T10, the transistor formed as the N-type MOSFET may be formed of an oxide semiconductor, and the transistor formed as the P-type MOSFET may be formed of polysilicon.

Alternatively, any one of the seventh sub-transistor T111 and the eighth sub-transistor T112 of the eleventh transistor T11 may be formed as the N-type MOSFET, and the other may be formed as the P-type MOSFET. In this case, between the seventh sub-transistor T111 and the eighth sub-transistor T112 of the eleventh transistor T11, the transistor formed as the N-type MOSFET may be formed of an oxide semiconductor, and the transistor formed as the P-type MOSFET may be formed of polysilicon.

The second sub-pixel GP and the third sub-pixel BP may be substantially the same as the first sub-pixel RP described in conjunction with FIGS. 4 and 31. Therefore, the description of the second sub-pixel GP and the third sub-pixel BP will be omitted.

Figure 5:
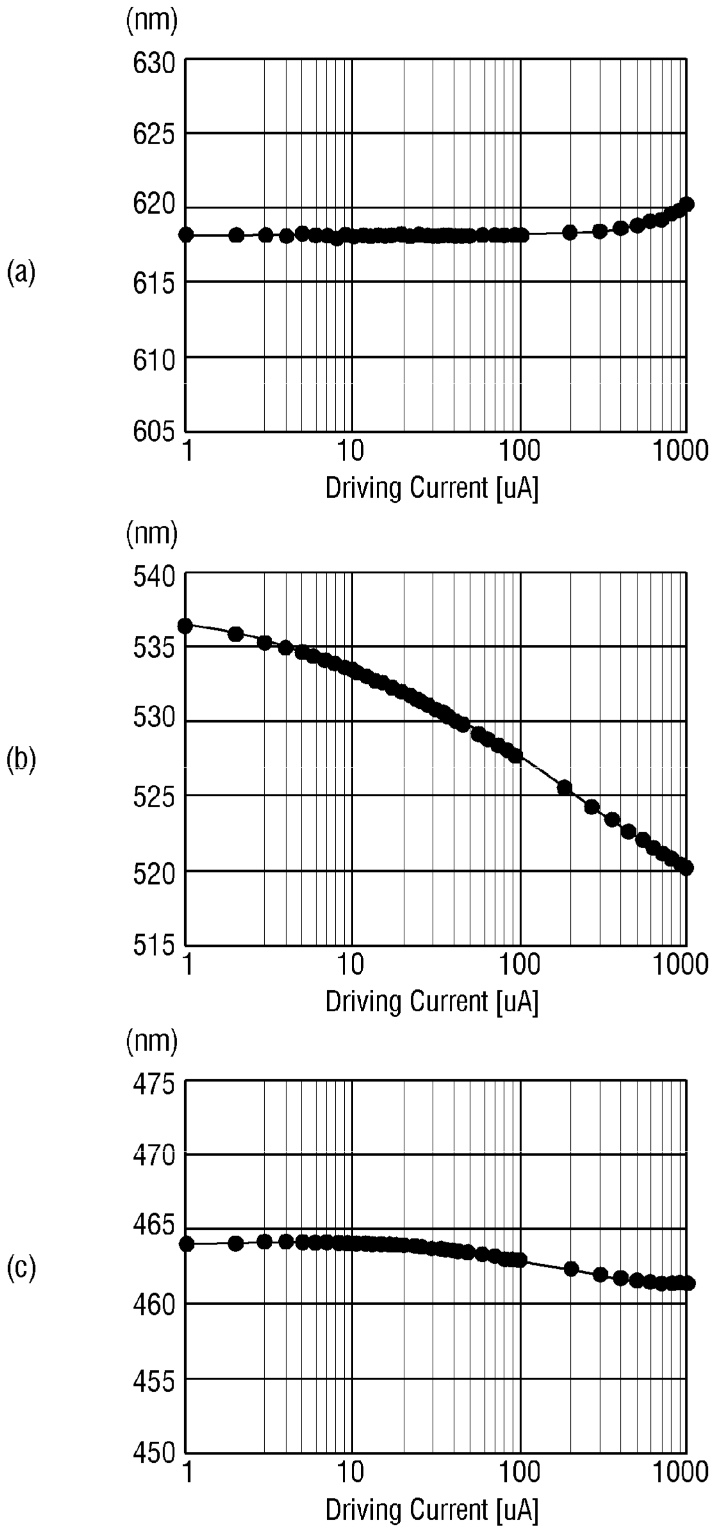
FIG. 5 shows graphs illustrating the wavelength of light emitted from the light emitting element of a first sub-pixel, the wavelength of light emitted from the light emitting element of a second sub-pixel, and the wavelength of light emitted from the light emitting element of a third sub-pixel in response to a driving current according to one or more embodiments, respectively.

FIG. 5 shows graphs illustrating the wavelength of light emitted from the light emitting element of a first sub-pixel, the wavelength of light emitted from the light emitting element of a second sub-pixel, and the wavelength of light emitted from the light emitting element of a third sub-pixel in response to a driving current according to one or more embodiments, respectively.

In FIG. 5, (a) shows the wavelength of the light emitted from the light emitting element EL of the first sub-pixel RP in response to the driving current Ids applied to the light emitting element EL of the first sub-pixel RP in the case where the light emitting element EL of the first sub-pixel RP includes an inorganic material, e.g., GaN. In FIG. 5, (b) shows the wavelength of the light emitted from the light emitting element EL of the second sub-pixel GP in response to the driving current Ids applied to the light emitting element EL of the second sub-pixel GP in the case where the light emitting element EL of the second sub-pixel GP includes an inorganic material, e.g., GaN. In FIG. 5, (c) shows the wavelength of the light emitted from the light emitting element EL of the third sub-pixel BP in response to the driving current Ids applied to the light emitting element EL of the third sub-pixel BP in the case where the light emitting element EL of the third sub-pixel BP includes an inorganic material, e.g., GaN. In each of the graphs of FIGS. 5(*a*) to 5(*c*), the X-axis represents the driving current Ids, and the Y-axis represents the wavelength of the light emitted from the light emitting element.

Referring to FIG. 5, when the driving current Ids applied to the light emitting element EL of the first sub-pixel RP is 1 μA to 300 μA, the wavelength of the light emitted from the light emitting element EL of the first sub-pixel RP is constant at about 618 nm. As the driving current Ids applied to the light emitting element EL of the first sub-pixel RP increases from 300 μA to 1000 μA, the wavelength of the light emitted from the light emitting element EL of the first sub-pixel RP increases from about 618 nm to about 620 nm.

As the driving current Ids applied to the light emitting element EL of the second sub-pixel GP increases from 1 μA to 1000 μA, the wavelength of the light emitted from the light emitting element EL of the second sub-pixel GP decreases from about 536 nm to about 520 nm.

As the driving current Ids applied to the light emitting element EL of the third sub-pixel BP increases from 1 μA to 1000 μA, the wavelength of the light emitted from the light emitting element EL of the third sub-pixel BP decreases from about 464 nm to about 461 nm.

In summary, the wavelength of the light emitted from the light emitting element EL of the first sub-pixel RP and the wavelength of the light emitted from the light emitting element EL of the third sub-pixel BP are hardly changed even when the driving current Ids is changed. On the contrary, the wavelength of the light emitted from the light emitting element EL of the second sub-pixel GP is in inverse proportion to the driving current Ids. Therefore, in the case of adjusting the driving current Ids applied to the light emitting element EL of the second sub-pixel GP, the wavelength of the light emitted from the light emitting element EL of the second sub-pixel GP may be changed, and the color coordinates of the image displayed by the display panel 100 may be changed.

Figure 6:
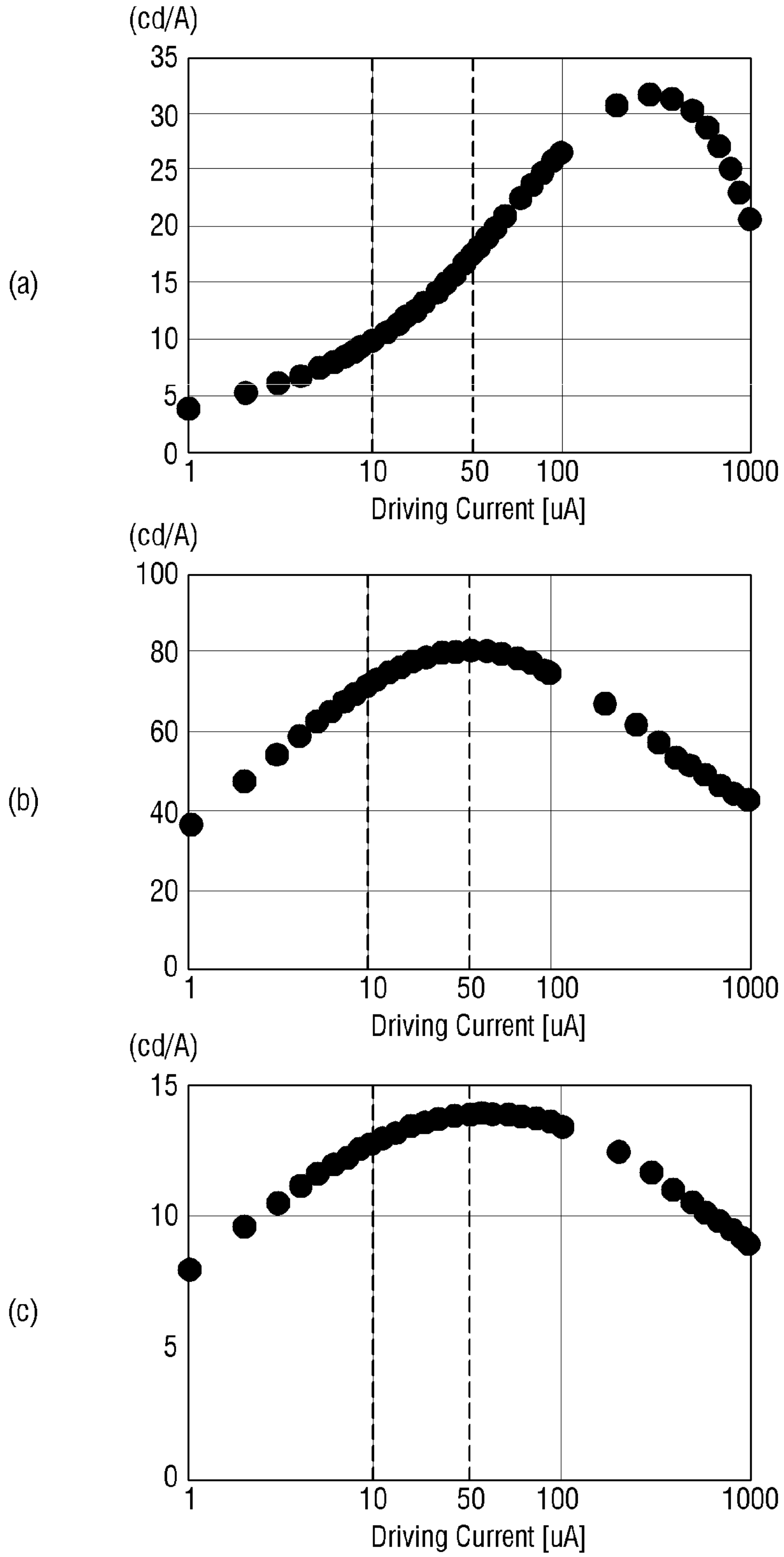
FIG. 6 shows graphs illustrating the luminous efficiency of the light emitting element of a first sub-pixel, the luminous efficiency of the light emitting element of a second sub-pixel, and the luminous efficiency of the light emitting element of a third sub-pixel in response to a driving current according to one or more embodiments, respectively.

FIG. 6 shows graphs illustrating the luminous efficiency of the light emitting element of a first sub-pixel, the luminous efficiency of the light emitting element of a second sub-pixel, and the luminous efficiency of the light emitting element of a third sub-pixel in response to a driving current according to one or more embodiments, respectively.

In FIG. 6, (a) illustrates the luminous efficiency of the light emitting element EL of the first sub-pixel RP in response to the driving current Ids applied to the light emitting element EL of the first sub-pixel RP in the case where the light emitting element EL of the first sub-pixel RP is formed of an inorganic material, (b) illustrates the luminous efficiency of the light emitting element EL of the second sub-pixel GP in response to the driving current Ids applied to the light emitting element EL of the second sub-pixel GP in the case where the light emitting element EL of the second sub-pixel GP is formed of an inorganic material, and (c) illustrates the luminous efficiency of the light emitting element EL of the third sub-pixel BP in response to the driving current Ids applied to the light emitting element EL of the third sub-pixel BP in the case where the light emitting element EL of the third sub-pixel BP is formed of an inorganic material.

Referring to FIG. 6, when the driving current Ids applied to the light emitting element EL of the first sub-pixel RP is 10 μA, the luminous efficiency of the light emitting element EL of the first sub-pixel RP is approximately 8.5 cd/A. When the driving current Ids applied to the light emitting element EL of the first sub-pixel RP is 50 μA, the luminous efficiency of the light emitting element EL of the first sub-pixel RP is approximately 18 cd/A. That is, when the driving current Ids applied to the light emitting element EL of the first sub-pixel RP is 50 μA, the luminous efficiency of the light emitting element EL of the first sub-pixel RP is increased by approximately 2.1 times compared to when it is 10 μA.

When the driving current Ids applied to the light emitting element EL of the second sub-pixel GP is 10 μA, the luminous efficiency of the light emitting element EL of the second sub-pixel GP is approximately 72 cd/A. When the driving current Ids applied to the light emitting element EL of the second sub-pixel GP is 50 μA, the luminous efficiency of the light emitting element EL of the second sub-pixel GP is approximately 80 cd/A. That is, when the driving current Ids applied to the light emitting element EL of the second sub-pixel GP is 50 μA, the luminous efficiency of the light emitting element EL of the second sub-pixel GP is increased by approximately 1.1 times compared to when it is 10 μA.

When the driving current Ids applied to the light emitting element EL of the third sub-pixel BP is 10 μA, the luminous efficiency of the light emitting element EL of the third sub-pixel BP is approximately 14 cd/A. When the driving current Ids applied to the light emitting element EL of the third sub-pixel BP is 50 μA, the luminous efficiency of the light emitting element EL of the third sub-pixel BP is approximately 13.2 cd/A. That is, when the driving current Ids applied to the light emitting element EL of the third sub-pixel BP is 50 μA, the luminous efficiency of the light emitting element EL of the third sub-pixel BP is increased by approximately 1.06 times compared to when it is 10 μA.

In summary, the luminous efficiency of the light emitting element of the first sub-pixel RP, the luminous efficiency of the light emitting element of the second sub-pixel GP, and the luminous efficiency of the third sub-pixel BP may vary depending on the driving current Ids.

As shown in FIGS. 5 and 6, when the driving current Ids applied to the light emitting element EL of the second sub-pixel GP is adjusted, the color coordinates of the image displayed by the display panel 100 may vary. Further, the luminous efficiency of the light emitting element of the first sub-pixel RP, the luminous efficiency of the light emitting element of the second sub-pixel GP, and the luminous efficiency of the third sub-pixel BP may vary depending on the driving current Ids. Therefore, it is required to maintain the color coordinates of the image displayed by the display panel 100 at a constant value, and to fix the driving current Ids so that the light emitting element EL of the first sub-pixel RP, the light emitting element EL of the second sub-pixel GP, and the light emitting element EL of the third sub-pixel BP have an optimal luminous efficiency.

Therefore, as shown in FIG. 4, in the first sub-pixel RP, it is possible to adjust the luminance of the light emitted from the light emitting element EL by providing the driving current Ids to the light emitting element EL so that the light emitting element EL of the first sub-pixel RP is driven with the optimal luminous efficiency in response to the first PAM data voltage of the first PAM data line RDL and by adjusting the duty ratio of the light emitting element EL, i.e., the emission period of the light emitting element EL. Further, in the second sub-pixel GP, it is possible to adjust the luminance of the light emitted from the light emitting element EL by providing the driving current Ids to the light emitting element EL so that the light emitting element EL of the second sub-pixel GP is driven with the optimal luminous efficiency in response to the second PAM data voltage of the second PAM data line GDL and by adjusting the duty ratio of the light emitting element EL, i.e., the emission period of the light emitting element EL. Further, in the third sub-pixel BP, it is possible to adjust the luminance of the light emitted from the light emitting element EL by providing the driving current Ids to the light emitting element EL so that the light emitting element EL of the third sub-pixel BP is driven with the optimal luminous efficiency in response to the third PAM data voltage of the third PAM data line BDL and by adjusting the duty ratio of the light emitting element EL, i.e., the emission period of the light emitting element EL.

Therefore, it is possible to reduce or prevent deterioration of an image quality due to the change in the wavelength of the emitted light depending on the driving current applied to the light emitting element EL. Further, each of the light emitting element EL of the first sub-pixel RP, the light emitting element EL of the second sub-pixel GP, and the light emitting element EL of the third sub-pixel BP may emit light with the optimal luminous efficiency.

Figure 7:
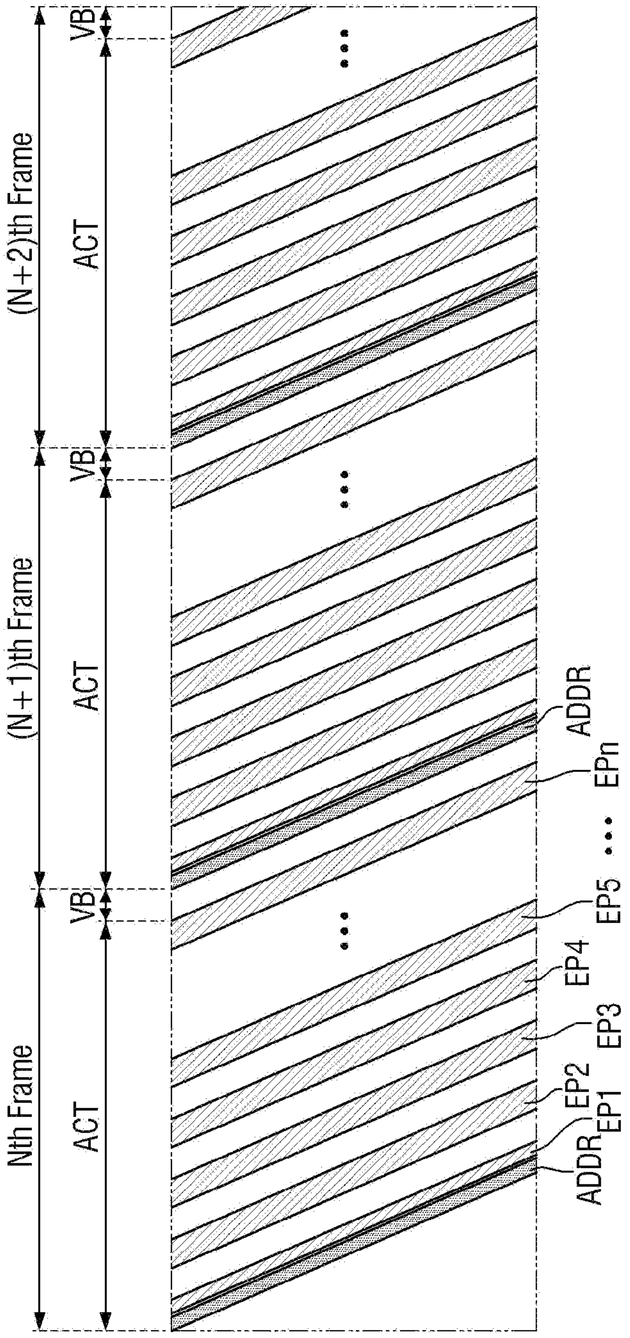
FIG. 7 shows one example of the operation of a display device during $N^{th}$ to $(N+2)^{th}$ frame periods.

FIG. 7 shows one example of the operation of a display device during $N^{th}$ to $(N+2)^{th}$ frame periods.

Referring to FIG. 7, each of the $N^{th}$ to $(N+2)^{th}$ frame periods may include an active period ACT and a blank period VB. The active period ACT may include a data address period ADDR in which a data voltage and red/green/blue PAM data voltages are supplied to each of the first to third sub-pixels RP, GP, and BP, and a plurality of emission periods EP1, EP2, EP3, EP4, EP5, . . . , EPn in which the light emitting element EL of each of the sub-pixels SP emits light. The blank period VB may be the period in which the sub-pixels RP, GP, and BP of the display panel 100 are idle without performing any operation.

The address period ADDR and a first emission period EP1 may be about 5 horizontal periods, and each of second to $n^{th}$ emission periods EP2, EP3, EP4, EP5, . . . , EPn may be about 12 horizontal periods, but one or more embodiments of the present specification is not limited thereto. Further, the active period ACT may include 25 emission periods, but the number of emission periods EP1, EP2, EP3, EP4, EP5, . . . , EPn of the active period ACT is not limited thereto.

The data voltage and the red/green/blue PAM data voltages may be sequentially inputted to the sub-pixels RP, GP, and BP of the display panel 100 for each row line during the address period ADDR. For example, the data voltage and the red/green/blue PAM data voltages may be sequentially inputted to the sub-pixels RP, GP, and BP in the order from the sub-pixels RP, GP, and BP disposed on a first row line to the sub-pixels RP, GP, and BP disposed on an $n^{th}$ row line, which is the last row line.

The sub-pixels RP, GP, and BP of the display panel 100 may sequentially emit light for each row line in each of the plurality of emission periods EP1, EP2, EP3, EP4, EP5, . . . , EPn. For example, the sub-pixels RP, GP, and BP may sequentially emit light in the order from the sub-pixels RP, GP, and BP disposed on the first row line to the sub-pixels RP, GP, and BP disposed on the last row line.

Figure 8:
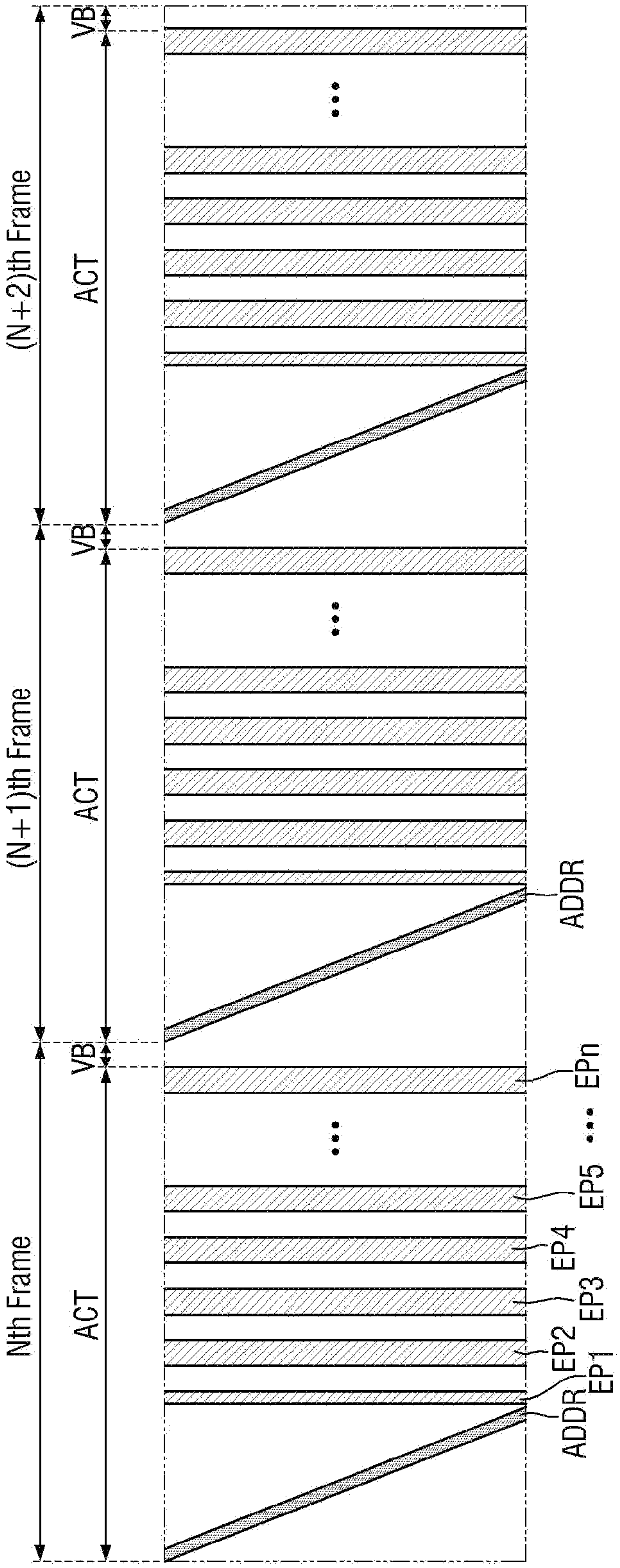
FIG. 8 shows an example of the operation of the display device during the $N^{th}$ to $(N+2)^{th}$ frame periods.

FIG. 8 shows another example of the operation of the display device during the $N^{th}$ to $(N+2)^{th}$ frame periods.

The embodiment of FIG. 8 is different from the embodiment of FIG. 7 only in that the sub-pixels RP, GP, and BP of the display panel 100 concurrently (or simultaneously) emit light in each of the plurality of emission periods EP1, EP2, EP3, EP4, EP5, . . . , EPn, so that the description of the embodiment of FIG. 8 will be omitted.

Figure 9:
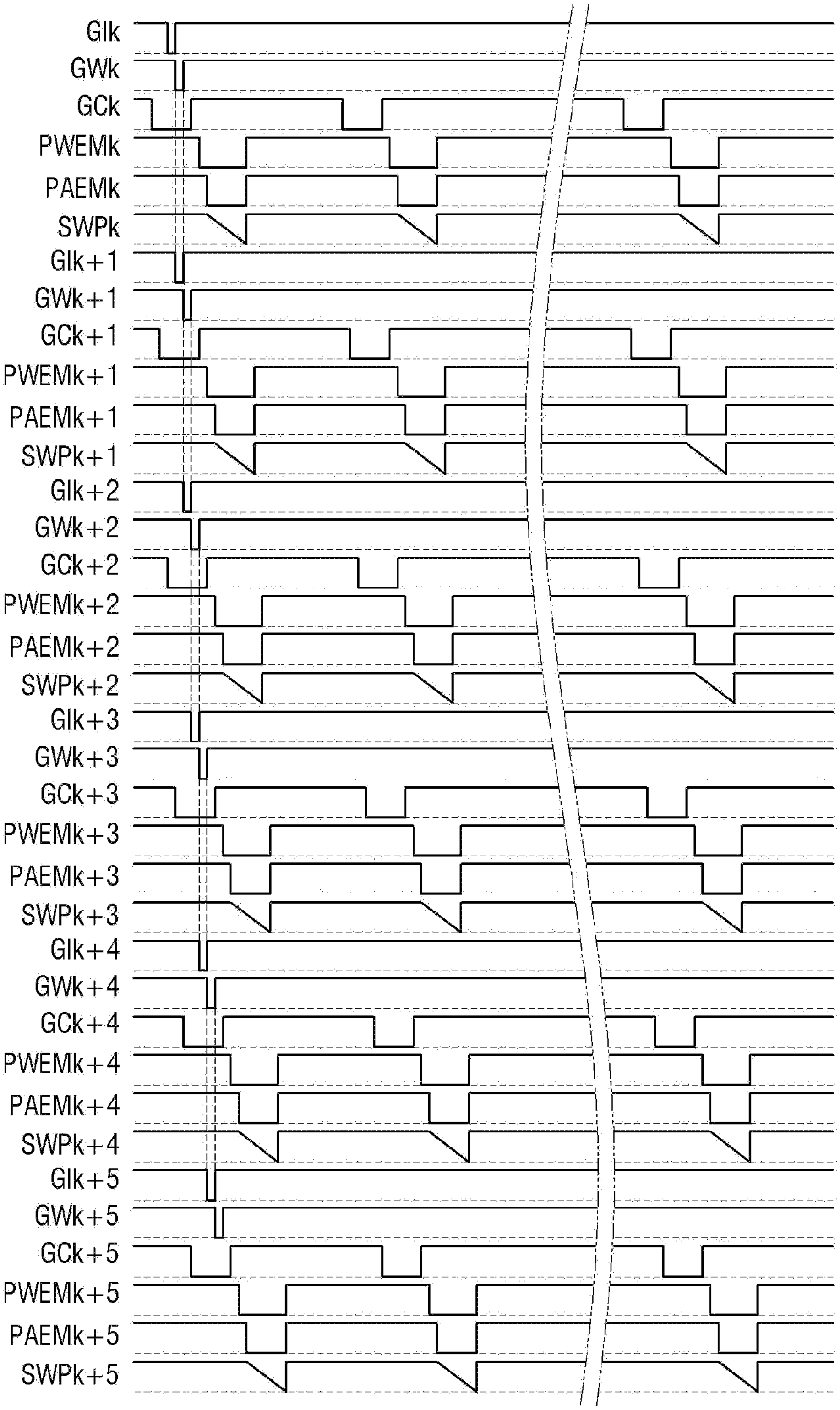
FIG. 9 is a waveform diagram showing a scan initialization signal, a scan write signal, a scan control signal, a PWM emission signal, a PAM emission signal, and a sweep signal applied to sub-pixels disposed on $k^{th}$ to $(k+5)^{th}$ row lines in the $N^{th}$ frame period.

FIG. 9 is a waveform diagram showing a scan initialization signal, a scan write signal, a scan control signal, a PWM emission signal, a PAM emission signal, and a sweep signal applied to sub-pixels disposed on $k^{th}$ to $(k+5)^{th}$ row lines in the $N^{th}$ frame period.

Referring to FIG. 9, the sub-pixels RP, GP, and BP disposed on the $k^{th}$ row line indicate the sub-pixels RP, GP, and BP connected to the $k^{th}$ scan initialization line GILk, the $k^{th}$ scan write line GWLk, the $k^{th}$ scan control line GCLk, the $k^{th}$ PWM emission line PWELk, the $k^{th}$ PAM emission line PAELk, and the $k^{th}$ sweep signal line SWPLk. The $k^{th}$ scan initialization signal GIk indicates the signal applied to the $k^{th}$ scan initialization line GILk, and the $k^{th}$ scan write signal GWk indicates the signal applied to the $k^{th}$ scan write line GWLk. A $k^{th}$ scan control signal GCk indicates the signal applied to the $k^{th}$ scan control line GCLk, and the $k^{th}$ PWM emission signal PWEMk indicates the signal applied to the $k^{th}$ PWM emission line PWELk. The $k^{th}$ PAM emission signal PAEMk indicates the signal applied to the $k^{th}$ PAM emission line PAELk, and the $k^{th}$ sweep signal SWPk indicates the signal applied to the $k^{th}$ sweep signal line SWPLk.

Scan initialization signals GIk to GIk+5, scan write signals GWk to GWk+5, scan control signals GCk to GCk+5, PWM emission signals PWEMk to PAEMk+5, PAM emission signals PAEMk to PAEMk+5, and sweep signals SWPk to SWPk+5 may be sequentially shifted by one horizontal period (1H). The $k^{th}$ scan write signal GWk may be the signal obtained by shifting the $k^{th}$ scan initialization signal GIk by one horizontal period, and a $(k+1)^{th}$ scan write signal GWk+1 may be the signal obtained by shifting a $(k+1)^{th}$ scan initialization signal GIk+1 by one horizontal period. In this case, because the $(k+1)^{th}$ scan initialization signal GIk+1 is the signal obtained by shifting the $k^{th}$ scan initialization signal GIk by one horizontal period, the $k^{th}$ scan write signal GWk and the $(k+1)^{th}$ scan initialization signal GIk+1 may be substantially the same.

Figure 10:
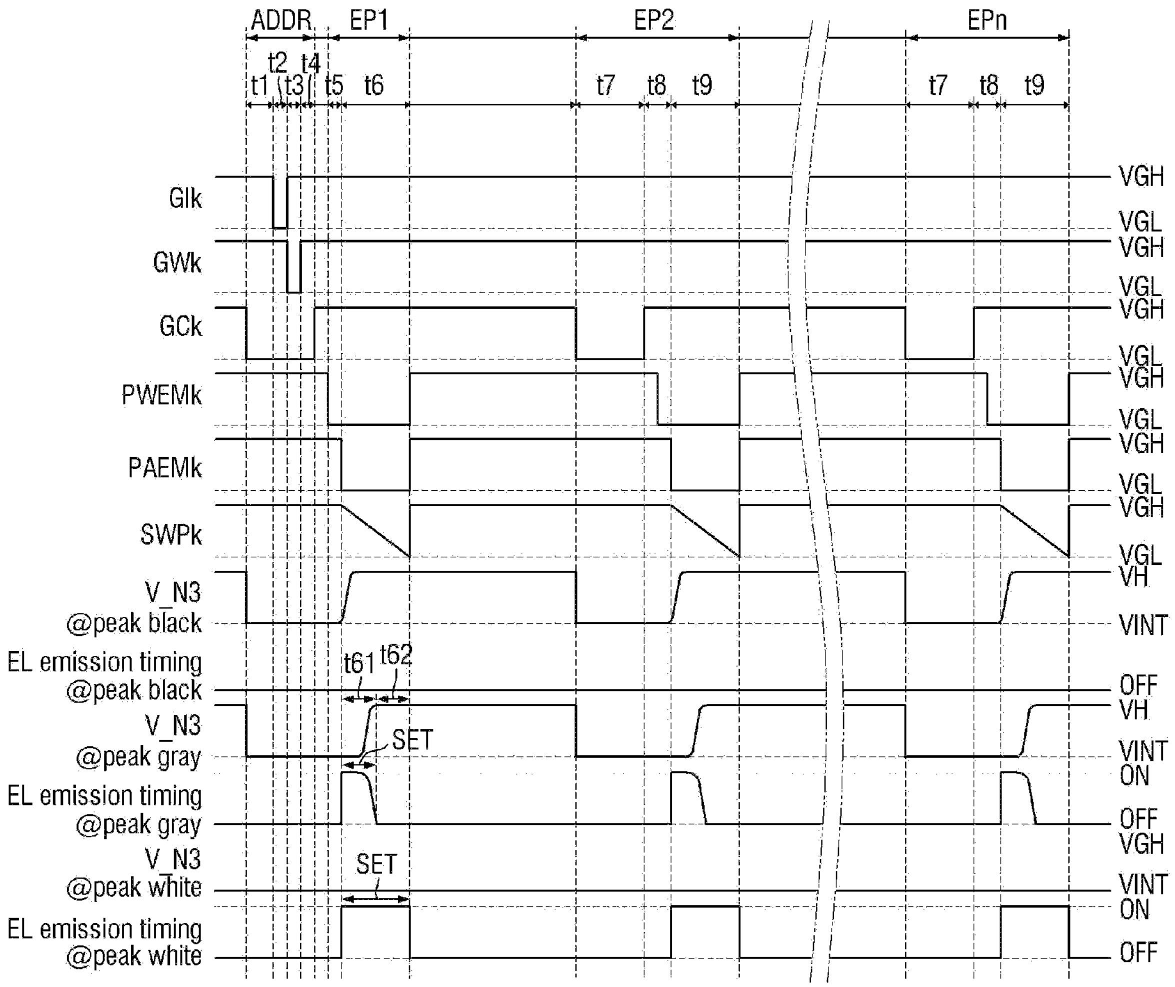
FIG. 10 is a waveform diagram showing the $k^{th}$ scan initialization signal, the $k^{th}$ scan write signal, the $k^{th}$ scan control signal, the $k^{th}$ PWM emission signal, the $k^{th}$ PAM emission signal, the $k^{th}$ sweep signal, the voltage of the third node of the first sub-pixel, and the emission period of a light emitting element in the $N^{th}$ frame period.

FIG. 10 is a waveform diagram showing the $k^{th}$ scan initialization signal GIk, the $k^{th}$ scan write signal GWk, the $k^{th}$ scan control signal GCk, the $k^{th}$ PWM emission signal PWEMk, the $k^{th}$ PAM emission signal PAEMk, the $k^{th}$ sweep signal SWPk, the voltage of the third node of the first sub-pixel V_N3, and the emission period of a light emitting element in the $N^{th}$ frame period.

Referring to FIG. 10, the $k^{th}$ scan initialization signal GIk is the signal for controlling turn-on and turn-off of the third transistor T3 and the tenth transistor T10 of each of the sub-pixels RP, GP, and BP. The $k^{th}$ scan write signal GWk is the signal for controlling turn-on and turn-off of the second, fourth, ninth, and eleventh transistors T2, T4, T9, and T11 of each of the sub-pixels RP, GP, and BP. The $k^{th}$ scan control signal GCk is the signal for controlling turn-on and turn-off of the seventh, thirteenth, sixteenth, and eighteenth transistors T7, T13, T16, and T18 of each of the sub-pixels RP, GP, and BP. The $k^{th}$ PWM emission signal PWEMk is the signal for controlling turn-on and turn-off of the fifth, sixth, twelfth, and fourteenth transistors T5, T6, T12, and T14. The $k^{th}$ PAM emission signal PAEMk is the signal for controlling turn-on and turn-off of the seventeenth transistor T17. The $k^{th}$ scan initialization signal GIk, the $k^{th}$ scan write signal GWk, the $k^{th}$ scan control signal GCK, the $k^{th}$ PWM emission signal, the $k^{th}$ PAM emission signal PWEMk, and the $k^{th}$ sweep signal SWPk may be generated at a cycle of one frame period.

The data address period ADDR includes first to fourth periods t1 to t4. The first period t1 and the fourth period t4 are a first initialization period for initializing the first electrode of the light emitting element EL and the voltage of the third node N3. The second period t2 is a second initialization period for initializing the gate electrode of the first transistor T1 and the gate electrode of the eighth transistor T8. The third period t3 is the period for sampling a data voltage Vdata of the $j^{th}$ data line DLj and the threshold voltage Vth1 of the first transistor T1 at the gate electrode of the first transistor T1 and sampling a first PAM data voltage RVdata of the first PAM data line RDL and a threshold voltage Vth8 of the eighth transistor T8 at the gate electrode of the eighth transistor T8.

The first emission period EP1 includes a fifth period t5 and a sixth period t6. The fifth period t5 is the period for applying the control current Ic to the third node N3, and the sixth period t6 is the period for controlling the turn-on period of the fifteenth transistor T15 depending on the control current Ic and supplying the driving current Ids to the light emitting element EL.

Each of the second to $n^{th}$ emission periods EP2 to EPn includes seventh to ninth periods t7 to t9. The seventh period t7 is a third initialization period for initializing the third node N3, the eighth period t8 is substantially the same as the fifth period t5, and the ninth period t9 is substantially the same as the sixth period t6.

Among the first to $n^{th}$ emission periods EP1 to EPn, emission periods adjacent to each other may be spaced from each other by about several to several tens of horizontal periods.

The $k^{th}$ scan initialization signal GIk may have the gate-on voltage VGL during the second period t2, and may have the gate-off voltage VGH during the remaining periods. The $k^{th}$ scan write signal GWk may have the gate-on voltage VGL during the third period t3, and may have the gate-off voltage VGH during the remaining periods. The $k^{th}$ scan control signal GCk may have the gate-on voltage VGL during the first to fourth periods t1 to t4 and the seventh period t7, and may have the gate-off voltage VGH during the remaining periods. The gate-off voltage VGH may be the voltage having a level higher than that of the gate-on voltage VGL.

The $k^{th}$ PWM emission signal PWEMk may have the gate-on voltage VGL during the fifth and sixth periods t5 and t6 and the eighth and ninth periods t8 and t9, and may have the gate-off voltage VGH during the remaining periods. The $k^{th}$ PAM emission signal PAEMk may have the gate-on voltage VGL during the sixth period t6 and the ninth period t9, and may have the gate-off voltage VGH during the remaining periods.

The $k^{th}$ sweep signal SWPk may have a triangular wave pulse during the sixth period t6 and the ninth period t9, and may have the gate-off voltage VGH during the remaining periods. For example, the $k^{th}$ sweep signal SWPk may have a triangular wave pulse that linearly decreases from the gate-off voltage VGH to the gate-on voltage Von during the sixth period t6, and increases from the gate-on voltage Von to the gate-off voltage Voff at the end of the sixth period t6.

FIGS. 11 to 14 are circuit diagrams illustrating the operation of the first sub-pixel during the first period, the second period, the third period, and the sixth period.

Hereinafter, the operation of the first sub-pixel RP during the first to ninth periods t1 to t9 will be described in detail in conjunction with FIGS. 10 to 15.

Figure 11:
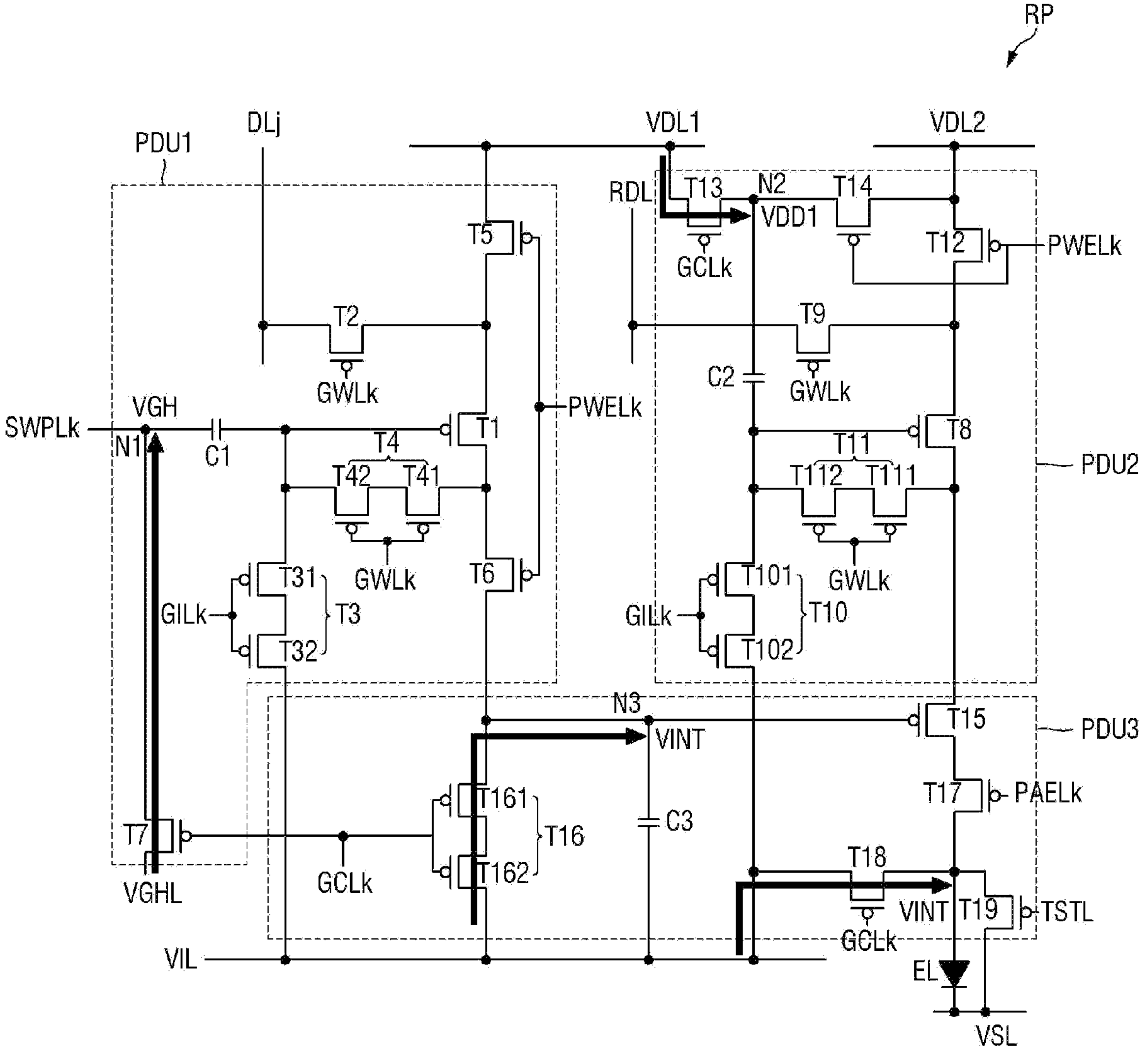
FIGS. 11 to 14 are circuit diagrams illustrating the operation of the first sub-pixel during the first period to the eighth period.

First, during the first period t1, as shown in FIG. 11, the seventh transistor T7, the thirteenth transistor T13, the sixteenth transistor T16, and the eighteenth transistor T18 are turned-on by the $k^{th}$ scan control signal GCk of the gate-on voltage VGL.

Due to the turn-on of the seventh transistor T7, the gate-off voltage VGH of the gate-off voltage line VGHL is applied to the first node N1. Due to the turn-on of the thirteenth transistor T13, the first power voltage VDD1 of the first power line VDL1 is applied to the second node N2.

Due to the turn-on of the sixteenth transistor T16, the third node N3 is initialized to the initialization voltage VINT of the initialization voltage line VIL. Due to the turn-on of the eighteenth transistor T18, the first electrode of the light emitting element EL is initialized to the initialization voltage VINT of the initialization voltage line VIL.

Figure 12:
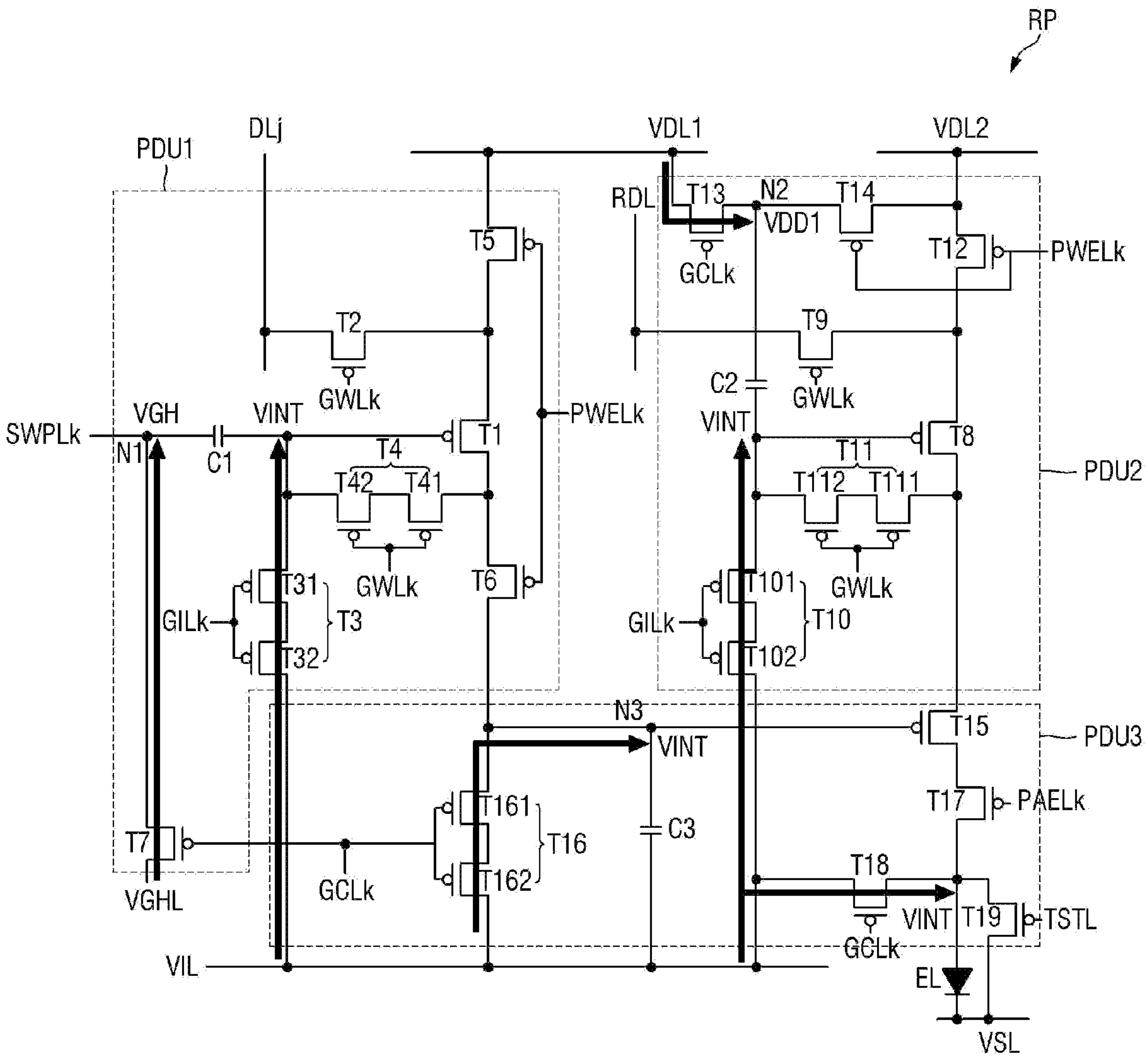

Second, during the second period t2, as shown in FIG. 12, the seventh transistor T7, the thirteenth transistor T13, the sixteenth transistor T16, and the eighteenth transistor T18 are turned-on by the $k^{th}$ scan control signal GCk of the gate-on voltage VGL. Further, during the second period t2, the third transistor T3 and the tenth transistor T10 are turned-on by the $k^{th}$ scan initialization signal GIk of the gate-on voltage VGL.

The seventh transistor T7, the thirteenth transistor T13, the sixteenth transistor T16, and the eighteenth transistor T18 are substantially the same as those described in the first period t1.

Due to the turn-on of the third transistor T3, the gate electrode of the first transistor T1 is initialized to the initialization voltage VINT of the initialization voltage line VIL. Further, due to the turn-on of the tenth transistor T10, the gate electrode of the eighth transistor T8 is initialized to the initialization voltage VINT of the initialization voltage line VIL.

At this time, because the gate-off voltage VGH of the gate-off voltage line VGHL is applied to the first node N1, it is possible to prevent variation in the gate-off voltage VGH of the $k^{th}$ sweep signal SWPk due to the reflection of voltage variation of the gate electrode of the first transistor T1 in the $k^{th}$ sweep signal line SWPLk by the first capacitor C1.

Figure 13:
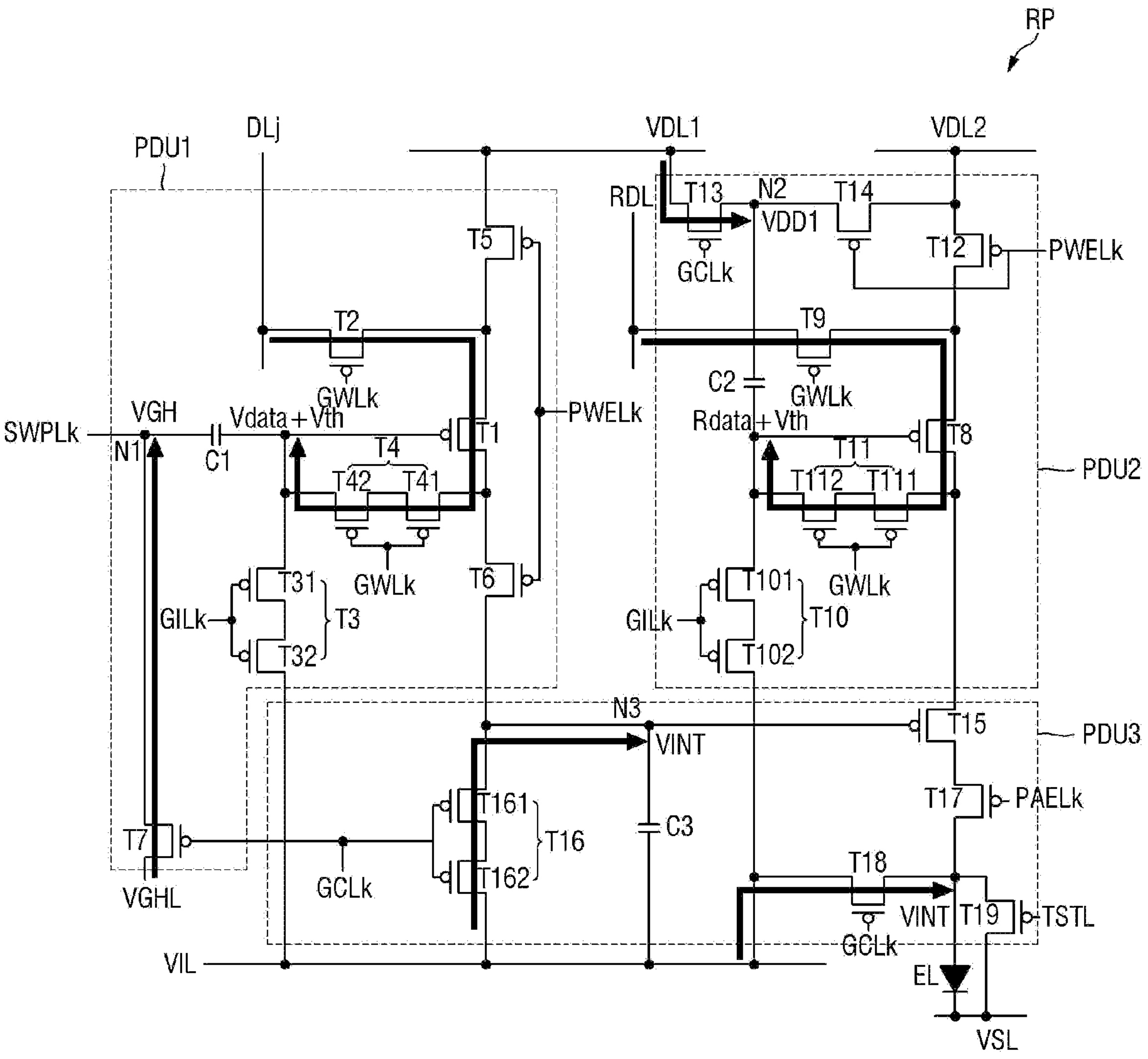

Third, during the third period t3, as shown in FIG. 13, the seventh transistor T7, the thirteenth transistor T13, the sixteenth transistor T16, and the eighteenth transistor T18 are turned-on by the $k^{th}$ scan control signal GCk of the gate-on voltage VGL. Further, during the third period t3, the second transistor T2, the fourth transistor T4, the ninth transistor T9, and the eleventh transistor T11 are turned-on by the $k^{th}$ scan write signal GWLk of the gate-on voltage VGL.

The seventh transistor T7, the thirteenth transistor T13, the sixteenth transistor T16, and the eighteenth transistor T18 are substantially the same as those described in the first period t1.

Due to the turn-on of the second transistor T2, the data voltage Vdata of the $j^{th}$ data line DLj is applied to the first electrode of the first transistor T1. Due to the turn-on of the fourth transistor T4, the gate electrode and the second electrode of the first transistor T1 are connected to each other, so that the first transistor T1 operates as a diode.

At this time, because the voltage (Vgs=Vint-Vdata) between the gate electrode and the first electrode of the first transistor T1 is greater than the threshold voltage Vth1, the first transistor T1 forms a current path until the voltage Vgs between the gate electrode and the first electrode reaches the threshold voltage Vth1. Accordingly, the voltage of the gate electrode of the first transistor T1 may increase from "Vint" to "Vdata+Vth1." Because the first transistor T1 is formed as the P-type MOSFET, the threshold voltage Vth1 of the first transistor T1 may be less than 0 V.

Further, because the gate-off voltage VGH of the gate-off voltage line VGHL is applied to the first node N1, it is possible to prevent the variation in the gate-off voltage VGH of the $k^{th}$ sweep signal SWPk due to the reflection of the voltage variation of the gate electrode of the first transistor T1 in the $k^{th}$ sweep signal line SWPLk by the first capacitor C1.

Due to the turn-on of the ninth transistor T9, a first PAM data voltage Rdata of the first PAM data line RDL is applied to the first electrode of the eighth transistor T8. Due to the turn-on of the ninth transistor T9, the gate electrode and the second electrode of the eighth transistor T8 are connected to each other, so that the eighth transistor T8 operates as a diode.

At this time, because the voltage (Vgs=Vint−Rdata) between the gate electrode and the first electrode of the eighth transistor T8 is greater than the threshold voltage Vth8, the eighth transistor T8 forms a current path until the voltage Vgs between the gate electrode and the first electrode reaches the threshold voltage Vth8. Accordingly, the voltage of the gate electrode of the eighth transistor T8 may increase from "Vint" to "Rdata+Vth."

Fourth, during the fourth period t4, the seventh transistor T7, the thirteenth transistor T13, the sixteenth transistor T16, and the eighteenth transistor T18 are turned-on by the $k^{th}$ scan control signal GCk of the gate-on voltage VGL.

The seventh transistor T7, the thirteenth transistor T13, the sixteenth transistor T16, and the eighteenth transistor T18 are substantially the same as those described in the first period t1.

Figure 14:
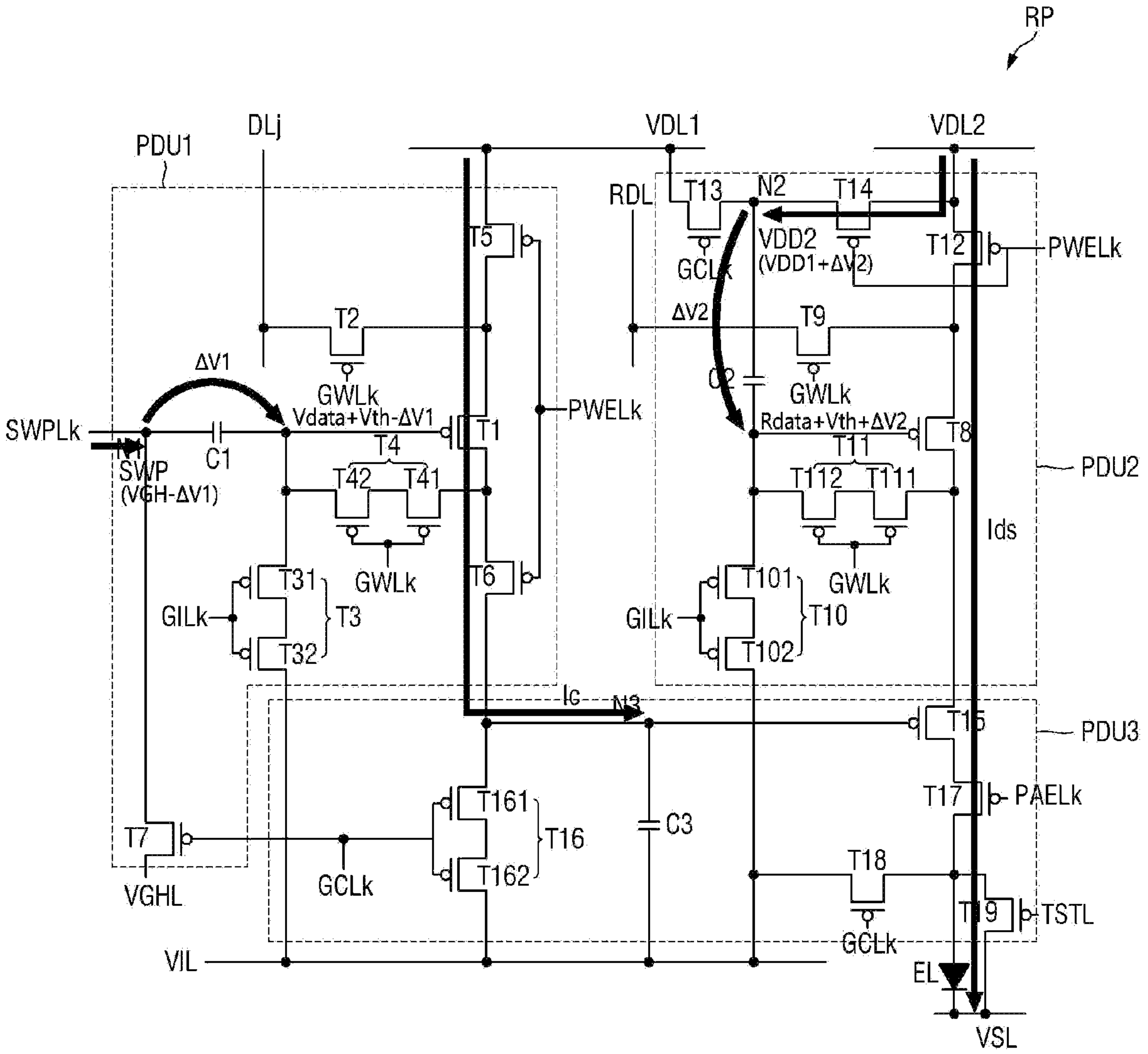

Fifth, during the fifth period t5, as shown in FIG. 14, the fifth transistor T5, the sixth transistor T6, the twelfth transistor T12, and the fourteenth transistor T14 are turned-on by the $k^{th}$ PWM emission signal PWMk of the gate-on voltage VGL.

Due to the turn-on of the fifth transistor T5, the first power voltage VDD1 is applied to the first electrode of the first transistor T1. Further, due to the turn-on of the sixth transistor T6, the second electrode of the first transistor T1 is connected to the third node N3. However, during the fifth period t5, the voltage (Vdata+Vth1) of the gate electrode of the first transistor T1 may be substantially equal to or higher than the first power voltage VDD1. Therefore, the first transistor T1 may be turned-off during the fifth period t5.

Further, due to the turn-on of the twelfth transistor T12, the first electrode of the eighth transistor T8 may be connected to the second power line VDL2.

Further, due to the turn-on of the fourteenth transistor T14, the second power voltage VDD2 of the second power line VDL2 is applied to the second node N2. When the second power voltage VDD2 of the second power supply line VDL2 varies due to a voltage drop or the like, a voltage difference ΔV2 between the first power voltage VDD1 and the second power voltage VDD2 may be reflected in the gate electrode of the eighth transistor T8 by the second capacitor C2.

Due to the turn-on of the fourteenth transistor T14, the driving current Ids flowing in response to the voltage (Rdata+Vth8) of the gate electrode of the eighth transistor T8 may be supplied to the fifteenth transistor T15. The driving current Ids may not depend on the threshold voltage Vth8 of the eighth transistor T8 as shown in Eq. (1).

$$Ids=k'\times(Vgs-Vth8)^2=k'\times(R\text{data}+Vth8-VDD2-Vth8)^2=k'\times(R\text{data}-VDD2) \quad \text{Eq. (1)}$$

In Eq. (1), k' refers to the proportional coefficient determined by the structure and physical characteristics of the eighth transistor T8, Vth8 refers to the threshold voltage of the eighth transistor T8, VDD2 refers to the second power voltage, and Rdata refers to the first PAM data voltage.

Sixth, during the sixth period t6, as shown in FIG. 14, the fifth transistor T5, the sixth transistor T6, the twelfth transistor T12, and the fourteenth transistor T14 are turned-on by the $k^{th}$ PWM emission signal PWMk of the gate-on voltage VGL. During the sixth period t6, as shown in FIG. 14, the fourteenth transistor T14 is turned-on by the $k^{th}$ PAM emission signal PAEMk of the gate-on voltage VGL. During the sixth period t6, the $k^{th}$ sweep signal SWPk linearly decreases from the gate-off voltage VGH to the gate-on voltage Von (e.g., FIG. 10).

The fifth transistor T5, the sixth transistor T6, the twelfth transistor T12, and the fourteenth transistor T14 are substantially the same as those described in the fifth period t5.

Due to the turn-on of the seventeenth transistor T17, the first electrode of the light emitting element EL may be connected to the second electrode of the fifteenth transistor T15.

During the sixth period t6, the $k^{th}$ sweep signal SWPk linearly decreases from the gate-off voltage VGH to the gate-on voltage Von, and voltage variation ΔV1 of the $k^{th}$ sweep signal SWPk is reflected in the gate electrode of the first transistor T1 by the first capacitor C1, so that the voltage of the gate electrode of the first transistor T1 may be Vdata+Vth1−ΔV1. That is, as the voltage of the $k^{th}$ sweep signal SWPk decreases during the sixth period t6, the voltage of the gate electrode of the first transistor T1 may linearly decrease.

During the sixth period t6, the control current Ic flowing in response to the voltage (Vdata+Vth1) of the gate electrode of the first transistor T1 may not depend on the threshold voltage Vth1 of the first transistor T1 as shown in Eq. (2).

$$Ids=k''\times(Vgs-Vth1)^2=k''\times(V\text{data}+Vth1-VDD1-Vth1)^2=k''\times(V\text{data}-VDD1)^2 \quad \text{Eq. (2)}$$

In Eq. (2), k" refers to the proportional coefficient determined by the structure and physical characteristics of the first transistor T1, Vth1 refers to the threshold voltage of the first transistor T1, VDD1 refers to the first power voltage, and Vdata refers to the data voltage.

The period in which the control current Ic is applied to the third node N3 may vary depending on the magnitude of the data voltage Vdata applied to the first transistor T1. Because the voltage of the third node N3 varies depending on the magnitude of the data voltage Vdata applied to the first transistor T1, the turn-on period of the fifteenth transistor T15 may be controlled. Therefore, it is possible to control the substantial emission period (SEP) in which the driving current Ids is applied to the light emitting element EL during the sixth period t6 by controlling the turn-on period of the fifteenth transistor T15.

First, when the data voltage Vdata of the gate electrode of the first transistor T1 is the data voltage of a peak black grayscale, the first transistor T1 may be turned-on throughout the sixth period t6 due to the decrease in the voltage of the $k^{th}$ sweep signal SWPk. In this case, the control current Ic of the first transistor T1 flows to the third node N3 throughout the sixth period t6, and the voltage of the third node N3 may increase to a high level VH when the sixth period t6 starts. Therefore, the fifteenth transistor T15 may be turned-off during the sixth period t6. Therefore, the driving current Ids is not applied to the light emitting element EL, and the first electrode of the light emitting element EL maintains the initialization voltage VINT, so that the light emitting element EL may not emit light during the sixth period t6.

Second, when the data voltage Vdata of the gate electrode of the first transistor T1 is the data voltage of a grayscale, the first transistor T1 may be turned-on during a first sub-period t61 of the sixth period t6 due to the decrease in the voltage of the $k^{th}$ sweep signal SWPk. In this case, because the control current Ic of the first transistor T1 flows during the first sub-period t61 of the sixth period t6, the voltage of the third node N3 may have the high level VH during a second sub-period t62 subsequent to the first sub-period t61. Therefore, the fifteenth transistor T15 may be turned-off during the second sub-period t62. Hence, the driving current Ids is applied to the light emitting element EL during the first sub-period t61 and is not applied to the light emitting element EL during the second sub-period t62. Accordingly, the light emitting element EL may emit light during the first sub-period t61 that is a part of the sixth period t6.

Third, when the data voltage Vdata of the gate electrode of the first transistor T1 is the data voltage of a peak white grayscale, the first transistor T1 may be turned-off throughout the sixth period t6 despite the decrease in the voltage of the $k^{th}$ sweep signal SWPk. Accordingly, the control current Ic of the first transistor T1 does not flow to the third node N3 throughout the sixth period t6, so that the voltage of the third node N3 may be maintained at the initialization voltage VINT. Therefore, the fifteenth transistor T15 may be turned-on throughout the sixth period t6. Therefore, the driving current Ids may be applied to the light emitting element EL throughout the sixth period t6, and the light emitting element EL may emit light throughout the sixth period t6.

As described above, the emission period of the light emitting element EL may be adjusted by adjusting the data voltage applied to the gate electrode of the first transistor T1. Therefore, the grayscale or luminance displayed by the first sub-pixel RP may be adjusted by adjusting the pulse width of the voltage applied to the first electrode of the light emitting element EL while maintaining the driving current Ids applied to the light emitting element EL at a constant level rather than by adjusting the magnitude of the driving current Ids applied to the light emitting element EL.

When the digital video data converted to the data voltages is 8 bits, the digital video data converted to the data voltage of the peak black grayscale may be 0, and the digital video data converted to the data voltage of the peak white grayscale may be 255. The data voltage of the grayscale may be data other than 0 and 255.

Further, the seventh period t7, the eighth period t8, and the ninth period t9 of each of the second to $n^{th}$ emission periods EP2 to EPn are substantially the same as the first period t1, the fifth period t5, and the sixth period t6 that are described above, respectively. That is, in each of the second to $n^{th}$ emission periods EP2 to EPn, after the third node N3 is initialized, the period in which the driving current Ids generated in response to the first PAM data voltage Rdata written in the gate electrode of the eighth transistor T8 is applied to the light emitting element EL may be adjusted based on the data voltage Vdata written in the gate electrode of the first transistor T1 during the address period ADDR.

Because the test signal of the test signal line TSTL is applied to the gate-off voltage VGH during the active period ACT of the $N^{th}$ frame period, the nineteenth transistor T19 may be turned-off during the active period ACT of the $N^{th}$ frame period.

Because the second sub-pixel GP and the third sub-pixel BP may operate substantially in the same manner as the first sub-pixel RP as described in conjunction with FIGS. 10 to 14, the description of the operations of the second sub-pixel GP and the third sub-pixel BP will be omitted.

Figure 15:
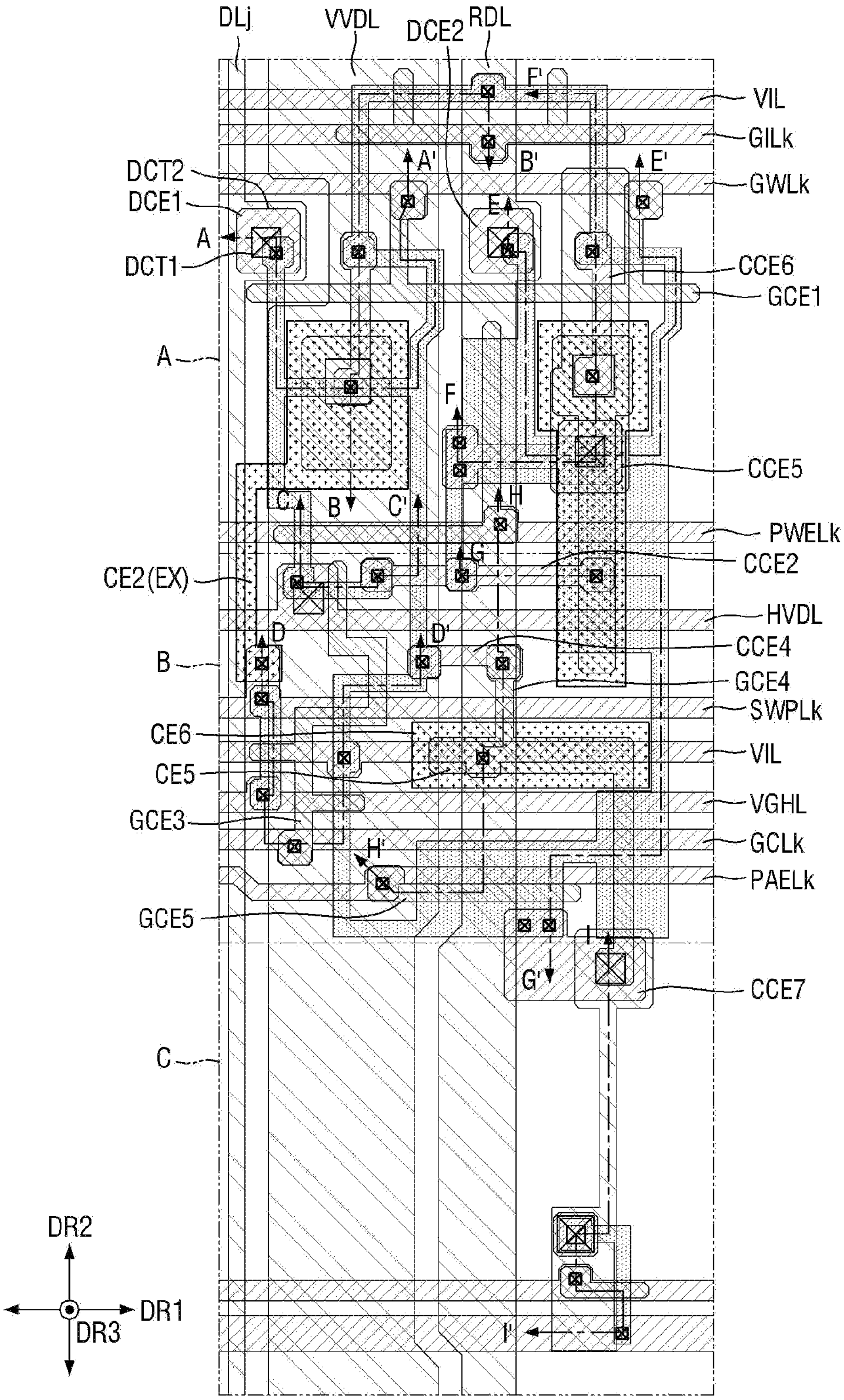
FIG. 15 is a layout view illustrating a lower metal layer, an active layer, a first gate metal layer, a second gate metal layer, a first source metal layer, and a second source metal layer of a first sub-pixel according to one or more embodiments.
Figure 16:
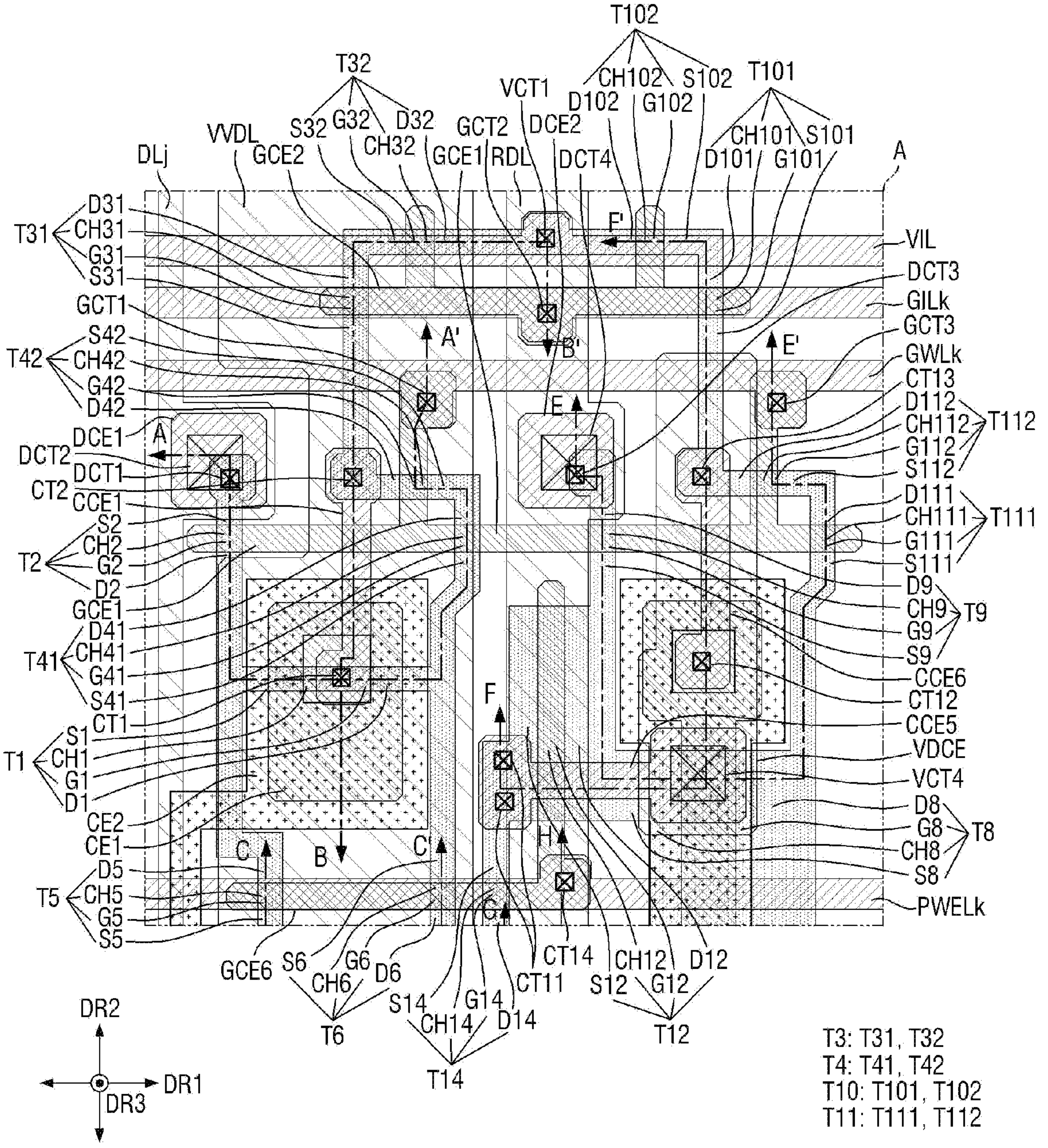
FIG. 16 is an enlarged layout view illustrating an area A of FIG. 15 in detail.
Figure 17:
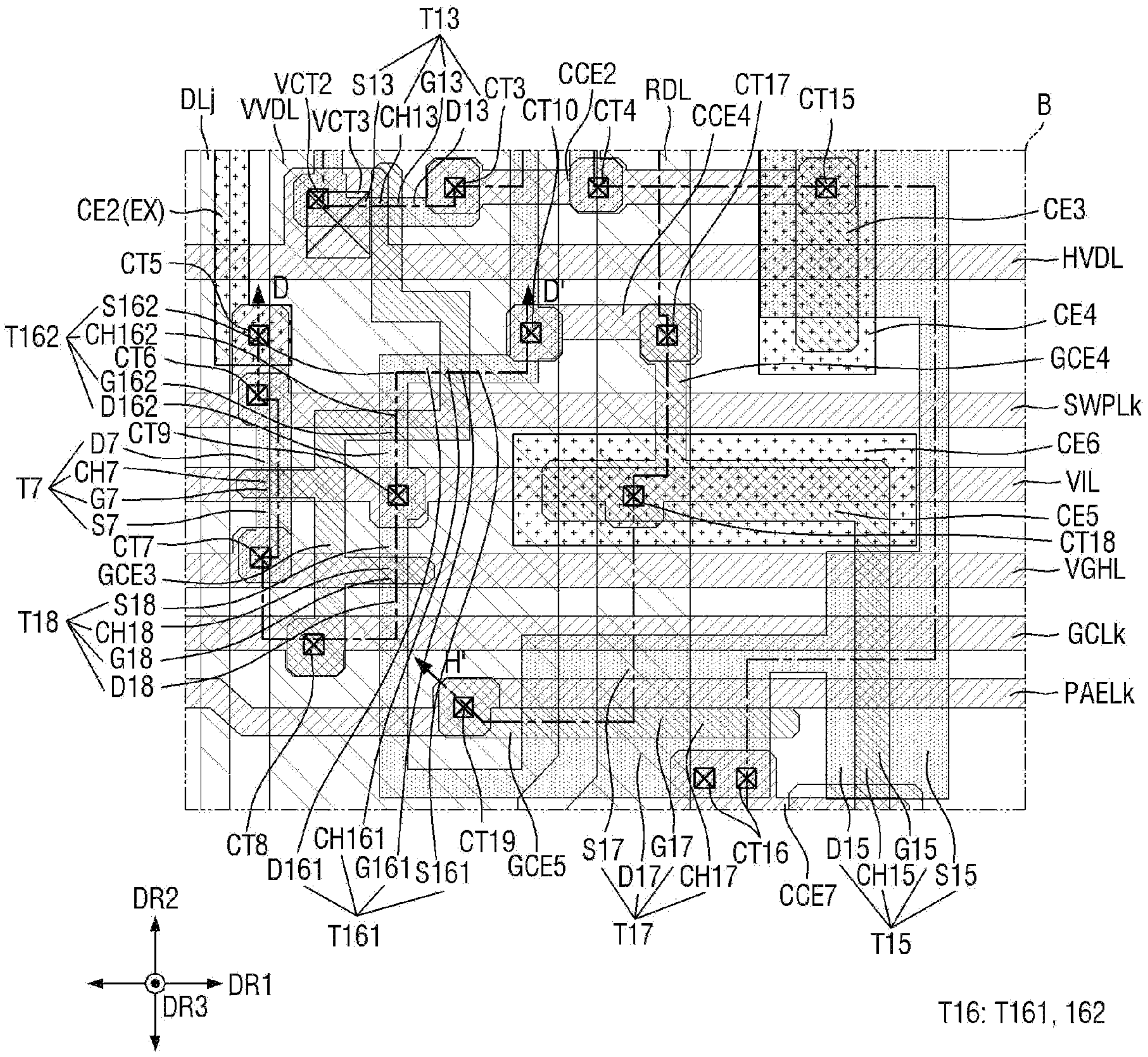
FIG. 17 is an enlarged layout view illustrating an area B of FIG. 15 in detail.
Figure 18:
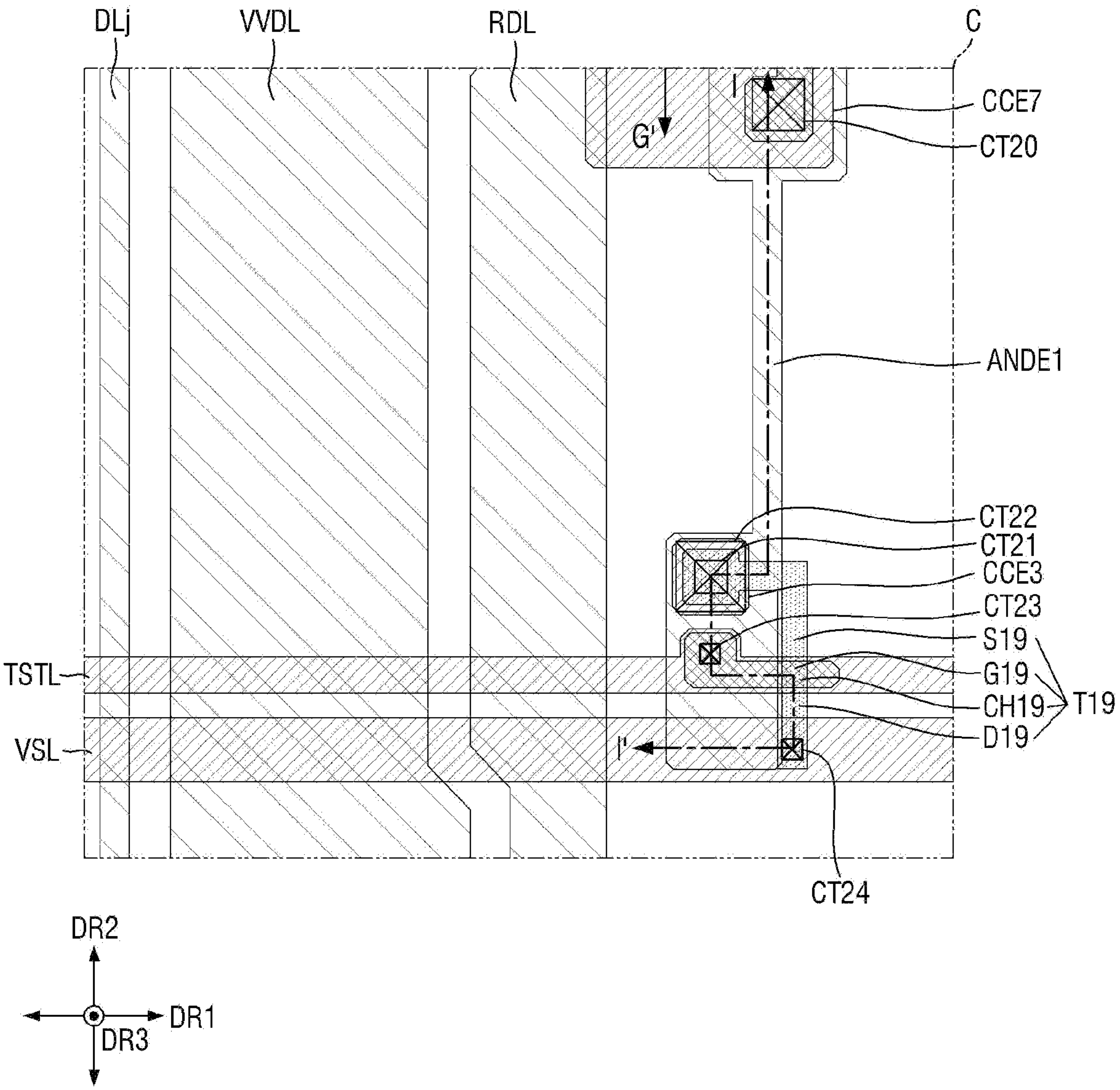
FIG. 18 is an enlarged layout view illustrating an area C of FIG. 15 in detail.

FIG. 15 is a layout view illustrating a lower metal layer, an active layer, a first gate metal layer, a second gate metal layer, a first source metal layer, and a second source metal layer of a first sub-pixel according to one or more embodiments. FIG. 16 is an enlarged layout view illustrating an area A of FIG. 15 in detail. FIG. 17 is an enlarged layout view illustrating an area B of FIG. 15 in detail. FIG. 18 is an enlarged layout view illustrating an area C of FIG. 15 in detail.

Referring to FIGS. 15 to 18, the initialization voltage lines VIL, the $k^{th}$ scan initialization line GILk, the $k^{th}$ scan write line GWLk, the $k^{th}$ PWM emission line PWELk, a first horizontal power line HVDL, the gate-off voltage line VGHL, the $k^{th}$ sweep signal line SWPLk, the $k^{th}$ scan control line GCLk, the k$^{th}$ PAM emission line PAELk, the test signal line TSTL, and the third power supply line VSL may extend in the first direction DR1. The initialization voltage lines VIL, the k$^{th}$ scan initialization line GILk, the k$^{th}$ scan write line GWLk, the k$^{th}$ PWM emission line PWELk, the first horizontal power line HVDL, the gate-off voltage line VGHL, the k$^{th}$ sweep signal line SWPLk, the k$^{th}$ scan control line GCLk, the k$^{th}$ PAM emission line PAELk, the test signal line TSTL, and the third power line VSL may be spaced from each other along the second direction DR2.

The j$^{th}$ data line DLj, the first vertical power line VVDL, and the first PAM data line RDL may extend in the second direction DR2. Further, the second PAM data line GDL and the third PAM data line BDL illustrated in FIG. 1 may extend in the second direction DR2. The j$^{th}$ data line DLj, the first vertical power line VVDL, the first PAM data line RDL, the second PAM data line GDL, and the third PAM data line BDL may be spaced from each other along the first direction DR1.

The first sub-pixel RP includes the first to nineteenth transistors T1 to T19, first to sixth capacitor electrodes CE1 to CE6, first to sixth gate connection electrodes GCE1 to GCE6, first and second data connection electrodes DCE1 and DCE2, first to seventh connection electrodes CCE1 to CCE7, a first anode connection electrode ANDE1, and the light emitting element EL.

The first transistor T1 includes a first channel CH1, a first gate electrode G1, a first source electrode S1, and a first drain electrode D1. The first channel CH1 may extend in the first direction DR1. The first channel CH1 may overlap the first gate electrode G1 in a third direction DR3 (e.g., a thickness direction of the subpixel). The first gate electrode G1 may be connected to the first connection electrode CCE1 through a first contact hole CT1. The first gate electrode G1 may be integrally formed with the first capacitor electrode CE1. The first gate electrode G1 may overlap the second capacitor electrode CE2 in the third direction DR3. The first source electrode S1 may be disposed on one side of the first channel CH1, and the first drain electrode D1 may be disposed on the other side of the first channel CH1. The first source electrode S1 may be connected to a second drain electrode D2 and a fifth drain electrode D5. The first drain electrode D1 may be connected to a third sub-source electrode S41 and a sixth source electrode S6. The first source electrode S1 and the first drain electrode D1 may not overlap the first gate electrode G1 in the third direction DR3. The first source electrode S1 and the first drain electrode D1 may overlap the second capacitor electrode CE2 in the third direction DR3.

The second transistor T2 includes a second channel CH2, a second gate electrode G2, a second source electrode S2, and the second drain electrode D2. The second channel CH2 may overlap the second gate electrode G2 in the third direction DR3. The second gate electrode G2 may be integrally formed with the first gate connection electrode GCE1. The second source electrode S2 may be disposed on one side of the second channel CH2, and the second drain electrode D2 may be disposed on the other side of the second channel CH2. The second source electrode S2 may be connected to the first data connection electrode DCE1 through a first data contact hole DCT1. The second drain electrode D2 may be connected to the first source electrode S1. The second source electrode S2 and the second drain electrode D2 may not overlap the second gate electrode G2 in the third direction DR3. The second drain electrode D2 may extend in the second direction DR2. The second drain electrode D2 may be connected to the first source electrode S1.

The first sub-transistor T31 of the third transistor T3 includes a first sub-channel CH31, a first sub-gate electrode G31, a first sub-source electrode S31, and a first sub-drain electrode D31. The first sub-channel CH31 may overlap the first sub-gate electrode G31 in the third direction DR3. The first sub-gate electrode G31 may be integrally formed with the second gate connection electrode GCE2. The first sub-source electrode S31 may be disposed on one side of the first sub-channel CH31, and the first sub-drain electrode D31 may be disposed on the other side of the first sub-channel CH31. The first sub-source electrode S31 may be connected to a fourth sub-drain electrode D42, and the first sub-drain electrode D31 may be connected to a second sub-source electrode S32. The first sub-source electrode S31 and the first sub-drain electrode D31 may not overlap the first sub-gate electrode G31. The first sub-source electrode S31 may overlap the k$^{th}$ scan write line GWLk in the third direction DR3. The first sub-drain electrode D31 may overlap the initialization voltage line VIL in the third direction DR3.

The second sub-transistor T32 of the third transistor T3 includes a second sub-channel CH32, a second sub-gate electrode G32, the second sub-source electrode S32, and a second sub-drain electrode D32. The second sub-channel CH32 may overlap the second sub-gate electrode G32 in the third direction DR3. The second sub-gate electrode G32 may be integrally formed with the second gate connection electrode GCE2. The second sub-source electrode S32 may be disposed on one side of the second sub-channel CH32, and the second sub-drain electrode D32 may be disposed on the other side of the second sub-channel CH32. The second sub-source electrode S32 may be connected to the first sub-drain electrode D31, and the second sub-drain electrode D32 may be connected to the initialization voltage line VIL through a first power contact hole VCT1. The second sub-source electrode S32 and the second sub-drain electrode D32 may not overlap the second sub-gate electrode G32. The second sub-source electrode S32 and the second sub-drain electrode D32 may overlap the initialization voltage line VIL in the third direction DR3.

The third sub-transistor T41 of the fourth transistor T4 includes a third sub-channel CH41, a third sub-gate electrode G41, the third sub-source electrode S41, and a third sub-drain electrode D41. The third sub-channel CH41 may overlap the third sub-gate electrode G41 in the third direction DR3. The third sub-gate electrode G41 may be integrally formed with the first gate connection electrode GCE1. The third sub-source electrode S41 may be disposed on one side of the third sub-channel CH41, and the third sub-drain electrode D41 may be disposed on the other side of the third sub-channel CH41. The third sub-source electrode S41 may be connected to the first drain electrode D1, and the third sub-drain electrode D41 may be connected to a fourth sub-source electrode S42. The third sub-source electrode S41 and the third sub-drain electrode D41 may not overlap the third sub-gate electrode G41.

The fourth sub-transistor T42 of the fourth transistor T4 includes a fourth sub-channel CH42, a fourth sub-gate electrode G42, the fourth sub-source electrode S42, and the fourth sub-drain electrode D42. The fourth sub-channel CH42 may overlap the fourth sub-gate electrode G42 in the third direction DR3. The fourth sub-gate electrode G42 may be integrally formed with the second gate connection electrode GCE2. The fourth sub-source electrode S42 may be disposed on one side of the fourth sub-channel CH42, and the fourth sub-drain electrode D42 may be disposed on the other side of the fourth sub-channel CH42. The fourth sub-source electrode S42 may be connected to the third sub-drain electrode D41, and the fourth sub-drain electrode D42 may be connected to the first sub-source electrode S31. The fourth sub-source electrode S42 and the fourth sub-drain electrode D42 may not overlap the fourth sub-gate electrode G42.

The fifth transistor T5 includes a fifth channel CH5, a fifth gate electrode G5, a fifth source electrode S5, and the fifth drain electrode D5. The fifth channel CH5 may overlap the fifth gate electrode G5 in the third direction DR3. The fifth gate electrode G5 may be integrally formed with a sixth gate connection electrode GCE6. The fifth source electrode S5 may be disposed on one side of the fifth channel CH5, and the fifth drain electrode D5 may be disposed on the other side of the fifth channel CH5. The fifth source electrode S5 may be connected to the first horizontal power line HVDL through a second power contact hole VCT2. The fifth drain electrode D5 may be connected to the first source electrode S1. The fifth source electrode S5 and the fifth drain electrode D5 may not overlap the fifth gate electrode G5 in the third direction DR3. The fifth drain electrode D5 may overlap an extension portion EX (e.g., see FIG. 17) of the second capacitor electrode CE2 in the third direction DR3.

The sixth transistor T6 includes a sixth channel CH6, a sixth gate electrode G6, a sixth source electrode S6, and a sixth drain electrode D6. The sixth channel CH6 may overlap the sixth gate electrode G6 in the third direction DR3. The sixth gate electrode G6 may be integrally formed with the sixth gate connection electrode GCE6. The sixth source electrode S6 may be disposed on one side of the sixth channel CH6, and the sixth drain electrode D6 may be disposed on the other side of the sixth channel CH6. The sixth source electrode S6 may be connected to the first drain electrode D1. The sixth drain electrode D6 may be connected to the fourth connection electrode CCE4 through a tenth contact hole CT10. The sixth source electrode S6 and the sixth drain electrode D6 may not overlap the sixth gate electrode G6 in the third direction DR3. The sixth drain electrode D6 may overlap the second connection electrode CCE2 and the first horizontal power line HVDL in the third direction DR3 (e.g., see FIG. 17).

The seventh transistor T7 includes a seventh channel CH7, a seventh gate electrode G7, a seventh source electrode S7, and a seventh drain electrode D7. The seventh channel CH7 may overlap the seventh gate electrode G7 in the third direction DR3. The seventh gate electrode G7 may be integrally formed with the third gate connection electrode GCE3. The seventh gate electrode G7 may overlap the initialization voltage line VIL in the third direction DR3. The seventh source electrode S7 may be disposed on one side of the seventh channel CH7, and the seventh drain electrode D7 may be disposed on the other side of the seventh channel CH7. The seventh source electrode S7 may be connected to the gate-off voltage line VGHL through a seventh contact hole CT7. The seventh drain electrode D7 may be connected to the $k^{th}$ sweep signal line SWPLk through a sixth contact hole CT6. The seventh source electrode S7 and the seventh drain electrode D7 may not overlap the seventh gate electrode G7 in the third direction DR3.

The eighth transistor T8 includes an eighth channel CH8, an eighth gate electrode G8, an eighth source electrode S8, and an eighth drain electrode D8. The eighth channel CH8 may overlap the eighth gate electrode G8 in the third direction DR3. The eighth gate electrode G8 may extend in the second direction DR2. The eighth gate electrode G8 may be integrally formed with the third capacitor electrode CE3. The eighth source electrode S8 may be disposed on one side of the eighth channel CH8, and the eighth drain electrode D8 may be disposed on the other side of the eighth channel CH8. The eighth source electrode S8 may be connected to a ninth drain electrode D9 and a twelfth drain electrode D12. The eighth drain electrode D8 may be connected to a seventh sub-source electrode S111. The eighth source electrode S8 and the eighth drain electrode D8 may not overlap the eighth gate electrode G8 in the third direction DR3.

The ninth transistor T9 includes a ninth channel CH9, a ninth gate electrode G9, a ninth source electrode S9, and the ninth drain electrode D9. The ninth channel CH9 may overlap the ninth gate electrode G9 in the third direction DR3. The ninth gate electrode G9 may extend in the second direction DR2. The ninth gate electrode G9 may be integrally formed with the first gate connection electrode GCE1. The ninth source electrode S9 may be disposed on one side of the ninth channel CH9, and the ninth drain electrode D9 may be disposed on the other side of the ninth channel CH9. The ninth source electrode S9 may be connected to the second data connection electrode DCE2 through a third data contact hole DCT3. The ninth drain electrode D9 may be connected to the eighth source electrode D8. The ninth source electrode S9 and the ninth drain electrode D9 may not overlap the ninth gate electrode G9 in the third direction DR3.

The fifth sub-transistor T101 of the tenth transistor T10 includes a fifth sub-channel CH101, a fifth sub-gate electrode G101, a fifth sub-source electrode S101, and a fifth sub-drain electrode D101. The fifth sub-channel CH101 may overlap the fifth sub-gate electrode G101 in the third direction DR3. The fifth sub-gate electrode G101 may be integrally formed with the second gate connection electrode GCE2. The fifth sub-source electrode S101 may be disposed on one side of the fifth sub-channel CH101, and the fifth sub-drain electrode D101 may be disposed on the other side of the fifth sub-channel CH101. The fifth sub-source electrode S101 may be connected to an eighth sub-drain electrode D112, and the fifth sub-drain electrode D101 may be connected to a sixth sub-source electrode S102. The fifth sub-source electrode S101 and the fifth sub-drain electrode D101 may not overlap the fifth sub-gate electrode G101. The fifth sub-source electrode S101 may overlap the $k^{th}$ scan write line GWLk in the third direction DR3. The fifth sub-drain electrode D102 may overlap the initialization voltage line VIL in the third direction DR3.

The sixth sub-transistor T102 of the tenth transistor T10 includes a sixth sub-channel CH102, a sixth sub-gate electrode G102, the sixth sub-source electrode S102, and a sixth sub-drain electrode D102. The sixth sub-channel CH102 may overlap the sixth sub-gate electrode G102 in the third direction DR3. The sixth sub-gate electrode G102 may be integrally formed with the second gate connection electrode GCE2. The sixth sub-source electrode S102 may be disposed on one side of the sixth sub-channel CH102, and the sixth sub-drain electrode D102 may be disposed on the other side of the sixth sub-channel CH102. The sixth sub-source electrode S102 may be connected to the fifth sub-drain electrode D101, and the sixth sub-drain electrode D102 may be connected to the initialization voltage line VIL through the first power contact hole VCT1. The sixth sub-source electrode S102 and the sixth sub-drain electrode D102 may not overlap the sixth sub-gate electrode G102. The sixth sub-source electrode S102 and the sixth sub-drain electrode D102 may overlap the initialization voltage line VIL in the third direction DR3.

The seventh sub-transistor T111 of the eleventh transistor T11 includes a seventh sub-channel CH111, a seventh sub-gate electrode G111, the seventh sub-source electrode S111, and a seventh sub-drain electrode D111. The seventh sub-channel CH111 may overlap the seventh sub-gate electrode G111 in the third direction DR3. The seventh sub-gate electrode G111 may be integrally formed with the first gate connection electrode GCE1. The seventh sub-source electrode S111 may be disposed on one side of the seventh sub-channel CH111, and the seventh sub-drain electrode D111 may be disposed on the other side of the seventh sub-channel CH111. The seventh sub-source electrode S111 may be connected to the eighth drain electrode D8, and the seventh sub-drain electrode D111 may be connected to an eighth sub-source electrode S112. The seventh sub-source electrode S111 and the seventh sub-drain electrode D111 may not overlap the seventh sub-gate electrode G111.

The eighth sub-transistor T112 of the eleventh transistor T11 includes an eighth sub-channel CH112, an eighth sub-gate electrode G112, the eighth sub-source electrode S112, and the eighth sub-drain electrode D112. The eighth sub-channel CH112 may overlap the eighth sub-gate electrode G112 in the third direction DR3. The eighth sub-gate electrode G112 may be integrally formed with the first gate connection electrode GCE1. The eighth sub-source electrode S112 may be disposed on one side of the eighth sub-channel CH112, and the eighth sub-drain electrode D112 may be disposed on the other side of the eighth sub-channel CH112. The eighth sub-source electrode S112 may be connected to the seventh sub-drain electrode D111, and the eighth sub-drain electrode D112 may be connected to the fifth sub-source electrode S101. The eighth sub-source electrode S112 and the eighth sub-drain electrode D112 may not overlap the eighth sub-gate electrode G112.

The twelfth transistor T12 includes a twelfth channel CH12, a twelfth gate electrode G12, a twelfth source electrode S12, and the twelfth drain electrode D12. The twelfth channel CH12 may overlap the twelfth gate electrode G12 in the third direction DR3. The twelfth gate electrode G12 may be integrally formed with the sixth gate connection electrode GCE6. The twelfth source electrode S12 may be disposed on one side of the twelfth channel CH12, and the twelfth drain electrode D12 may be disposed on the other side of the twelfth channel CH12. The twelfth source electrode S12 may be connected to the fifth connection electrode CCE5 through eleventh contact holes CT11. The twelfth source electrode S12 and the twelfth drain electrode D12 may not overlap the twelfth gate electrode G12 in the third direction DR3.

The thirteenth transistor T13 includes a thirteenth channel CH13, a thirteenth gate electrode G13, a thirteenth source electrode S13, and a thirteenth drain electrode D13. The thirteenth channel CH13 may overlap the thirteenth gate electrode G13 in the third direction DR3. The thirteenth gate electrode G13 may be integrally formed with the third gate connection electrode GCE3. The thirteenth source electrode S13 may be disposed on one side of the thirteenth channel CH13, and the thirteenth drain electrode D13 may be disposed on the other side of the thirteenth channel CH13. The thirteenth source electrode S13 may be connected to the first horizontal power line HVDL through the second power contact hole VCT2. The thirteenth drain electrode D13 may be connected to the second connection electrode CCE2 through a third contact hole CT3. The thirteenth source electrode S13 and the thirteenth drain electrode D13 may not overlap the thirteenth gate electrode G13 in the third direction DR3.

The fourteenth transistor T14 includes a fourteenth channel CH14, a fourteenth gate electrode G14, a fourteenth source electrode S14, and a fourteenth drain electrode D14. The fourteenth channel CH14 may overlap the fourteenth gate electrode G14 in the third direction DR3. The fourteenth gate electrode G14 may be integrally formed with the sixth gate connection electrode GCE6. The fourteenth source electrode S14 may be disposed on one side of the fourteenth channel CH14, and the fourteenth drain electrode D14 may be disposed on the other side of the fourteenth channel CH14. The fourteenth source electrode S14 may be connected to the fifth connection electrode CCE5 through the eleventh contact holes CT11. The fourteenth drain electrode D14 may be connected to the second connection electrode CCE2 through a fourth contact hole CT4. The fourteenth source electrode S14 and the fourteenth drain electrode D14 may not overlap the fourteenth gate electrode G14 in the third direction DR3.

The fifteenth transistor T15 includes a fifteenth channel CH15, a fifteenth gate electrode G15, a fifteenth source electrode S15, and a fifteenth drain electrode D15. The fifteenth channel CH15 may overlap the fifteenth gate electrode G15 in the third direction DR3. The fifteenth gate electrode G15 may be integrally formed with the fifth capacitor electrode CE5. The fifteenth source electrode S15 may be disposed on one side of the fifteenth channel CH15, and the fifteenth drain electrode D15 may be disposed on the other side of the fifteenth channel CH15. The fifteenth source electrode S15 may be connected to the ninth drain electrode D9. The fifteenth drain electrode D15 may be connected to a seventeenth source electrode S17. The fifteenth source electrode S15 and the fifteenth drain electrode D15 may not overlap the fifteenth gate electrode G15 in the third direction DR3.

The ninth sub-transistor T161 of the sixteenth transistor T16 includes a ninth sub-channel CH161, a ninth sub-gate electrode G161, a ninth sub-source electrode S161, and a ninth sub-drain electrode D161. The ninth sub-channel CH161 may overlap the ninth sub-gate electrode G161 in the third direction DR3. The ninth sub-gate electrode G161 may be integrally formed with the third gate connection electrode GCE3. The ninth sub-source electrode S161 may be disposed on one side of the ninth sub-channel CH161, and the ninth sub-drain electrode D161 may be disposed on the other side of the ninth sub-channel CH161. The ninth sub-source electrode S161 may be connected to the fourth connection electrode CCE4 through the tenth contact hole CT10, and the ninth sub-drain electrode D161 may be connected to a tenth sub-source electrode S162. The ninth sub-source electrode S161 and the ninth sub-drain electrode D161 may not overlap the ninth sub-gate electrode G161.

The tenth sub-transistor T162 of the sixteenth transistor T16 includes a tenth sub-channel CH162, a tenth sub-gate electrode G162, the tenth sub-source electrode S162, and a tenth sub-drain electrode D162. The tenth sub-channel CH162 may overlap the tenth sub-gate electrode G162 in the third direction DR3. The tenth sub-gate electrode G162 may be integrally formed with the third gate connection electrode GCE3. The tenth sub-source electrode S162 may be disposed on one side of the tenth sub-channel CH162, and the tenth sub-drain electrode D162 may be disposed on the other side of the tenth sub-channel CH162. The tenth sub-source electrode S162 may be connected to the ninth sub-drain electrode D161, and the tenth sub-drain electrode D162 may be connected to the initialization voltage line VIL through a ninth contact hole CT9. The tenth sub-source electrode S162 and the tenth sub-drain electrode D162 may not overlap the tenth sub-gate electrode G162.

The seventeenth transistor T17 includes a seventeenth channel CH17, a seventeenth gate electrode G17, the seventeenth source electrode S17, and a seventeenth drain electrode D17. The seventeenth channel CH17 may overlap the seventeenth gate electrode G17 in the third direction DR3. The seventeenth gate electrode G17 may be integrally formed with the fifth gate connection electrode GCE5. The seventeenth source electrode S17 may be disposed on one side of the seventeenth channel CH17, and the seventeenth drain electrode D17 may be disposed on the other side of the seventeenth channel CH17. The seventeenth source electrode S17 may be connected to the fifteenth drain electrode D15. The seventeenth drain electrode D17 may be connected to the seventh connection electrode CCE7 through sixteenth contact holes CT16. The seventeenth source electrode S17 and the seventeenth drain electrode D17 may not overlap the seventeenth gate electrode G17 in the third direction DR3.

The eighteenth transistor T18 includes an eighteenth channel CH18, an eighteenth gate electrode G18, an eighteenth source electrode S18, and an eighteenth drain electrode D18. The eighteenth channel CH18 may overlap the eighteenth gate electrode G18 in the third direction DR3. The eighteenth gate electrode G18 may be integrally formed with the third gate connection electrode GCE3. The eighteenth source electrode S18 may be disposed on one side of the eighteenth channel CH18, and the eighteenth drain electrode D18 may be disposed on the other side of the eighteenth channel CH18. The eighteenth source electrode S18 may be connected to the initialization voltage line VIL through the ninth contact hole CT9. The eighteenth drain electrode D18 may be connected to the seventh connection electrode CCE7 through the sixteenth contact holes CT16. The eighteenth source electrode S18 and the eighteenth drain electrode D18 may not overlap the eighteenth gate electrode G18 in the third direction DR3.

The nineteenth transistor T19 includes a nineteenth channel CH19, a nineteenth gate electrode G19, a nineteenth source electrode S19, and a nineteenth drain electrode D19. The nineteenth channel CH19 may overlap the nineteenth gate electrode G19 in the third direction DR3. The nineteenth gate electrode G19 may be connected to the test signal line TSTL through a twenty-third contact hole CT23. The nineteenth source electrode S19 may be disposed on one side of the nineteenth channel CH19, and the nineteenth drain electrode D19 may be disposed on the other side of the nineteenth channel CH19. The nineteenth source electrode S19 may be connected to the third connection electrode CCE3 through a twenty-first contact hole CT21. The nineteenth drain electrode D19 may be connected to the third power line VSL through a twenty-fourth contact hole CT24. The nineteenth source electrode S19 and the nineteenth drain electrode D19 may not overlap the nineteenth gate electrode G19 in the third direction DR3.

The first capacitor electrode CE1 may be integrally formed with the first gate electrode G1. The second capacitor electrode CE2 may overlap the first capacitor electrode CE1 in the third direction DR3. The first capacitor electrode CE1 may be one electrode of the first capacitor C1, and the second capacitor electrode CE2 may be the other electrode of the first capacitor C1.

The second capacitor electrode CE2 includes the hole exposing the first gate electrode G1, and the first connection electrode CCE1 may be connected to the first gate electrode G1 through the first contact hole CT1 in the hole.

The second capacitor electrode CE2 may include the extension portion EX extending in the second direction DR2. The extension portion EX of the second capacitor electrode CE2 may cross the $k^{th}$ PWM emission line PWELk and the first horizontal voltage line HVDL. The extension portion EX of the second capacitor CE2 may be connected to the $k^{th}$ sweep signal line SWPLk through a fifth contact hole CT5.

The third capacitor electrode CE3 may be integrally formed with the eighth gate electrode G8. The fourth capacitor electrode CE4 may overlap the third capacitor electrode CE3 in the third direction DR3. The third capacitor electrode CE3 may be one electrode of the second capacitor C2, and the fourth capacitor electrode CE4 may be the other electrode of the second capacitor C2.

The fourth capacitor electrode CE4 includes the hole exposing the eighth gate electrode G8, and the sixth connection electrode CCE6 may be connected to the eighth gate electrode G8 through a twelfth contact hole CT12 in the hole.

The fifth capacitor electrode CE5 may be integrally formed with the fourth gate connection electrode GCE4 and the fifteenth gate electrode G15. The sixth capacitor electrode CE6 may overlap the fifth capacitor electrode CE5 in the third direction DR3. The fifth capacitor electrode CE5 may be one electrode of the third capacitor C3, and the sixth capacitor electrode CE6 may be the other electrode of the third capacitor C3. The sixth capacitor electrode CE6 may be connected to the initialization voltage line VIL through an eighteenth contact hole CT18.

The first gate connection electrode GCE1 may be connected to the $k^{th}$ scan write line GWLk through the first gate contact hole GCT1 and the third gate contact hole GCT3. The second gate connection electrode CCE2 may be connected to the $k^{th}$ scan initialization line GILk through the second gate contact hole GCT2. The third gate connection electrode GCE3 may be connected to the $k^{th}$ scan control line GCLk through an eighth contact hole CT8. The fourth gate connection electrode GCE4 may be connected to the fourth connection electrode CCE4 through a seventeenth contact hole CT17. The fifth gate connection electrode GCE5 may be connected to the $k^{th}$ PAM emission line PAELk through a nineteenth contact hole CT19. The sixth gate connection electrode GCE6 may be connected to the $k^{th}$ PWM emission line PWELk through a fourteenth contact hole CT14.

The first data connection electrode DCE1 may be connected to the second source electrode S2 through the first data contact hole DCT1, and may be connected to the PI data line DLj through a second data contact hole DCT2. The second data connection electrode DCE2 may be connected to the ninth source electrode S9 through the third data contact hole DCT3, and may be connected to the first PAM data line RDL through a fourth data contact hole DCT4.

The first connection electrode CCE1 may extend in the second direction DR2. The first connection electrode CCE1 may be connected to the first gate electrode G1 through the first contact hole CT1, and may be connected to the first sub-source electrode S31 and the fourth sub-drain electrode D42 through a second contact hole CT2.

The second connection electrode CCE2 may extend in the first direction DR1. The second connection electrode CCE2 may be connected to the seventeenth drain electrode D17 through the third contact hole CT3, may be connected to the fourteenth drain electrode D14 through the fourth contact hole CT4, and may be connected to the fourth capacitor electrode CE4 through a fifteenth contact hole CT15.

The third connection electrode CCE3 may be connected to the nineteenth source electrode S19 through the twenty-first contact hole CT21, and may be connected to the first anode connection electrode ANDE1 through a twenty-second contact hole CT22.

The fourth connection electrode CCE4 may extend in the first direction DR1. The fourth connection electrode CCE4 may be connected to the sixth drain electrode D6 and the ninth sub-source electrode S161 through the tenth contact hole CT10, and may be connected to the fourth gate electrode CCE4 through the seventeenth contact hole CT17.

The fifth connection electrode CCE5 may extend in the first direction DR1. The fifth connection electrode CCE5 may be connected to the twelfth source electrode S12 and the fourteenth source electrode S14 through the eleventh contact holes CT11, and may be connected to the fourth capacitor electrode CE4 through a fourth power contact hole VCT4.

The sixth connection electrode CCE6 may extend in the second direction DR2. The sixth connection electrode CCE6 may be connected to the third capacitor electrode CE3 through the twelfth contact hole CT12, and may be connected to the fifth sub-source electrode S101 and the eighth sub-drain electrode D112 through a thirteenth contact hole CT13.

The seventh connection electrode CCE7 may be connected to the seventeenth drain electrode D17 and the eighteenth drain electrode D18 through the sixteenth contact holes CT16. The seventh connection electrode CCE7 may be connected to the first anode connection electrode ANDE1 through a twentieth contact hole CT20.

The first anode connection electrode ANDE1 may extend in the second direction DR2. The first anode connection electrode ANDE1 may be connected to the seventh connection electrode CCE7 through the twentieth contact hole CT20, and may be connected to the third connection electrode CCE3 through the twenty-second contact hole CT22.

A second power connection electrode VDCE may extend in the second direction DR2. The second power connection electrode VDCE may be connected to the fifth connection electrode CCE5 through a fourth power contact hole VCT4.

Figure 19:
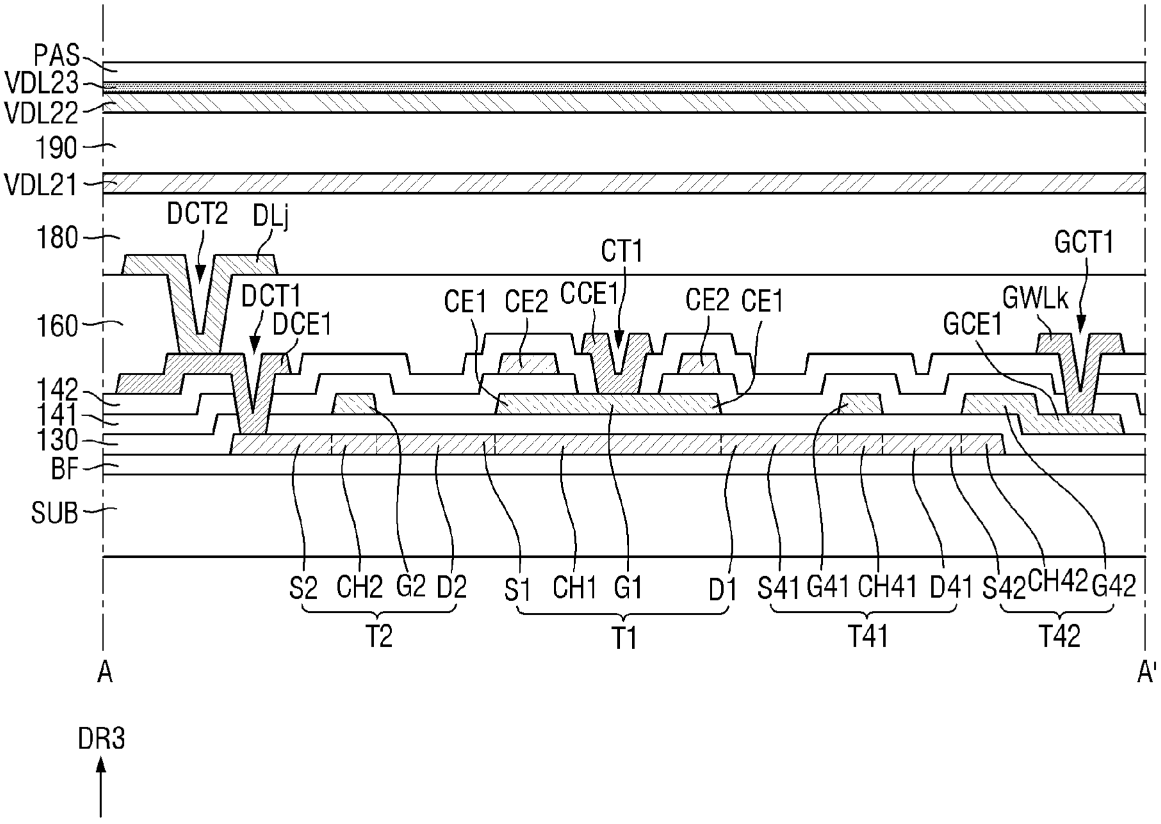
FIG. 19 is a cross-sectional view illustrating an example of a display panel taken along the line A-A' of FIG. 15.
Figure 20:
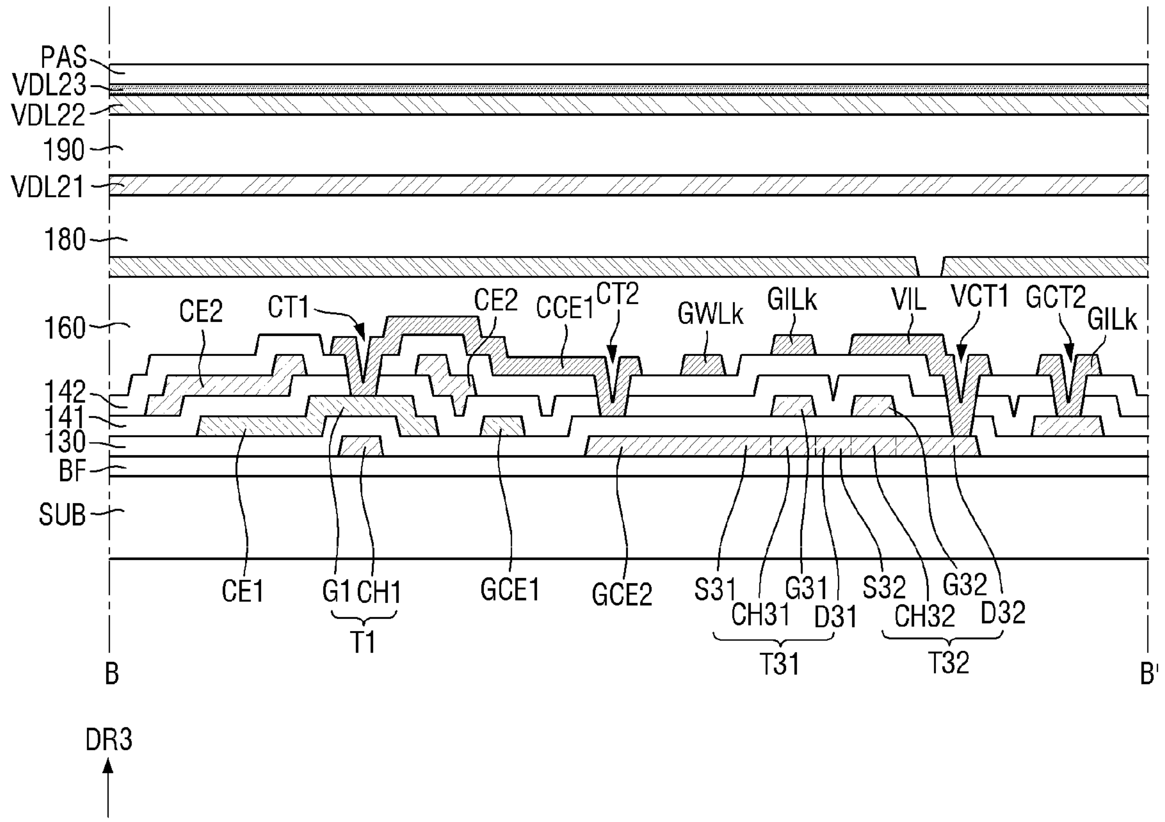
FIG. 20 is a cross-sectional view illustrating an example of a display panel taken along the line B-B' of FIG. 15.
Figure 21:
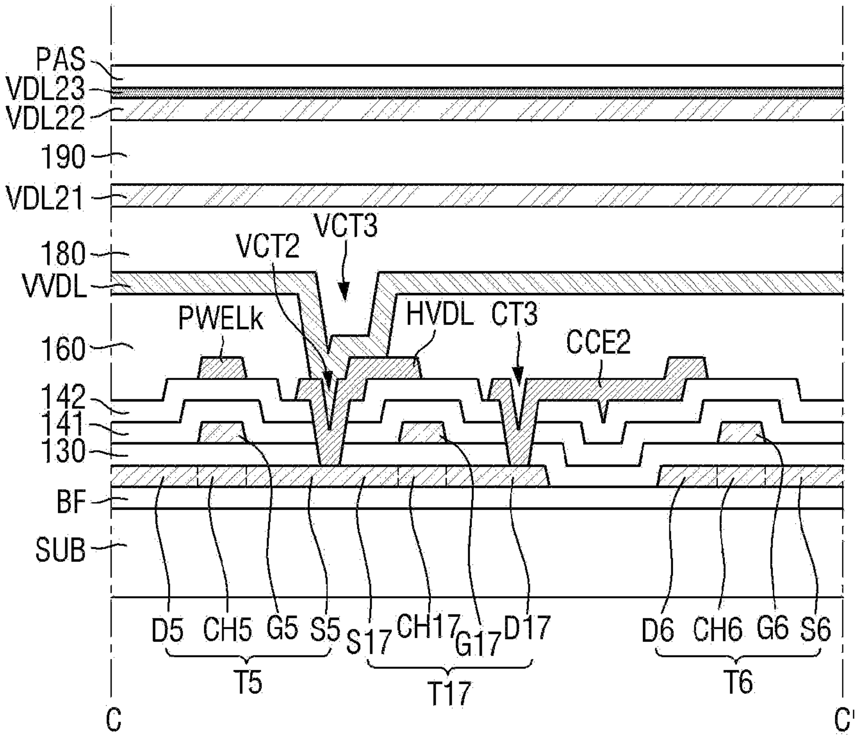
FIG. 21 is a cross-sectional view illustrating an example of a display panel taken along the line C-C' of FIG. 15.
Figure 22:
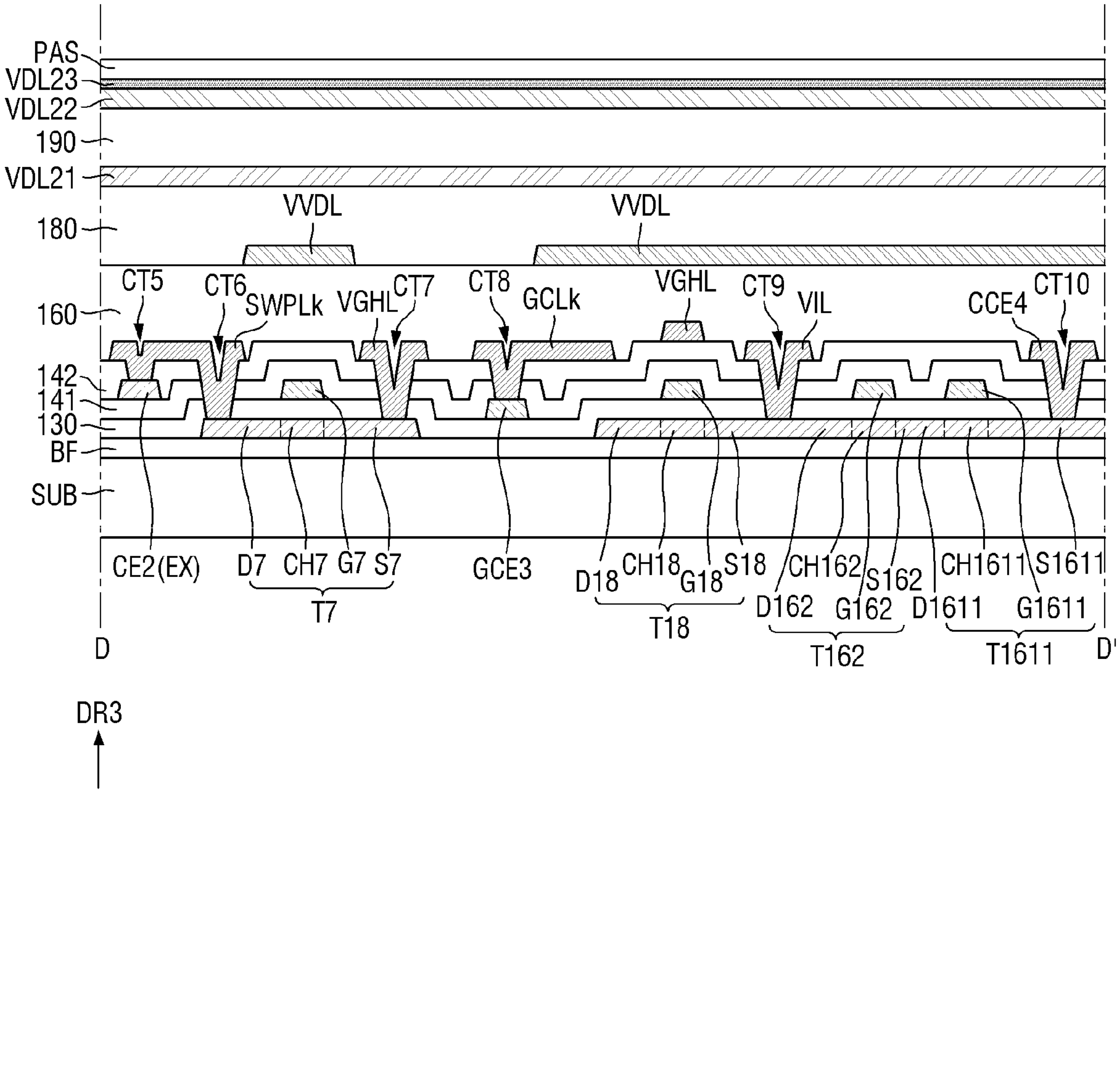
FIG. 22 is a cross-sectional view illustrating an example of a display panel taken along the line D-D' of FIG. 15.
Figure 23:
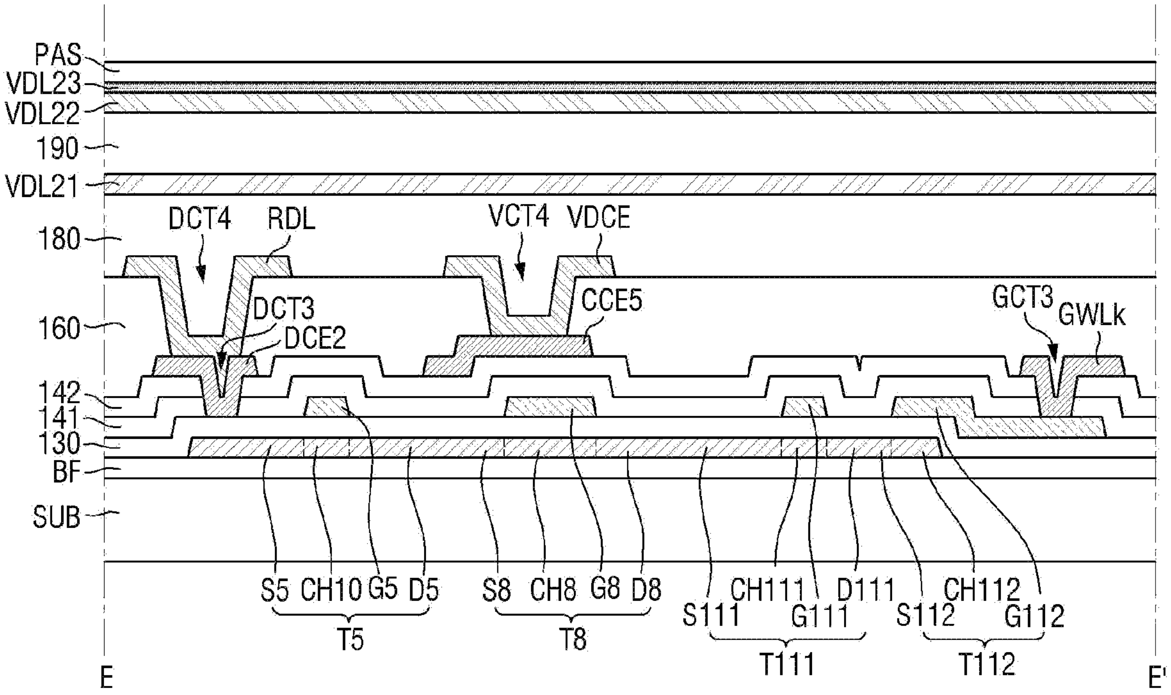
FIG. 23 is a cross-sectional view illustrating an example of a display panel taken along the line E-E' of FIG. 15.
Figure 24:
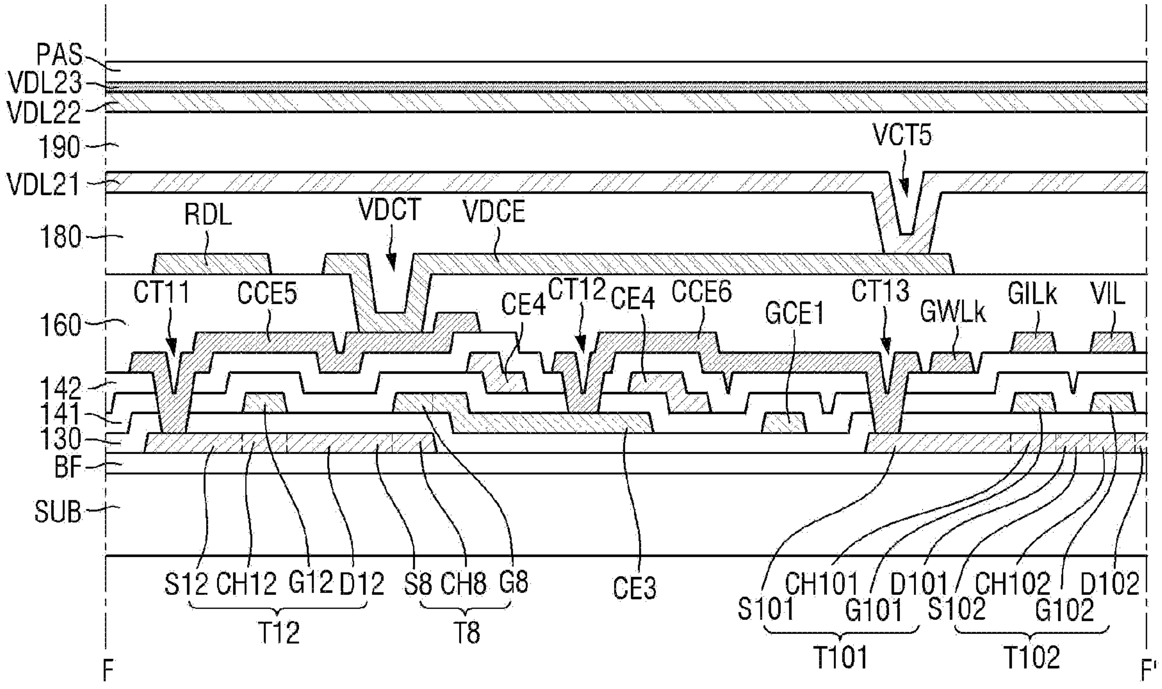
FIG. 24 is a cross-sectional view illustrating an example of a display panel taken along the line F-F' of FIG. 15.
Figure 25:
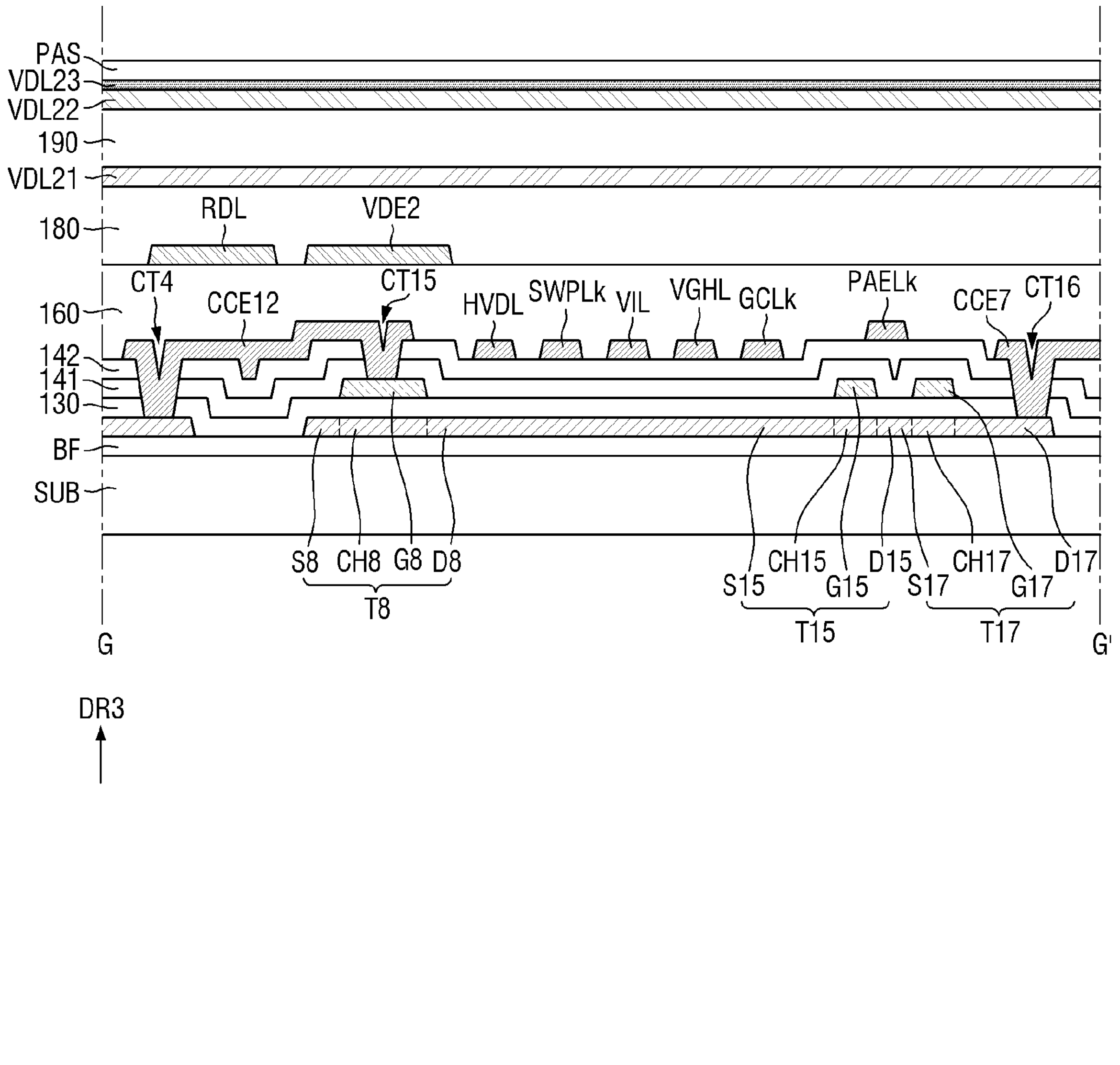
FIG. 25 is a cross-sectional view illustrating an example of a display panel taken along the line G-G' of FIG. 15.
Figure 26:
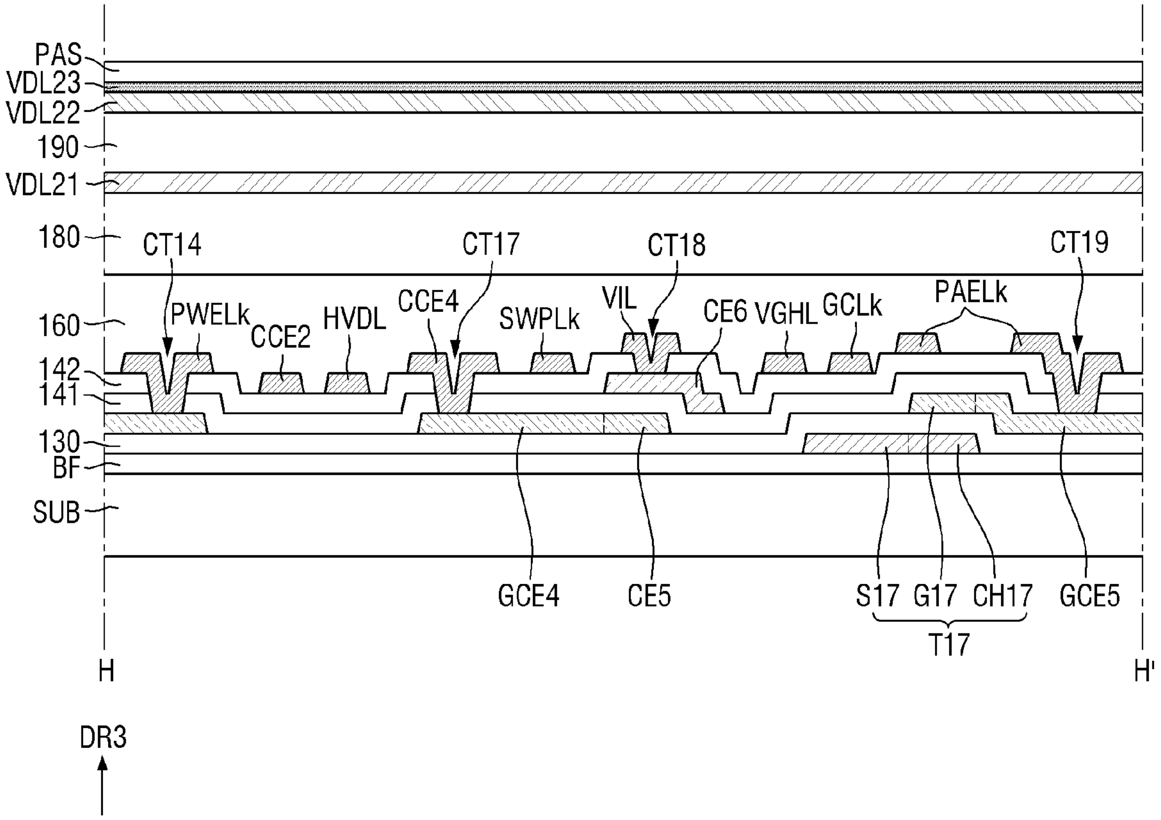
FIG. 26 is a cross-sectional view illustrating an example of a display panel taken along the line H-H' of FIG. 15.
Figure 27:
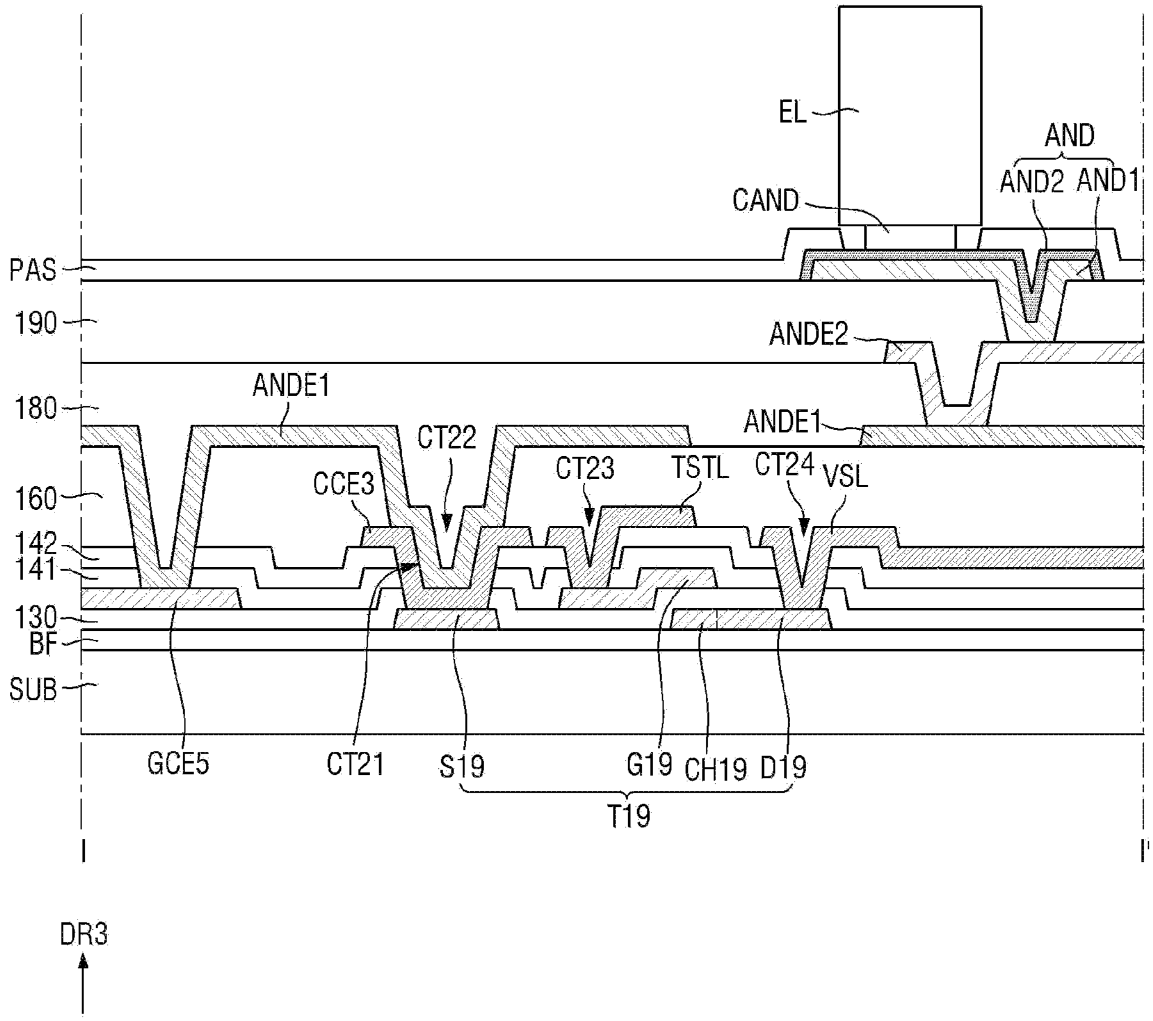
FIG. 27 is a cross-sectional view illustrating an example of a display panel taken along the line I-I' of FIG. 15.

FIG. 19 is a cross-sectional view illustrating an example of a display panel taken along the line A-A' of FIG. 15. FIG. 20 is a cross-sectional view illustrating an example of a display panel taken along the line B-B' of FIG. 15. FIG. 21 is a cross-sectional view illustrating an example of a display panel taken along the line C-C' of FIG. 15. FIG. 22 is a cross-sectional view illustrating an example of a display panel taken along the line D-D' of FIG. 15. FIG. 23 is a cross-sectional view illustrating an example of a display panel taken along the line E-E' of FIG. 15. FIG. 24 is a cross-sectional view illustrating an example of a display panel taken along the line F-F' of FIG. 15. FIG. 25 is a cross-sectional view illustrating an example of a display panel taken along the line G-G' of FIG. 15. FIG. 26 is a cross-sectional view illustrating an example of a display panel taken along the line H-H' of FIG. 15. FIG. 27 is a cross-sectional view illustrating an example of a display panel taken along the line I-I' of FIG. 15.

Referring to FIGS. 19 to 27, a buffer layer BF may be disposed on the substrate SUB. The substrate SUB may be formed of an insulating material such as glass or a polymer resin. For example, when the substrate SUB is formed of a polymer resin, it may include polyimide. The substrate SUB may be a flexible substrate which can be bent, folded or rolled.

The buffer layer BF is a layer for protecting transistors of the thin film transistor layer TFTL and a light emitting layer of the light emitting element layer from moisture permeating through the substrate SUB which is susceptible to moisture permeation. The buffer layer BF may be formed of a plurality of inorganic layers that are alternately stacked. For example, the buffer layer BF may be formed of multiple layers in which one or more inorganic layers of a silicon nitride layer, a silicon oxynitride layer, a silicon oxide layer, a titanium oxide layer and an aluminum oxide layer are alternately stacked.

An active layer may be disposed on the buffer layer BF. The active layer includes the first to nineteenth channels CH1 to CH19, the first to nineteenth source electrodes S1 to S19, and the first to nineteenth drains D1 to D19 of the first to nineteenth transistors T1 to T19. The active layer may include polycrystalline silicon, monocrystalline silicon, low-temperature polycrystalline silicon, amorphous silicon, or an oxide semiconductor.

The first to nineteenth channels CH1 to CH19 may overlap the first to nineteenth gate electrodes G1 to G19 in the third direction DR3, respectively. The first to nineteenth source electrodes S1 to S19 and the first to nineteenth drain electrodes D1 to D19 may not overlap the first to nineteenth gate electrodes G1 to G19 in the third direction DR3. The first to nineteenth source electrodes S1 to S19 and the first to nineteenth drain electrodes D1 to D19 may be conductive regions obtained by doping a silicon semiconductor or an oxide semiconductor with ions or impurities.

A gate insulating layer 130 may be disposed on the active layer. The gate insulating layer 130 may be formed of an inorganic layer, for example, a silicon nitride layer, a silicon oxynitride layer, a silicon oxide layer, a titanium oxide layer, or an aluminum oxide layer. The gate insulating layer 130 may be referred to as a first insulating layer.

A first gate metal layer may be disposed on the gate insulating layer 130. The first gate metal layer includes the first to nineteenth gate electrodes G1 to G19 of the first to nineteenth transistors T1 to T19, the first capacitor electrode CE1, the third capacitor electrode CE3, the fifth capacitor electrode CE5, and the first to sixth gate connection electrodes GCE1 to GCE6. The first to nineteenth gate electrodes G1 to G19, the first capacitor electrode CE1, the third capacitor electrode CE3, the fifth capacitor electrode CE5, and the first to sixth gate connection electrodes GCE1 to GCE6 may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

A first interlayer insulating layer 141 may be disposed on the first gate metal layer. The first interlayer insulating layer 141 may be formed of an inorganic layer, for example, a silicon nitride layer, a silicon oxynitride layer, a silicon oxide layer, a titanium oxide layer, or an aluminum oxide layer. The first interlayer insulating layer 141 may be referred to as a second insulating layer.

A second gate metal layer may be disposed on the first interlayer insulating layer 141. The second gate metal layer may include the second capacitor electrode CE2, the fourth capacitor electrode CE4, and the sixth capacitor electrode CE6. The second gate metal layer may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

The second capacitor electrode CE2 may overlap the first capacitor electrode CE1 in the third direction DR3, the fourth capacitor electrode CE4 may overlap the third capacitor electrode CE3 in the third direction DR3, and the sixth capacitor electrode CE6 may overlap the fifth capacitor electrode CE5 in the third direction DR3. Because the first interlayer insulating layer 141 has a dielectric constant (e.g., a predetermined dielectric constant), the first capacitor C1 may be formed by the first capacitor electrode CE1, the second capacitor electrode CE2, and the first interlayer insulating layer 141 disposed therebetween. Further, the second capacitor C2 may be formed by the third capacitor electrode CE3, the fourth capacitor electrode CE4, and the first interlayer insulating layer 141 disposed therebetween. The third capacitor C3 may be formed by the fifth capacitor electrode CE5, the sixth capacitor electrode CE6, and the first interlayer insulating layer 141 disposed therebetween.

A second interlayer insulating layer 142 may be disposed on the second gate metal layer. The second interlayer insulating layer 142 may be formed of an inorganic layer, for example, a silicon nitride layer, a silicon oxynitride layer, a silicon oxide layer, a titanium oxide layer, or an aluminum oxide layer. The second interlayer insulating layer 142 may be referred to as a third insulating layer.

A first source metal layer may be disposed on the second interlayer insulating layer 142. The first source metal layer may include the initialization voltage lines VIL, the $k^{th}$ scan initialization line GILk, the $k^{th}$ scan write line GWLk, the $k^{th}$ PWM emission line PWELk, the first horizontal power line HVDL, the gate-off voltage line VGHL, the $k^{th}$ sweep signal line SWPLk, the $k^{th}$ scan control line GCLk, the $k^{th}$ PAM emission line PAELk, the test signal line TSTL, and the third power supply line VSL. Further, the first source metal layer may include the first and second data connection electrodes DCE1 and DCE2 and the first to seventh connection electrodes CCE1 to CCE7. The first source metal layer may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

The $k^{th}$ scan write line GWLk may be connected to the first gate electrode GCE1 through the first gate contact hole GCT1 and the third gate contact hole GCT3, penetrating the first interlayer insulating layer 141 and the second interlayer insulating layer 142. The $k^{th}$ scan initialization line GILk may be connected to the second gate connection electrode GCE2 through the second gate contact hole GCT2 penetrating the first interlayer insulating layer 141 and the second interlayer insulating layer 142. The $k^{th}$ scan control line GCLk may be connected to the third gate connection electrode GCE3 through the eighth contact hole CT8 penetrating the first interlayer insulating layer 141 and the second interlayer insulating layer 142. The $k^{th}$ PAM emission line PAELk may be connected to the fifth gate connection electrode GCE5 through the nineteenth contact hole CT19 penetrating the first interlayer insulating layer 141 and the second interlayer insulating layer 142. The $k^{th}$ PWM emission line PWELk may be connected to the sixth gate connection electrode GCE6 through the fourteenth contact hole CT14 penetrating the first interlayer insulating layer 141 and the second interlayer insulating layer 142.

The initialization voltage line VIL may be connected to the second sub-drain electrode D32 and the sixth sub-drain electrode D102 through the first power contact hole VCT1 penetrating the gate insulating layer 130, the first interlayer insulating layer 141, and the second interlayer insulating layer 142. The initialization voltage line VIL may be connected to the tenth sub-drain electrode D162 and the eighteenth drain electrode D18 through the ninth contact hole CT9 penetrating the gate insulating layer 130, the first interlayer insulating layer 141, and the second interlayer insulating layer 142. The initialization voltage line VIL may be connected to the sixth capacitor electrode CE6 through the eighteenth contact hole CT18 penetrating the second interlayer insulating layer 142. The first horizontal power line HVDL may be connected to the fifth source electrode S5 and the thirteenth source electrode S13 through the second power contact hole VCT2 penetrating the gate insulating layer 130, the first interlayer insulating layer 141, and the second interlayer insulating layer 142. The gate-off voltage line VGHL may be connected to the seventh source electrode S7 through the seventh contact hole CT7 penetrating the gate insulating layer 130, the first interlayer insulating layer 141, and the second interlayer insulating layer 142. The test signal line TSTL may be connected to the nineteenth gate electrode G19 through the twenty-third contact hole CT23 penetrating the first interlayer insulating layer 141 and the second interlayer insulating layer 142. The third power line VSL may be connected to the nineteenth drain electrode D19 through the twenty-fourth contact hole CT24 penetrating the gate insulating layer 130, the first interlayer insulating layer 141, and the second interlayer insulating layer 142.

The first data connection electrode DCE1 may be connected to the second source electrode S2 through the first data contact hole DCT1 penetrating the gate insulating layer 130, the first interlayer insulating layer 141, and the second interlayer insulating layer 142. The second data connection electrode DCE2 may be connected to the ninth source electrode S9 through the third data contact hole DCT3 penetrating the gate insulating layer 130, the first interlayer insulating layer 141, and the second interlayer insulating layer 142.

The first connection electrode CCE1 may be connected to the first gate electrode G1 through the first contact hole CT1 penetrating the first interlayer insulating layer 141 and the second interlayer insulating layer 142, and may be connected to the first sub-source electrode S31 and the fourth sub-drain electrode D42 through the second contact hole CT2 penetrating the gate insulating layer 130, the first interlayer insulating layer 141, and the second interlayer insulating layer 142.

The second connection electrode CCE2 may be connected to the seventeenth drain electrode D17 through the third contact hole CT3 penetrating the gate insulating layer 130, the first interlayer insulating layer 141, and the second interlayer insulating layer 142, may be connected to the fourteenth drain electrode D14 through the fourth contact hole CT4 penetrating the gate insulating layer 130, the first interlayer insulating layer 141, and the second interlayer insulating layer 142, and may be connected to the fourth capacitor electrode CE4 through the fifteenth contact hole CT15 penetrating the second interlayer insulating layer 142.

The third connection electrode CCE3 may be connected to the nineteenth source electrode S19 through the twenty-first contact hole CT21 penetrating the gate insulating layer 130, the first interlayer insulating layer 141, and the second interlayer insulating layer 142.

The fourth connection electrode CCE4 may be connected to the ninth sub-source electrode S161 through the tenth contact hole CT10 penetrating the gate insulating layer 130, the first interlayer insulating layer 141, and the second interlayer insulating layer 142, and may be connected to the fourth gate connection electrode CCE4 through the seventeenth contact hole CT17 penetrating the first interlayer insulating layer 141 and the second interlayer insulating layer 142.

The fifth connection electrode CCE5 may be connected to the twelfth source electrode S12 and the fourteenth source electrode S14 through the eleventh contact holes CT11 penetrating the gate insulating layer 130, the first interlayer insulating layer 141, and the second interlayer insulating layer 142.

The sixth connection electrode CCE6 may be connected to the eighth gate electrode G8 through the twelfth contact hole CT12 penetrating the first interlayer insulating layer 141 and the second interlayer insulating layer 142, and may be connected to the fifth sub-source electrode S101 and the eighth sub-drain electrode D112 through the thirteenth contact hole CT13 penetrating the gate insulating layer 130, the first interlayer insulating layer 141, and the second interlayer insulating layer 142.

The seventh connection electrode CCE7 may be connected to the seventeenth drain electrode D17 and the eighteenth drain electrode D18 through the sixteenth contact holes CT16 penetrating the gate insulating layer 130, the first interlayer insulating layer 141, and the second interlayer insulating layer 142.

A first planarization layer 160 may be disposed on the first source metal layer. The first planarization layer 160 may be formed of an organic layer such as acryl resin, epoxy resin, phenolic resin, polyamide resin, polyimide resin and the like. The first planarization layer 160 may be referred to as a fourth insulating layer.

A second source metal layer may be disposed on the first planarization layer 160. The second source metal layer may include the $j^{th}$ data line DLj, the first vertical power line VVDL, and the first PAM data line RDL. Further, the second source metal layer may include a first anode connection electrode ANDE1 and a second power connection electrode VDCE. The second source metal layer may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

The $j^{th}$ data line DLj may be connected to the first data connection electrode DCE1 through the second data contact hole DCT2 penetrating the first planarization layer 160. The first PAM data line RDL may be connected to the second data connection electrode DCE2 through the fourth data contact hole DCT4 penetrating the first planarization layer 160. The first vertical power line VVDL may be connected to the first horizontal power line HVDL through a third power contact hole VCT3 penetrating the first planarization layer 160. The third power contact hole VCT3 may overlap the second power contact hole VCT2 in the third direction DR3. The area of the third power contact hole VCT3 may be larger than the area of the second power contact hole VCT2.

The first anode connection electrode ANDE1 may be connected to the seventh connection electrode CCE7 through the twentieth contact hole CT20 penetrating the first planarization layer 160, and may be connected to the third connection electrode CCE3 through the twenty-second contact hole CT22 penetrating the first planarization layer 160. The second power connection electrode VDCE may be connected to the fifth connection electrode CCE5 through the fourth power contact hole VCT4 penetrating the first planarization layer 160.

A second planarization layer 180 may be disposed on the second source metal layer. The second planarization layer 180 may be formed of an organic layer such as acryl resin, epoxy resin, phenolic resin, polyamide resin, polyimide resin and the like. The second planarization layer 180 may be referred to as a fifth insulating layer.

A third source metal layer may be disposed on the second planarization layer 180. The third source metal layer may include a first sub power line VDL21. The first sub power line VDL21 may be connected to the second power connection electrode VDCE through the fifth power contact hole VCT5 penetrating the second planarization layer 180. The third source metal layer may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

A third planarization layer 190 may be disposed on the third source metal layer. The third planarization layer 190 may be formed of an organic layer such as acryl resin, epoxy resin, phenolic resin, polyamide resin, polyimide resin and the like. The third planarization layer 190 may be referred to as a sixth insulating layer.

A fourth source metal layer may be disposed on the third planarization layer 190. The fourth source metal layer may include a second sub power line VDL22, a third sub power line VDL23, a first pixel electrode AND1, and a second pixel electrode AND2. The second sub power line VDL22 and the first pixel electrode AND1 may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof. The third sub power line VDL23 and the second pixel electrode AND2 may be formed of a transparent conductive material (TCO) such as ITO or IZO.

A passivation layer PAS may be disposed on the fourth source metal layer. The passivation layer PAS may be formed of a silicon nitride layer, a silicon oxynitride layer, a silicon oxide layer, a titanium oxide layer, or an aluminum oxide layer. The passivation layer PAS may expose a part of the top surface of the pixel electrode AND without covering it.

The light emitting element EL may be disposed on the pixel electrode AND that is not covered by the passivation layer PAS. A contact electrode CAND may be disposed between the light emitting element EL and the pixel electrode AND.

The light emitting element EL may be an inorganic light emitting diode. The light emitting element EL may include a first semiconductor layer, an electron blocking layer, an active layer, a superlattice layer, and a second semiconductor layer that are sequentially stacked.

The first semiconductor layer may be disposed on the contact electrode CAND. The first semiconductor layer may be doped with a first conductive dopant such as Mg, Zn, Ca, Se, Ba, or the like. For example, the first semiconductor layer may be p-GaN doped with p-type Mg.

The electron blocking layer may be disposed on the first semiconductor layer. The electron blocking layer may be the layer for suppressing or preventing too many electrons from flowing into the active layer. For example, the electron blocking layer may be p-AlGaN doped with p-type Mg. The electron blocking layer may be omitted.

The active layer may be disposed on the electron blocking layer. The active layer may emit light by coupling of electron-hole pairs according to an electrical signal applied through the first semiconductor layer and the second semiconductor layer.

The active layer may include a material having a single or multiple quantum well structure. When the active layer contains a material having a multiple quantum well structure, the active layer may have the structure in which a plurality of well layers and barrier layers are alternately laminated.

Alternatively, the active layer may have a structure in which semiconductor materials having large band gap energy and semiconductor materials having small band gap energy are alternately stacked, and may include other Group III to Group V semiconductor materials according to the wavelength band of the emitted light.

When the active layer includes InGaN, the color of emitted light may vary depending on the content of indium. For example, as the content of indium increases, the wavelength band of light emitted from the active layer may be shifted to a red wavelength band, and as the content of indium decreases, the wavelength band of the light emitted from the active layer may be shifted to a blue wavelength band. For example, the content of indium (In) in the active layer of the light emitting element of the third sub-pixel BP may be approximately 15%, the content of indium (In) in the active layer of the light emitting element of the second sub-pixel GP may be approximately 25%, and the content of indium (In) in the active layer of the light emitting element of the first sub-pixel RP may be 35% or higher. That is, by adjusting the content of indium (In) in the active layer, the light emitting element of the first sub-pixel RP may emit first light, the light emitting element of the second sub-pixel GP may emit second light, and the light emitting element of the third sub-pixel BP may emit third light.

The superlattice layer may be disposed on the active layer. The superlattice layer may be the layer for reducing stress between the second semiconductor layer and the active layer. For example, the superlattice layer may be formed of InGaN or GaN. The superlattice layer may be omitted.

The second semiconductor layer may be disposed on the superlattice layer. The second semiconductor layer may be doped with a second conductive dopant such as Si, Ge, Sn, or the like. For example, the second semiconductor layer may be n-GaN doped with n-type Si.

Further, a fourth planarization layer for flattening the stepped portion formed by the light emitting element EL may be disposed. The fourth planarization layer may be disposed around (or to surround) the side surface(s) of the light emitting element EL, and may expose the top surface of the light emitting element EL without covering it.

A common electrode to which a common voltage is applied may be disposed on the light emitting element EL and the fourth planarization layer. The common electrode 173 may be formed of a transparent conductive material (TCO) such as ITO or IZO capable of transmitting light.

Figure 28:
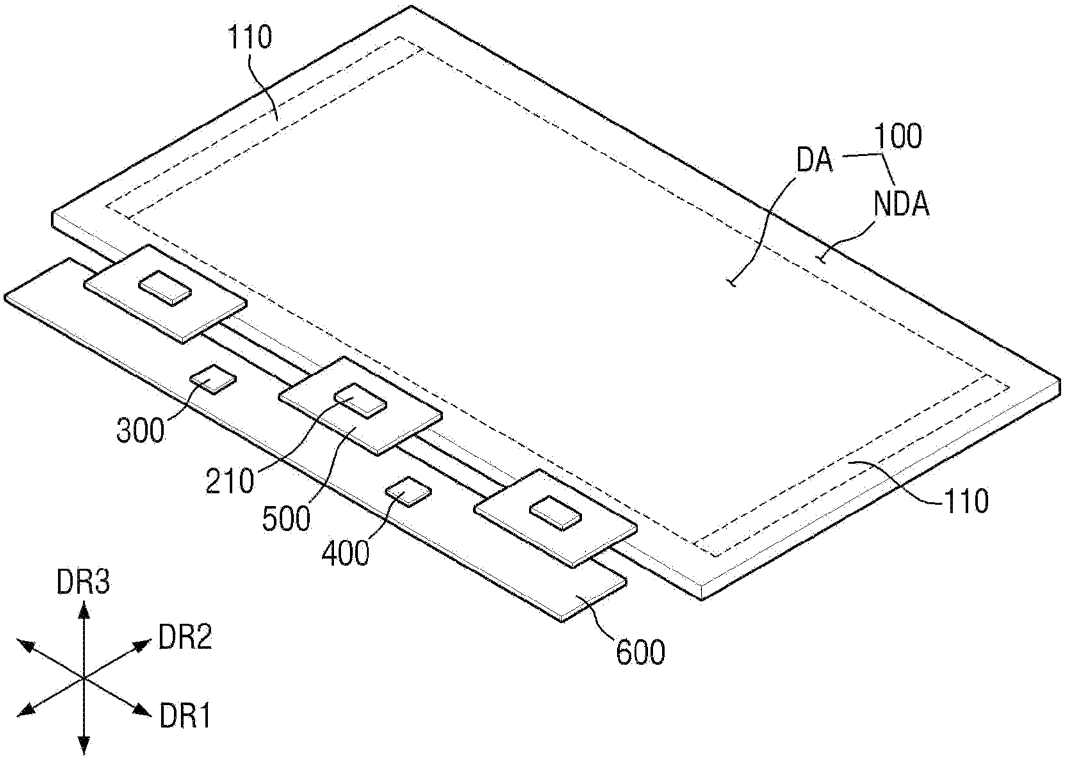
FIG. 28 is a plan view illustrating a display device according to one or more embodiments.

FIG. 28 is a plan view illustrating a display device according to one or more embodiments.

Referring to FIG. 28, a display device 10 is a device for displaying a moving image or a still image. The display device 10 may be used as a display screen of various devices, such as a television, a laptop computer, a monitor, a billboard and an Internet-of-Things (IOT) device, as well as portable electronic devices such as a mobile phone, a smartphone, a tablet personal computer (PC), a smart watch, a watch phone, a mobile communication terminal, an electronic notebook, an electronic book, a portable multimedia player (PMP), a navigation device and an ultra-mobile PC (UMPC).

The display device 10 includes the display panel 100, source driving circuits 210, and a source circuit board 500.

The display panel 100 may be formed in a rectangular shape, in a plan view, having long sides in a first direction (e.g., X-axis direction) and short sides in a second direction (e.g., Y-axis direction) crossing the first direction (e.g., X-axis direction). The corner where the long side in the first direction (e.g., X-axis direction) and the short side in the second direction (e.g., Y-axis direction) meet may be rounded to have a suitable curvature (e.g., a predetermined curvature) or may be right-angled. The planar shape of the display panel 100 is not limited to the rectangular shape, and may be formed in another polygonal shape, a circular shape or an elliptical shape. The display panel 100 may be formed to be flat, but is not limited thereto. For example, the display panel 100 may include a curved portion formed at left and right ends and having a suitable curvature (e.g., a predetermined curvature) or a varying curvature. In addition, the display panel 100 may be formed flexibly so that it can be curved, bent, folded, or rolled.

The display panel 100 may include a display area DA for displaying an image and a non-display area NDA disposed around the display area DA along the edge or periphery of the display area DA. The display area DA may occupy most of the area of the display panel 100. The display area DA may be disposed at the center (or central region) of the display panel 100. The sub-pixels RP, GP, and BP may be disposed in the display area DA to display an image. Each of the sub-pixels RP, GP, and BP may include an inorganic light emitting element including an inorganic semiconductor as a light emitting element that emits light.

The non-display area NDA may be disposed adjacent to the display area DA. The non-display area NDA may be an area outside the display area DA. The non-display area NDA may be disposed to surround the display area DA. The non-display area NDA may be an edge area of the display area DA.

The scan driver 110 may be disposed in the non-display area NDA. Although the case in which the scan driver 110 is disposed on both sides of the display area DA, e.g., on the left side and the right side of the display area DA has been illustrated, the present specification is not limited thereto. The scan driver 110 may be disposed on one side of the display area DA.

Further, display pads may be arranged in the non-display area NDA to be connected to the source circuit boards 500. The display pads may be disposed on one side edge of the display panel 100. For example, the display pads may be disposed at the lower edge of the display panel 100.

The source circuit boards 500 may be disposed on the display pads disposed on one side edge of the display panel 100. The source circuit boards 500 may be attached to display pads using a conductive adhesive member such as an anisotropic conductive film. Accordingly, the source circuit boards 500 may be electrically connected to the signal lines of the display panel 100. The source circuit boards 500 may each be a flexible printed circuit board, a printed circuit board (PCB), or a flexible film such as a chip on film.

The source driver 200 may include the source driving circuits 210. The source driving circuits 210 may generate data voltages and supply the data voltages to the display panel 100 through the source circuit boards 500.

Each of the source driving circuits 210 may be formed of an integrated circuit (IC) and attached to the source circuit board 500. Alternatively, the source driving circuits 210 may be attached onto the display panel 100 by a chip on glass (COG) method, a chip on plastic (COP) method, or an ultrasonic bonding method.

A control circuit board 600 may be attached to the source circuit boards 500 through a conductive adhesive member such as an anisotropic conductive film. The control circuit board 600 may be electrically connected to the source circuit boards 500. The control circuit board 600 may be a flexible printed circuit board or a printed circuit board.

Each of the timing controller 300 and the power supply unit 400 may be formed as an integrated circuit (IC) and attached to the control circuit board 600. The timing controller 300 may supply digital video data and timing signals to the source driving circuits 210. The power supply unit 400 may generate and output voltages for driving the sub-pixels of the display panel 100 and the source driving circuits 210.

Figure 29:
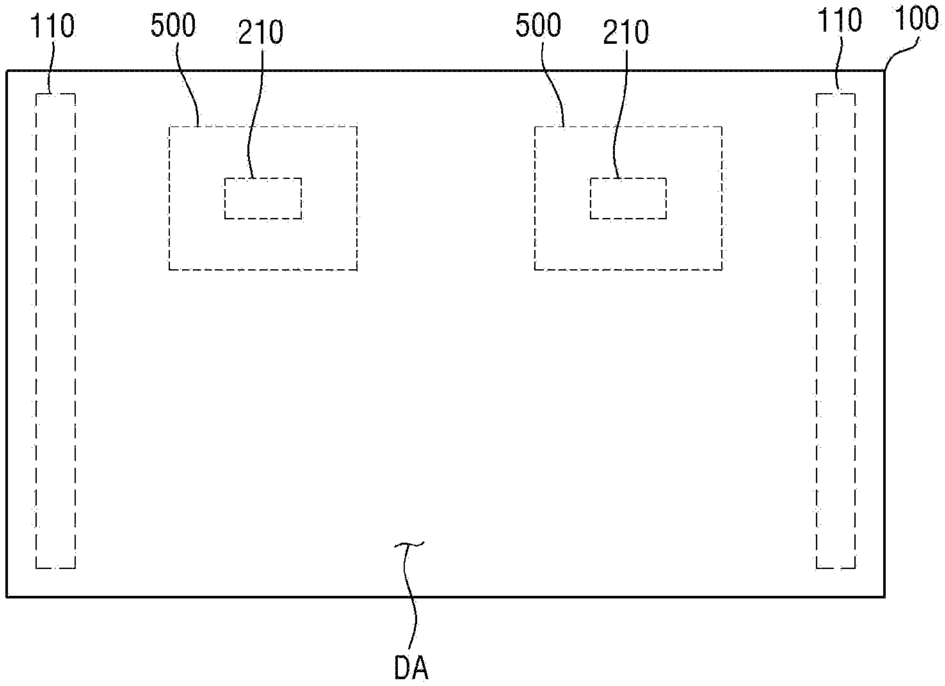
FIG. 29 is a plan view illustrating a display device according to one or more embodiments.

FIG. 29 is a plan view illustrating a display device according to one or more embodiments.

The embodiment of FIG. 29 is different from the embodiment of FIG. 28 in that the display panel 100 does not include the non-display area NDA, the scan driver 110 is disposed in the display area DA, and the source circuit board 500 on which the source driver circuit 500 is mounted is disposed on the rear surface of the display panel 100. In FIG. 29, the differences from the embodiment of FIG. 28 will be mainly described.

Referring to FIG. 29, the scan driver 110 may be disposed in the display area DA. The scan driver 110 does not overlap the sub-pixels RP, GP, and BP, and may be disposed between the sub-pixels RP, GP, and BP.

The source circuit boards 500 may be disposed on the rear surface of the display panel 100. In this case, the display pads connected to the source circuit boards 500 may be disposed on the rear surface of the display panel 100. Further, pad connection electrodes respectively connected to the display pads while penetrating the display panel 100 may be disposed in the display area DA of the display panel 100.

Figure 30:
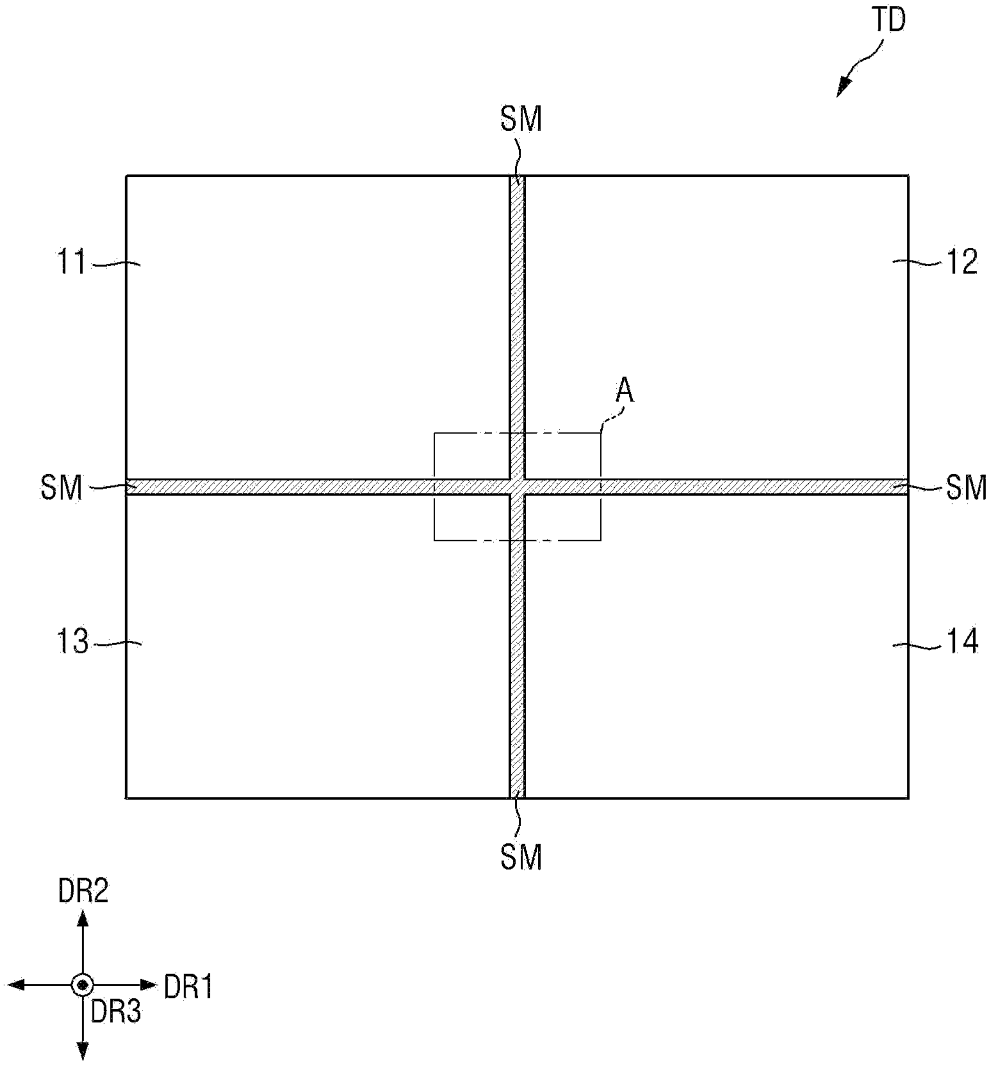
FIG. 30 is a plan view illustrating a tiled display device including the display device shown in FIG. 29.

FIG. 30 is a plan view illustrating a tiled display device including the display device shown in FIG. 29.

Referring to FIG. 30, a tiled display device TD may include a plurality of display devices 11, 12, 13, and 14. For example, the tiled display device TD may include a first display device 11, a second display device 12, a third display device 13, and a fourth display device 14.

The plurality of display devices 11, 12, 13, and 14 may be arranged in a grid shape. For example, the first display device 11 and the second display device 12 may be disposed along the first direction DR1. The first display device 11 and the third display device 13 may be disposed along the second direction DR2. The third display device 13 and the fourth display device 14 may be disposed along the first direction DR1. The second display device 12 and the fourth display device 14 may be disposed along the second direction DR2.

The number and arrangement of the plurality of display devices 11, 12, 13, and 14 in the tiled display device TD are not limited to those illustrated in FIG. 30. The number and arrangement of the display devices 11, 12, 13, and 14 in the tiled display device TD may be determined by the sizes of the display device 10 and the tiled display device TD and the shape of the tiled display device TD.

The plurality of display devices 11, 12, 13, and 14 may have the same size, but the present disclosure is not limited thereto. For example, the plurality of display devices 11, 12, 13, and 14 may have different sizes.

Each of the plurality of display devices 11, 12, 13, and 14 may have a rectangular shape including long sides and short sides. The plurality of display devices 11, 12, 13, and 14 may be disposed such that the long sides or the short sides thereof are connected to each other. Some or all of the plurality of display devices 11, 12, 13, and 14 may be disposed at the edge of the tiled display device TD, and may form one side of the tiled display device TD. At least one of the plurality of display devices 11, 12, 13, and 14 may be disposed at at least one corner of the tiled display device TD, and may form two adjacent sides of the tiled display device TD. At least one of the plurality of display devices 11, 12, 13, and 14 may be surrounded by other display devices.

The tiled display device TD may include a joint SM disposed between the plurality of display devices 11, 12, 13, and 14. For example, the joint SM may be disposed between the first display device 11 and the second display device 12, between the first display device 11 and the third display device 13, between the second display device 12 and the fourth display device 14, and between the third display device 13 and the fourth display device 14.

The joint SM may include a coupling member or an adhesive member. In this case, the plurality of display devices 11, 12, 13, and 14 may be connected to each other by the coupling member or the adhesive member of the joint SM.

When the scan driver 110 is disposed in the display area DA and the source circuit boards 500 are disposed on the rear surface of the display panel 100 as shown in FIG. 29, the non-display areas NDA in which the sub-pixels RP, GP, and BP are not disposed may be omitted in each of the plurality of display devices 11, 12, 13 and 14, which makes it may be possible to minimize or prevent the joint SM from being visually recognized in the tiled display device TD. Therefore, it may be possible to improve a sense of immersion in an image of the tiled display device by allowing the images of the plurality of display devices 11, 12, 13, and 14 from being viewed without disconnection despite the joint SM.

However, the aspects and features of embodiments of the present disclosure are not restricted to the one set forth herein. The above and other aspects of the present disclosure will become more apparent to one of daily skill in the art to which the present disclosure pertains by referencing the claims, with functional equivalents thereof to be included therein.

What is claimed is:

1. A display device comprising:

a first scan line to receive a first scan signal;

a second scan line to receive a second scan signal;

a sweep signal line to receive a sweep signal;

a first data line to receive a first data voltage;

a second data line to receive a second data voltage; and a sub-pixel connected to the first scan line, the second scan line, the sweep signal line, the first data line, and the second data line, wherein the sub-pixel comprises:

a light emitting element;

a first pixel driver configured to generate a control current according to the first data voltage of the first data line;

a second pixel driver configured to generate a driving current applied to the light emitting element according to the second data voltage of the second data line; and a third pixel driver configured to control a period in which the driving current is applied to the light emitting element according to the control current of the first pixel driver, and wherein the first pixel driver comprises:

a first transistor configured to generate the control current according to the first data voltage;

a second transistor configured to apply the first data voltage of the first data line to a first electrode of the first transistor according to the first scan signal;

a third transistor configured to apply an initialization voltage of an initialization voltage line to a gate electrode of the first transistor according to the second scan signal; and a first capacitor located between the sweep signal line and the gate electrode of the first transistor.

2. The display device of claim 1, wherein the third transistor comprises a plurality of transistors connected in series.

3. The display device of claim 1, wherein the third transistor comprises:

a first sub-transistor comprising a gate electrode connected to the second scan line and a first electrode connected to the initialization voltage line; and a second sub-transistor comprising a gate electrode connected to the second scan line, a first electrode connected to a second electrode of the first sub-transistor, and a second electrode connected to the gate electrode of the first transistor.

4. The display device of claim 1, wherein the first pixel driver further comprises a fourth transistor configured to connect a gate electrode and a second electrode of the first transistor according to the first scan signal.

5. The display device of claim 1, further comprising:

a first power voltage line to receive a first power voltage;

a first emission line to receive a first emission signal; and a third scan line to receive a third scan signal, wherein the first pixel driver further comprises:

a fifth transistor configured to connect the first power voltage line to the first electrode of the first transistor according to the first emission signal;

a sixth transistor configured to connect a second electrode of the first transistor to a first node according to the first emission signal; and a seventh transistor configured to connect the sweep signal line to a gate-off voltage line to receive a gate-off voltage according to the third scan signal.

6. The display device of claim 1, wherein the second pixel driver comprises:

an eighth transistor configured to generate the driving current according to the second data voltage;

a ninth transistor configured to apply the second data voltage of the second data line to a first electrode of the eighth transistor according to the first scan signal; and a tenth transistor configured to apply the initialization voltage of the initialization voltage line to a gate electrode of the eighth transistor according to the second scan signal.

7. The display device of claim 6, wherein the tenth transistor comprises a plurality of transistors connected in series.

8. The display device of claim 6, wherein the tenth transistor comprises:

a third sub-transistor comprising a gate electrode connected to the second scan line and a first electrode connected to the initialization voltage line; and a fourth sub-transistor comprising a gate electrode connected to the second scan line, a first electrode connected to a second electrode of the third sub-transistor, and a second electrode connected to the gate electrode of the eighth transistor.

9. The display device of claim 6, wherein the second pixel driver further comprises an eleventh transistor configured to connect the gate electrode and a second electrode of the eighth transistor according to the first scan signal.

10. The display device of claim 6, further comprising:

a first power voltage line to receive a first power voltage;

a second power voltage line to receive a second power voltage;

a first emission line to receive a first emission signal; and a third scan line to receive a third scan signal, wherein the second pixel driver further comprises:

a twelfth transistor configured to connect the first power voltage line to a second node according to the third scan signal;

a thirteenth transistor configured to connect the second power voltage line to a first electrode of the ninth transistor according to the first emission signal;

a fourteenth transistor configured to connect the second power voltage line to the second node according to the first emission signal; and a second capacitor located between a gate electrode of the eighth transistor and the second node.

11. The display device of claim 1, further comprising:

a second emission line to receive a second emission signal; and a third scan line to receive a third scan signal, wherein the third pixel driver comprises:

a fifteenth transistor comprising a gate electrode connected to a first node;

a sixteenth transistor configured to connect the first node to the initialization voltage line according to the third scan signal;

a seventeenth transistor configured to connect a second electrode of the fifteenth transistor to a first electrode of the light emitting element according to the second emission signal; and a third capacitor located between the first node and the initialization voltage line.

12. The display device of claim 11, wherein the third pixel driver further comprises an eighteenth transistor configured to connect the first electrode of the light emitting element to the initialization voltage line according to the third scan signal.

13. The display device of claim 11, further comprising:

a test signal line to receive a test signal; and a third power voltage line to receive a third power voltage, wherein the third pixel driver further comprises a nineteenth transistor configured to connect the first electrode of the light emitting element to the third power voltage line according to the test signal.

14. The display device of claim 1, wherein the sweep signal has a pulse that linearly decreases from a gate-on voltage to a gate-off voltage.

15. A display device comprising:

a first control line to receive a first scan signal;

a first emission line to receive a first emission signal;

a first data line to receive a first data voltage;

a second data line to receive a second data voltage;

a first power voltage line to receive a first power voltage;

a second power voltage line to receive a second power voltage; and a sub-pixel connected to the first control line, the first emission line, the first data line, and the second data line, wherein the sub-pixel comprises:

a light emitting element;

a first pixel driver configured to generate a driving current applied to the light emitting element according to the first data voltage of the first data line;

a second pixel driver configured to generate a control current according to the second data voltage of the second data line; and a third pixel driver configured to control a period in which the driving current is applied to the light emitting element according to the control current of the second pixel driver, wherein the first pixel driver comprises:

a first transistor configured to generate the driving current according to a data voltage applied to a gate electrode;

a first capacitor located between the gate electrode of the first transistor and a first node;

a second transistor configured to connect the first node to the first power voltage line according to the first scan signal;

a third transistor configured to connect a first electrode of the first transistor to the second power voltage line according to the first emission signal; and a fourth transistor configured to connect the first node to the second power voltage line according to the first emission signal.

16. The display device of claim 15, further comprising:

a second scan line to receive a second scan signal; and a third scan line to receive a third scan signal, wherein the first pixel driver further comprises:

a fifth transistor configured to apply the first data voltage of the first data line to the first electrode of the first transistor according to the second scan signal;

a sixth transistor configured to apply an initialization voltage of an initialization voltage line to the gate electrode of the first transistor according to the third scan signal; and a seventh transistor configured to connect the gate electrode and a second electrode of the first transistor according to the second scan signal.

17. The display device of claim 16, wherein each of the sixth transistor and the seventh transistor comprises a plurality of transistors connected in series.

18. A display device comprising:

a substrate;

an active layer comprising a first channel, a first source electrode, and a first drain electrode on the substrate;

a first insulating layer on the active layer;

a first gate electrode and a first capacitor electrode on the first insulating layer and overlapping the first channel;

a second insulating layer on the first gate electrode;

a second capacitor electrode on the second insulating layer and overlapping the first capacitor electrode;

a third insulating layer on the second capacitor electrode; and a sweep signal line on the third insulating layer and to receive a sweep signal, wherein the sweep signal line is connected to the second capacitor electrode through a first contact hole penetrating the third insulating layer.

19. The display device of claim 18, wherein the sweep signal has a pulse that linearly decreases from a gate-on voltage to a gate-off voltage.

20. The display device of claim 18, further comprising:

a first sub power voltage line on the third insulating layer and to which a first power voltage is applied; and a first emission line on the third insulating layer and to receive a first emission signal, wherein the second capacitor electrode crosses the first sub power voltage line and the first emission line.

21. The display device of claim 20, wherein the active layer comprises a second channel, a second source electrode, and a second drain electrode, wherein the display device further comprises a second gate electrode on the first insulating layer, connected to the first emission line, and overlapping the active layer, and wherein the first sub power voltage line is connected to the second source electrode through a second contact hole penetrating the first insulating layer, the second insulating layer, and the third insulating layer.

22. The display device of claim 21, further comprising:

a fourth insulating layer on the sweep signal line, the first sub power voltage line, and the first emission line; and a second sub power voltage line on the fourth insulating layer, wherein the second sub power voltage line is connected to the first sub power voltage line through a third contact hole penetrating the fourth insulating layer.

23. The display device of claim 22, wherein an area of the third contact hole is larger than an area of the second contact hole.

24. The display device of claim 22, wherein the second contact hole overlaps the third contact hole.

25. A display device comprising:

a first scan line to receive a first scan signal;

a second scan line to receive a second scan signal;

a sweep signal line to receive a sweep signal;

a first data line to receive a first data voltage;

a second data line to receive a second data voltage; and a sub-pixel connected to the first scan line, the second scan line, the sweep signal line, the first data line, and the second data line, wherein the sub-pixel comprises:

a first pixel driver configured to generate a control current according to the first data voltage of the first data line;

a second pixel driver configured to generate a driving current according to the second data voltage of the second data line; and a third pixel driver configured to control a period in which the driving current is applied according to the control current of the first pixel driver, and wherein the first pixel driver comprises:

a first transistor configured to generate the control current according to the first data voltage;

a second transistor configured to apply the first data voltage of the first data line to a first electrode of the first transistor according to the first scan signal;

a third transistor configured to apply an initialization voltage of an initialization voltage line to a gate electrode of the first transistor according to the second scan signal; and a first capacitor located between the sweep signal line and the gate electrode of the first transistor.

* * * * *